United States Patent [19]

Suzuki et al.

[11] 4,105,487
[45] Aug. 8, 1978

[54] PROCESS OF AND AN APPARATUS FOR PRODUCING GREEN TIRES

[75] Inventors: Masayoshi Suzuki, Higashiyamato; Tatuo Oojimi, Kodaira; Toshinori Yabe, Kodaira; Shoji Takahashi, Kodaira, all of Japan

[73] Assignee: Bridgestone Tire Company Limited, Tokyo, Japan

[21] Appl. No.: 753,496

[22] Filed: Dec. 22, 1976

[30] Foreign Application Priority Data

Dec. 27, 1975 [JP] Japan .................................. 50-157534
Dec. 29, 1975 [JP] Japan .................................. 50-157768

[51] Int. Cl.² .......................................... B29H 17/14
[52] U.S. Cl. ................................ 156/405 R; 156/126;
156/131; 156/132; 214/1 BB; 214/1 BT; 214/DIG. 3
[58] Field of Search ............... 156/110 R, 111, 123 R, 156/126, 131, 132, 133, 394 R, 396, 398, 400, 401, 403, 405, 406, 414–420; 211/19, 20, 23, 79; 214/1 B, 1 BB, 1 BS, 1 BT, DIG. 3; 269/217, 276

[56] References Cited

U.S. PATENT DOCUMENTS

| | | | |
|---|---|---|---|
| 2,407,152 | 9/1946 | Haase | 156/111 |
| 3,071,179 | 1/1963 | Tourtellotte et al. | 156/405 |
| 3,121,653 | 2/1964 | Trevaskis | 156/131 |
| 3,127,294 | 3/1964 | Porter | 156/398 |
| 3,409,491 | 11/1968 | Pacciarini et al. | 156/126 |
| 3,413,174 | 11/1968 | Porter | 156/405 |
| 3,442,746 | 5/1969 | Robertson | 156/111 |
| 3,600,252 | 8/1971 | Henley et al. | 156/406 |
| 3,795,564 | 3/1974 | Mallory | 156/398 |
| 3,865,670 | 2/1975 | Habert | 156/126 |
| 4,007,069 | 2/1977 | Takayanagi et al. | 156/133 |

*Primary Examiner*—David Klein
*Assistant Examiner*—John E. Kittle
*Attorney, Agent, or Firm*—Cushman, Darby & Cushman

[57] ABSTRACT

This invention is concerned with a process of and an apparatus for producing green tires, in which a green case shaped on a tire band building drum is transferred onto a tire building drum by a transfer ring mechanism and an inextensible endless belt built on a belt building drum is also transferred and applied onto the green case, deformed into a toroidal form on the tire building drum, by the transfer ring mechanism. The transfer ring mechanism serves to hold and release the green case and the endless belt and has such a construction to be movable along the axes of the tire band building drum, the tire building drum and the belt building drum.

9 Claims, 36 Drawing Figures

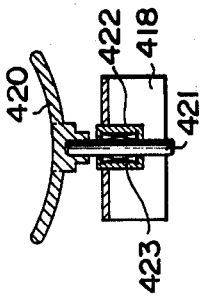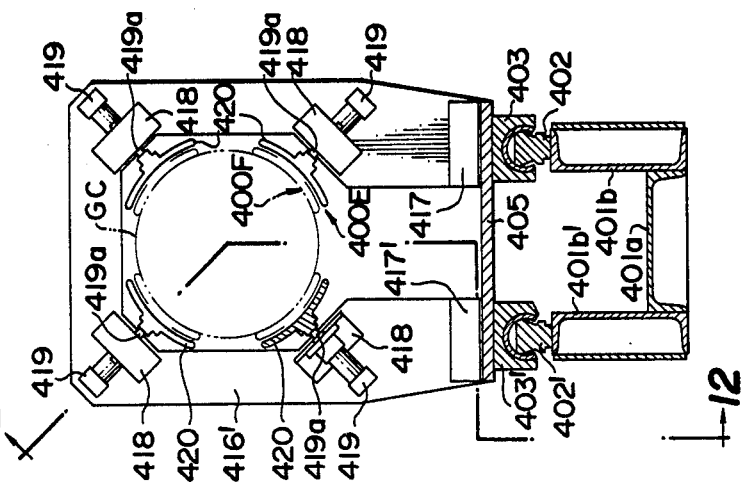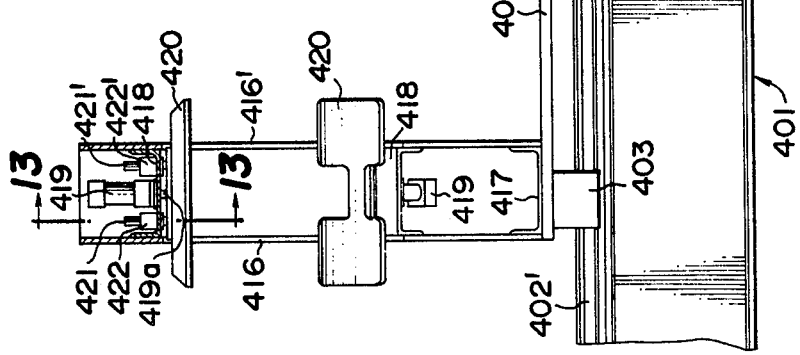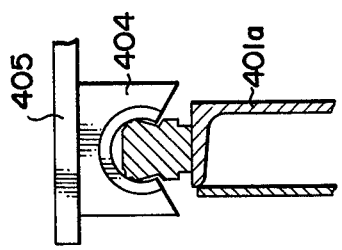

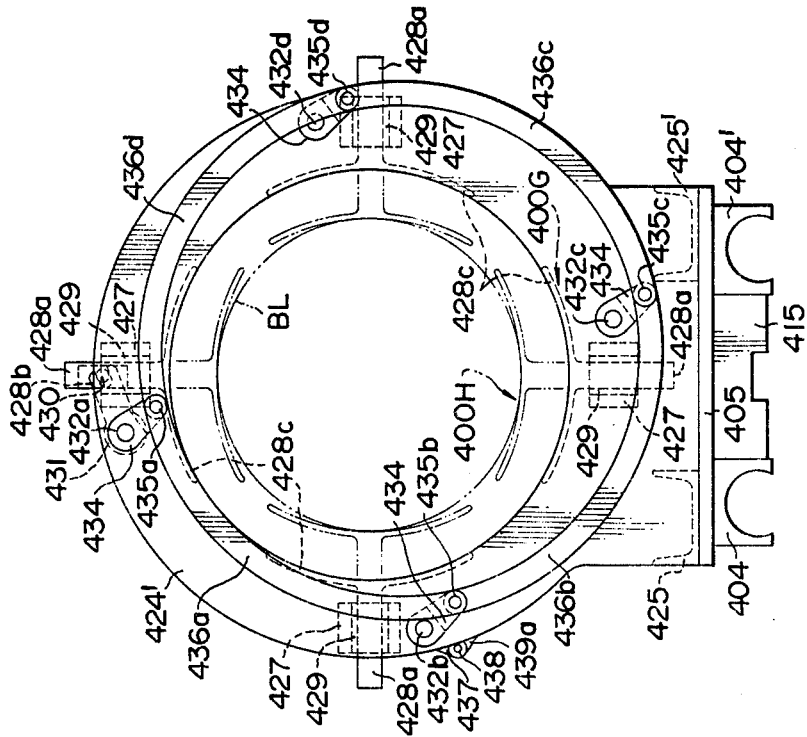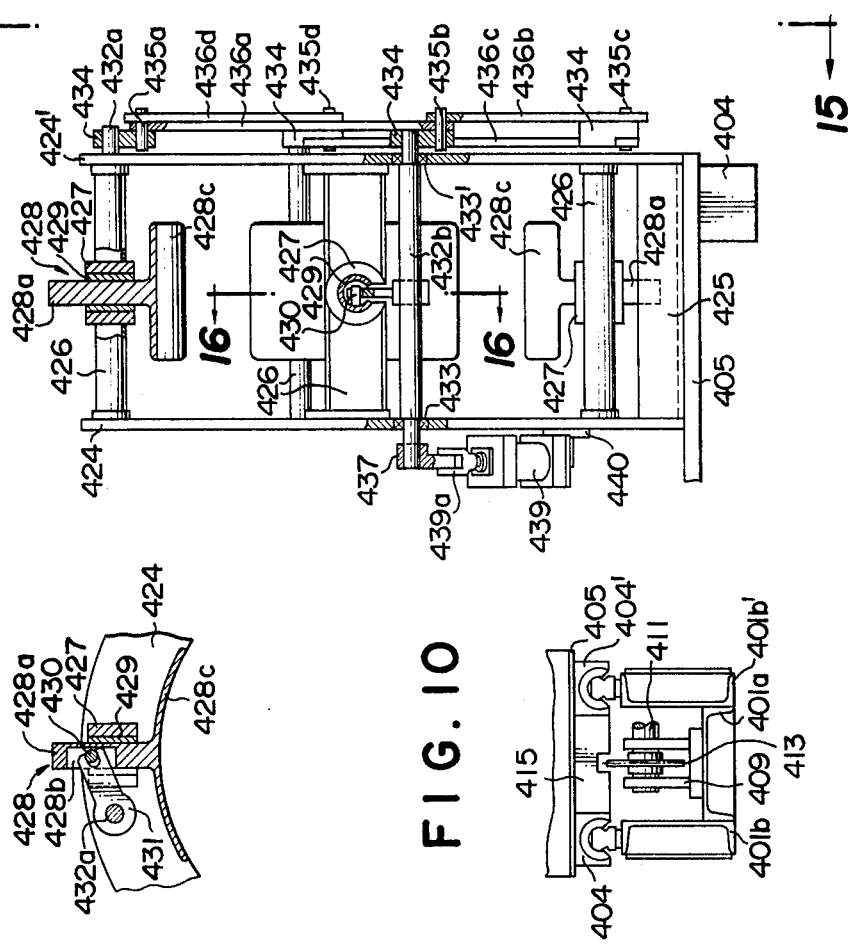

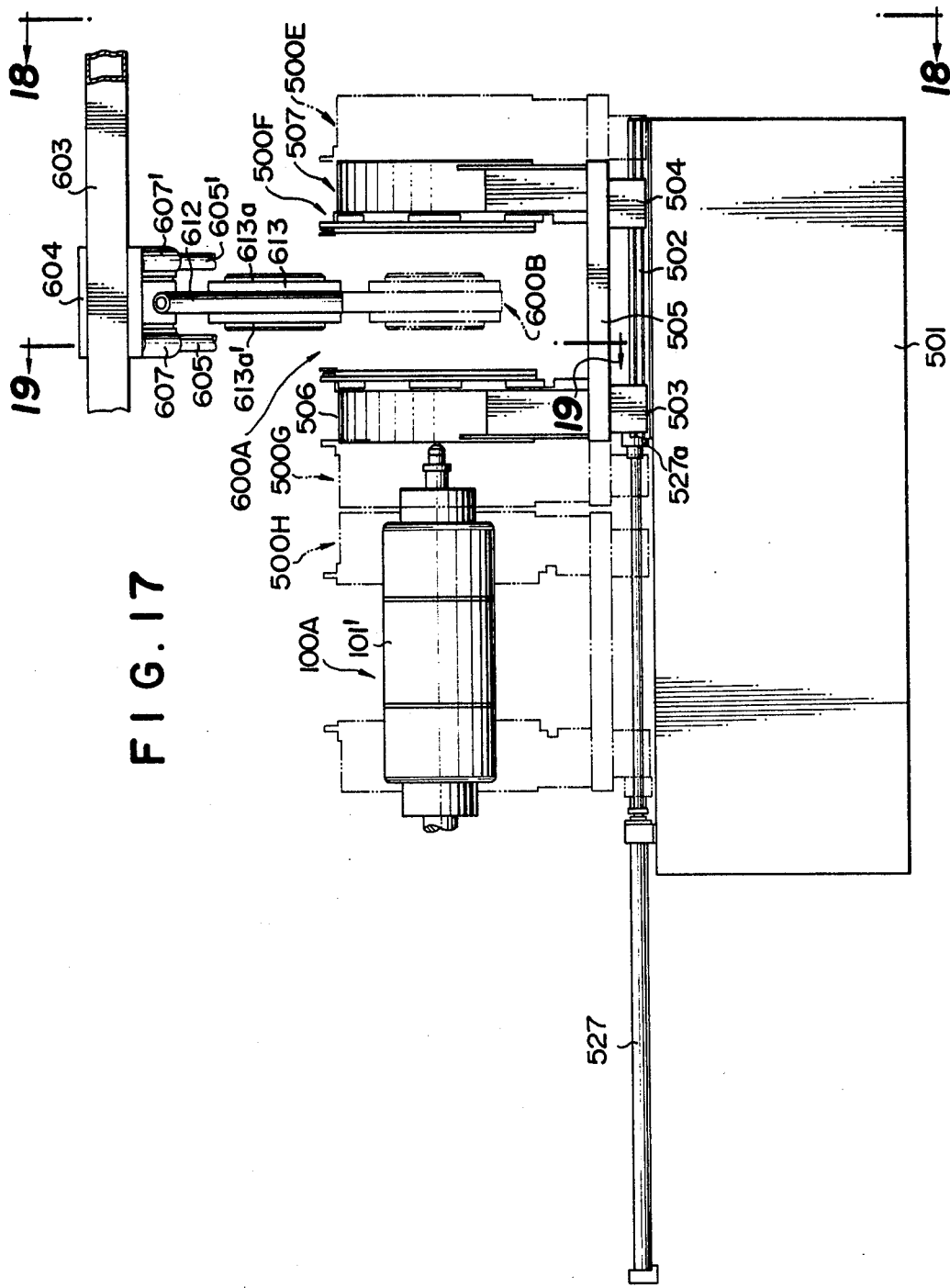

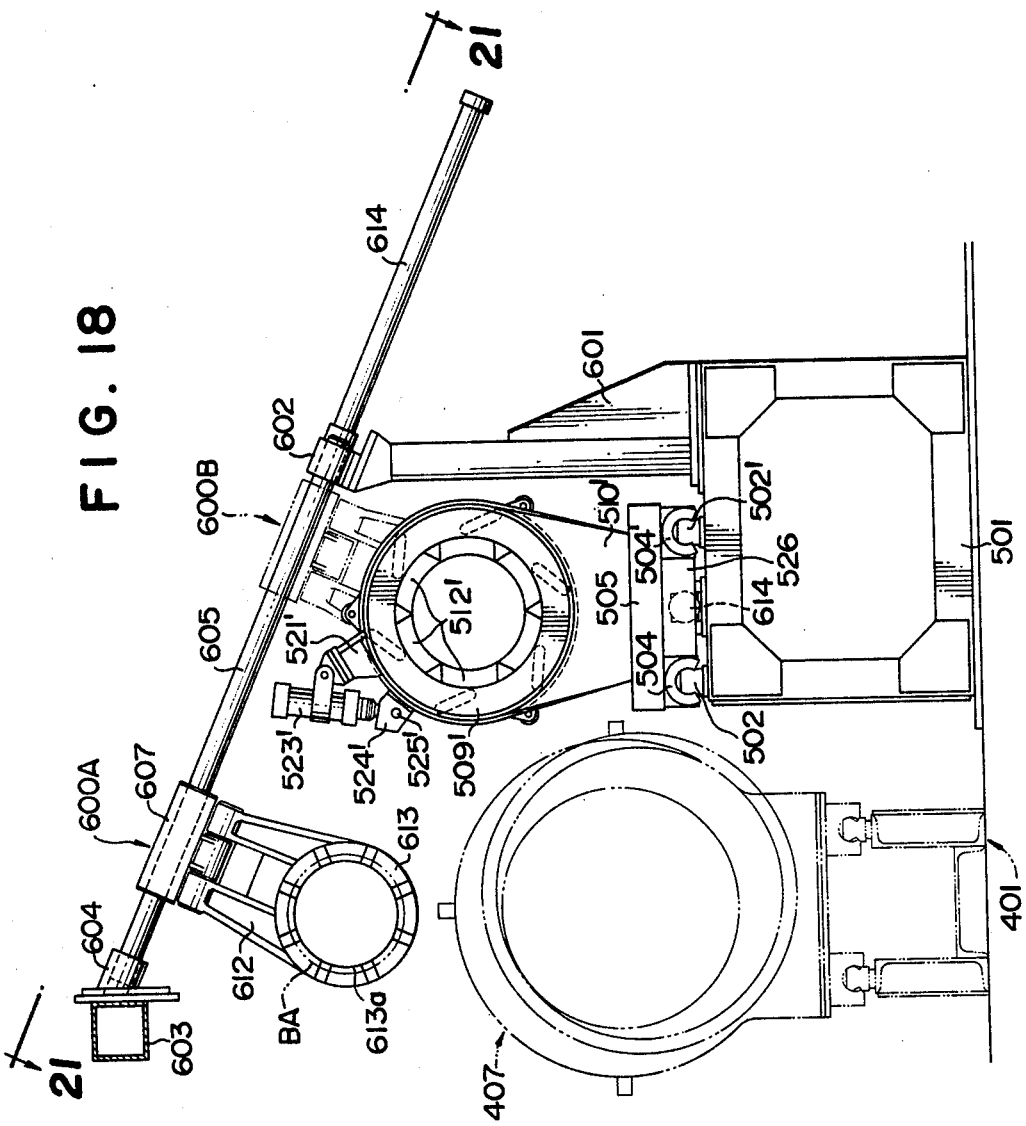

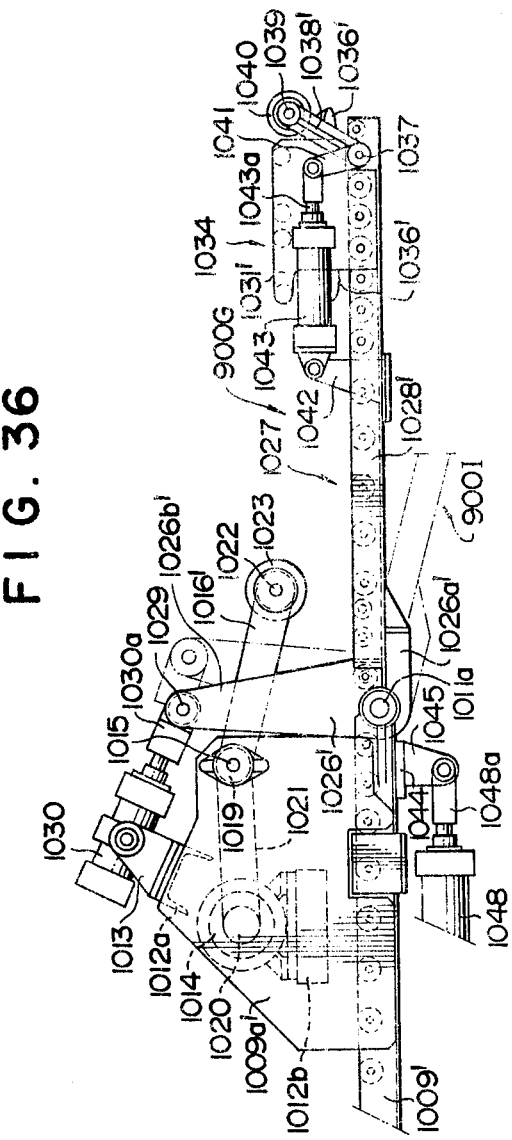

PROCESS OF AND AN APPARATUS FOR PRODUCING GREEN TIRES

This invention relates to production of automobile tires and, more particularly, to a process of and an apparatus for rapidly and reliably producing green tires to be manufactured into radial tires.

Conventionally, it is a common practice to adopt a building process performed in two stages, which is called a "two-stage building process" in the production of the radial tires each of which has an inextensible endless belt in its crown zone. Firstly, the first stage of the above two-stage building process is carried out by the steps of:

(a) wrapping one or more ply cords around a first tire building drum;

(b) assembling a pair of beads on the axially outer end portions of the wrapped ply cords;

(c) turning the wrapped ply cords around the beads; and (d) building a green case by applying a pair of side wall components onto side wall portions in its cylindrical state;

while the second state of two-stage building drum is secondly carried out by the steps of;

(a) deforming the built green case from its cylindrical state to its toroidal state on a second tire building drum; and (b) building a green tire by applying an inextensible endless belt consisting of one or more ply cords and a tread rubber on the built green case.

According to such two-stage building process, one or more attendant operators are forced to cut a number of tire components to predetermined lengths and then to wrap them precisely at given positions on the building drum or drums and finally to splice longitudinal ends thereof. A servicer for supplying the tire components is required to be frequently started or stopped by the operators who are on the other hand forced to control such operation precisely, promptly and safely. The qualities of tires thus manufactured are considerably relevant to skillfulness of each operator and markedly depend upon whether he always demonstrates his gained skillfulness or not.

On the other hand, the two-stage building process requires removal of the green case out of the first tire building drum for applying and embracing it on and around the second tire building drum upon transition from the first stage to the second stage, which entails deformation of the green case resulting in a number of bad effects on quality of a finished tire as well as requirement for man powers. Moreover, the building capacity of the second stage is approximately twice that of the first stage, thereby requiring storage of the green cases at suitable places between the first and second stages and further necessitating a wide variety of controls or managements such as for places, time periods of storage, and the like.

In order to overcome the previously mentioned problems, there has been proposed an one-stage building process wherein a series of operations are incessantly carried out on a single tire building drum from wrapping ply cords to building a green case. This one-stage building process makes it possible to omit such intermediate storage of green cases and cubersome handling thereof as seen in the two-stage building process, however, requires skillfulness for the operators as yet. The building of a finished green tire on a single tire building drum will necessitate a long period of time for building per unit tire and thus deteriorate an operational efficiency as compared with the two-stage building process, which leads to a principal cause of cost-up.

it is therefore a primary object of the present invention to provide a process and an apparatus which overcome all the above problems and drawbacks and which enable automobile tires to be manufactured with high accuracy and quality without necessitating any skillfulness for operators.

It is another object of the present invention to provide a process and an apparatus which eliminate intermediate storage of green cases and controls or managements resulting therefrom.

It is further object of the present invention to provide a process and an apparatus which remarkably enhance an operational efficiency and decrease a price per unit tire.

In order to overcome the above objects there is proposed in accordance with the present invention a process of producing green tires which comprises the steps of: building a cylindrical tire band assembled with a pair of beads on a collapsible tire band building drum; building an inextensible endless belt on a collapsible belt building drum; shaping a green case by turning both end portions of the built tire band around the beads in the state of the tire band building drum being expanded to apply tire side wall components on the turned end portions of the tire band; positioning and embracing the shaped green case on and around a tire building drum in its cylindrical state with its mid-circumferential plane in registry with a circumferential plane of the tire building drum after removal of the shaped green case from the tire band building drum, the tire building drum being deformable between a cylindrical form and a toroidal form; deforming the green case on the tire building drum from the cylindrical state to the toroidal state; positioning and embracing the endless belt on and around the toroidally deformed green case with its mid-circumferential plane in registry with a circumferential plane of the green case after removal of the endless belt from the belt building drum to assemble the endless belt and the green case for production of a green tire; and removing the shaped green tire from the tire building drum which is deformed into the cylindrical state from the toroidal state.

On the other hand, an apparatus embodying the above process of the present invention is proposed comprising: a tire band building mechanism including a revolvable member revolvable around its own axis to be indexed at first and second rotation positions, a pair of collapsible tire band building drums mounted on the revolvable member in spaced apart and parallel relation with each other to assume first and second stations when the revolvable member is revolved and indexed at the respective first and second rotation positions, each of the tire band building drums being rotatable around its own axis, a revolving means for intermittently revolving and indexing the revolvable member into the first and second stations, and a pair of tire band building drum rotating means for rotating the tire band building drums; a belt building mechanism including a collapsible belt building drum disposed in coaxial and spaced apart relation with the tire band building drum occupying the second station and rotatable around its own axis, and a belt building drum rotating means for rotating the belt building drum; a tire building drum mechanism including a tire building drum disposed between and in coaxial relation with the tire band building drum occupying the second station and the belt building drum to be deformable between a cylindrical form and a toroidal form, and a tire building drum rotating means for rotating the tire building drum; and a transfer ring mechanism including a movable base structure movable to assume first, second and third positions, first and second transferring arrangements mounted on the movable base structure in spaced relation with each other along the axes of the tire band building drum, the belt building drum and the tire building drum with a distance between the mid-circumferential planes of the transferring arrangements substantially equal to a distance between the mid-circumferential planes of the tire building drum and the belt building drum, the first transferring arrangement surrounding the tire band building drum when the movable base structure is moved to the first position, the first transferring arrangement surrounding the tire building drum to transfer a green case thereon to the tire building drum and the second transferring arrangement surrounding the belt building drum to receive and endless belt from the belt building drum when the movable base structure is moved to the second position, the second transferring arrangement surrounding the tire building drum to transfer the endless belt, received on the second transferring arrangement, onto the green case on the tire building drum when the movable base structure is moved to the third position.

The above and other objects, features and advantages of the present invention will become clear from the following particular description of the invention and the appended claims, taken in conjunction with the accompanying drawings which show by way of example a preferred embodiment of the present invention.

In the accompanying drawings:

FIG. 9 is an enlarged view as seen from the lines 9—9 of FIG. 6;

FIG. 10 is an enlarged view as seen from the lines 10—10 of FIG. 6;

FIG. 11 is an enlarged view as seen from the lines 11—11 of FIG. 6;

FIG. 12 is a view as seen from the lines 12—12 of FIG. 11;

FIG. 13 is an enlarged view as seen from the lines 13—13 of FIG. 12;

FIG. 14 is an enlarged view as seen from the lines 14—14 of FIG. 1;

FIG. 15 is a view as seen from the lines 15—15 of FIG. 14;

FIG. 16 is an enlarged view as seen from the lines 16—16 of FIG. 14;

FIG. 17 is an enlarged view as seen from the lines 17—17 of FIG. 1;

FIG. 18 is a view as seen from the lines 18—18 of FIG. 17;

FIG. 36 is a view as seen from the lines 36—36 of FIG. 31.

Figure 1:
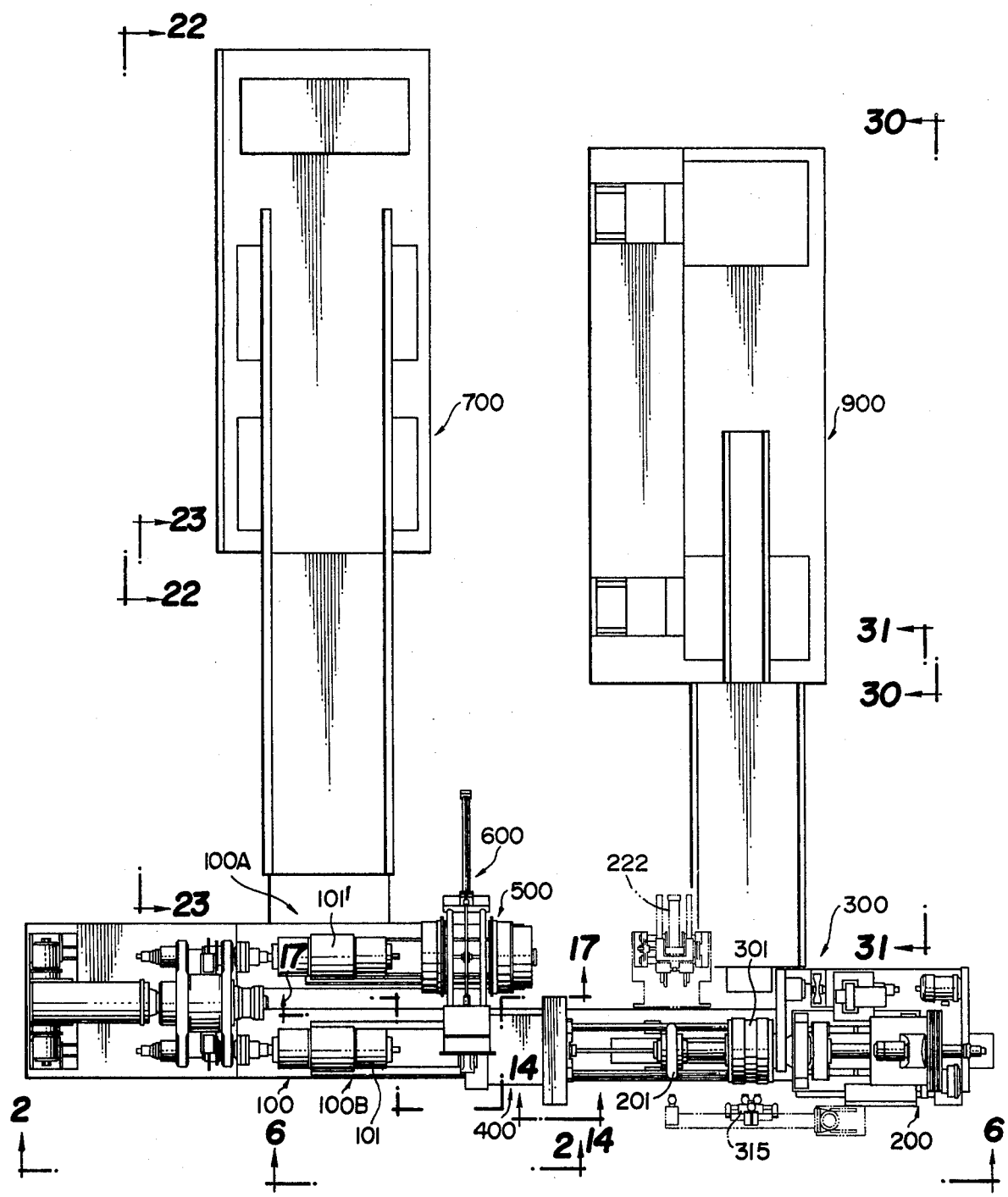
FIG. 1 is a plan view of an embodiment of an apparatus for producing green tires in accordance with the present invention.

Referring now to the drawings and particularly to FIG. 1, there is shown a general construction of a green tire building apparatus embodying the present invention which comprises a tire band building mechanism, generally designated at 100, having a pair of tire band building drums 101 and 101'. The tire band building drums 101 and 101' are disposed to have their rotational axes in parallel relation with each other and adapted to be turn about their common revolutionary axis for alternately occupying their common first and second positions or stations 100A and 100B. In opposing and spaced relation with the tire band building mechanism 100 is disposed a tire building mechanism, generally indicated at 200, which includes a tire building drum 201 located coaxially with the tire band building drum 101 or 101' occupying the second station 100B. In close proximity of the tire building mechanism 200 is arranged a belt building mechanism, generally represented at 300, which includes a collapsible belt building drum 301 positioned rearwardly of and in the vicinity of the tire building drum 201 and having a rotational axis common to the tire building drum 201. The belt building drum 301 is designed to be driven for rotation separately from the tire building drum 201 by a suitable drive source as will be apparent hereinlater. Between the tire band building drum 101 or 101' occupying the second position 100B and the belt building drum 301 is disposed a transferring mechanism, generally designated at 400, which is adapted to be slidable along an axial line common to the rotational axes of the tire band building drum 101 or 101' occupying the second position 100B, the tire building drum 201 and the belt building drum 301. The transfer ring mechanism 400 comprises a pair of a ring-shaped arrangements which are axially spaced from each other by a distance substantially equal to the distance between the tire building drum 201 and the belt building drum 301. The particulars of the ring-shaped arrangements will become more apparent as this description further proceeds. In the vicinity of the tire band building drum 101 or 101' occupying the first station 100A is provided a bead setter mechanism, generally indicated at 500, which is adapted to be movable along the tire band building drum 101 or 101' of the first station 100A between a position where it surrounds the tire band building drum 101 or 101' at the first station 100A for setting a pair of beads BE thereonto and another position where it is spaced away from the tire band building drum 101 or 101'. In perpendicular relation with and at a position above the bead setter mechanism 500 is arranged a bead servicer mechanism, generally indicated at 600, which is movable toward and away from the bead setter mechanism 500 for supplying a pair of beads BE to the bead setter mechanism 500. A green case building servicer mechanism, generally designated at 700 is positioned in the vicinity of and in perpendicular relation with the tire band building drum 101 101' of the first station 100A for supplying an inner liner I, a carcass ply CP and a flipper F thereto. A belt building servicer mechanism, generally indicated at 900 is arranged in the vicinity of and in perpendicular relation with the belt building drum 301 for supplying a breaker ply BP and a tread T thereto.

Tire Band Building Mechanism

As best shown in FIGS. 2 to 5, the tire band building mechanism 100 comprises a tire band producing frame 102 which is constructed of channel steels and which has a fore end upper face securely mounting a pair of bearings 103 and 103' in opposing relation with each other. A fixed shaft 104 is securely supported at both ends on the bearings 103 and 103' to be substantially in perpendicular relation with the rotary axes of the tire band building drums 101 and 101'. A rotatable cylindrical member 106 is rotatably supported at both ends on the fixed shaft 104 between the bearings 103 and 103' through ball bearings 105 and 105' the latter of which is not shown in the drawings but disposed opposingly to the former. A fixed cylindrical member 107 has a fore end securely mounted on the rotatable cylindrical member 106 substantially in perpendicular relation with the axis of the rotatable cylindrical member 106, i.e., substantially in parallel relation with the axes of the tire band building drums 101 and 101' while having an rear end rotatably supporting one end of a rotary shaft 110 through a bearing 109. The fixed cylindrical member 107 is reinforced by reinforcing members 108 and 108'. The other end of the rotary shaft 110 is securely connected to the fore end of a rotary cylindrical member 111 which is in turn associated with a rotary actuator 112 so that the rotary cylindrical member 111 is rotated through an angle of 180° jointly with the rotary shaft 110 upon actuation of the rotary actuator 112. A tire band building drum supporting member 113 contoured substantially in the form of X-shape is securely mounted on the longitudinally intermediate outer periphery of the rotary cylindrical member 111 and has a pair of projections 113a and 113a' which extend opposingly to each other. The projections 113a and 113a' are adapted to rotatably support at their free ends rotary shafts 114 and 114', respectively, for rotation of the tire band building drums 101 and 101', respectively, in parallel and spaced relation with each other. The rotary shafts 114 and 114' are formed at their free ends with outer flanges 114a and 114a', respectively, which are detachably secured to inner flanges 101a and 101a', respectively, formed with the longitudinally fore ends of the rotary shafts 101b and 101b' of the tire band building drums 101 and 101', respectively. The tire band building drums 101 and 101' are thus detachably mounted on the rotary shafts 114 and 114', respectively, which makes it easy to exchange the tire band building drums 101 and 101' for new ones for building various sizes of tire band. The tire band building drums 101 and 101' are not of any specific construction and thus may employ conventionally well known tire band building drums. Therefore, there will not be described hereinlater about specified construction of each of the tire band building drums 101 and 101' since it is not directly concerted with the features of the present invention. In short, each of the tire band building drums 101 and 101' may be of any type of tire band building drum which is designed to be radially collapsible and expansible. The rotary shafts 114 and 114' have respectively longitudinally intermediate portions securely carrying sprocket wheels 115 and 115', respectively, which are in driving connection with sprocket wheels 118 and 118' through endless chains 119 and 119', respectively. The sprocket wheels 118 and 118', are securely carried on output shafts 117a and 117a' of electric motors 117 and 117', respectively, which are securely mounted on brackets 116 and 116' which are in turn attached to the sides of the tire band building drum supporting member 113, respectively, in symmetrical relation with each other. Therefore, the rotations of the electric motor 117 and 117' respectively causes the rotary shafts 114 and 114' through the sprocket wheels 118 and 118', the endless chains 119, 119' and the sprocket wheels 115, 115' so that the tire band building drums 101 and 101' are caused to be rotated around their rotational axes. On the other hand, the actuation of the rotary actuator 112 causes the rotary cylindrical member 111 to be revolved through an angle of 180°, thereby permitting the tire band building drums 101 and 101' to be revolved around the rotational axis of the rotary cylindrical member 111 through an angle of 180°. The tire band building drums 101 and 101' are thus intermittently revolved to assume the first station 100A where they are wrapped around themselves with an inner liner I, a carcass ply CP, flipper cloths F to be assembled with a pair of beads BE and the second station 100B where they are wrapped around themselves with a pair of bead filler BF for turning the end portions of the carcass ply CP around the beads BE and then applied with side treads ST and chafer cloths CH for fabrication of a green case GC.

The tire band building drum supporting member 113 has a pair of projections 113b and 113b' which are angularly spaced from the previously mentioned projections 113a and 113a' respectively supporting the rotary shafts 114 and 114' and which have respective free ends securely carrying thereon indexing blocks 120 and 120' respectively in the form of a substantially trapezoidal shape. The indexing blocks 120 and 120' are adapted to be engageable with a grooved block 121 securely mounted on the rear upper face of the tire band producing frame 102 so as to ensure the tire band building drums 101 and 101' positioned at their respective stations 100A and 100B to be indexed.

To the rear and lower outer periphery of the fixed cylindrical member 107 are attached a pair of spaced parallel brackets 122 and 122' which fixedly support both ends of a pin member 126 in parallel with the fixed shaft 104. A pair of brackets 123 and 123' are securely mounted on the tire band producing frame 102 in opposing relation with the brackets 122 122', respectively, and fixedly support both ends of a pin member 124 in parallel with the fixed shaft 104. A fluid-operated cylinder 125 are lockably supported on the pin member 124 and has a piston rod 125a the leading end of which is pivotally connected to the pin member 126. Under a tire band building state where the piston rod 125a of the fluid-operated cylinder 125 is held retracted downwardly, the lower faces 122a and 122a' of the brackets 122 and 122' are respectively held in contact with the upper faces 123a and 123a' of the brackets 123 and 123' to ensure the tire band building drums 101 and 101' to be retained at their respective stations 100A and 100B jointly with engagement of the grooved block 121 and either of the indexing blocks 120 and 120'. It is thus to be noted that the tire band building drums 101 and 101' are swung around the fixed shaft 104 together with the fixed cylindrical member 107, the rotatable cylindrical member 111 and the tire band building drum supporting member 113 by the action of the fluid-operated cylinder 125 from the first and second stations 100A and 100B of the operating state as shown in solid lines of FIG. 2 to the first and second stations 100C and 100D of the nonoperating state as shown in phantom lines of FIG. 2 and vice versa.

Tire Building Mechanism

Figure 6:
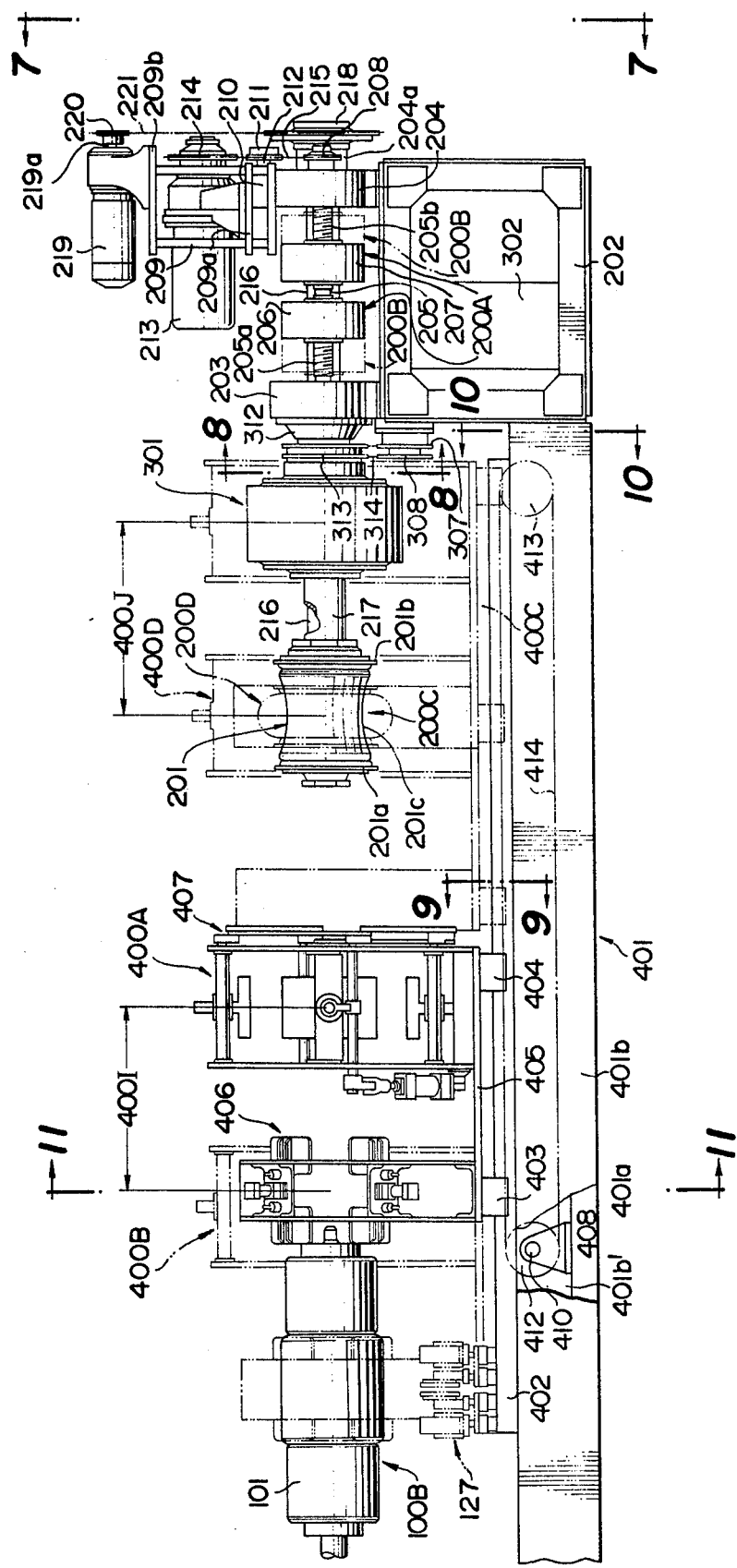
FIG. 6 is an enlarged view as seen from the lines 6—6 of FIG. 1.
Figure 7:
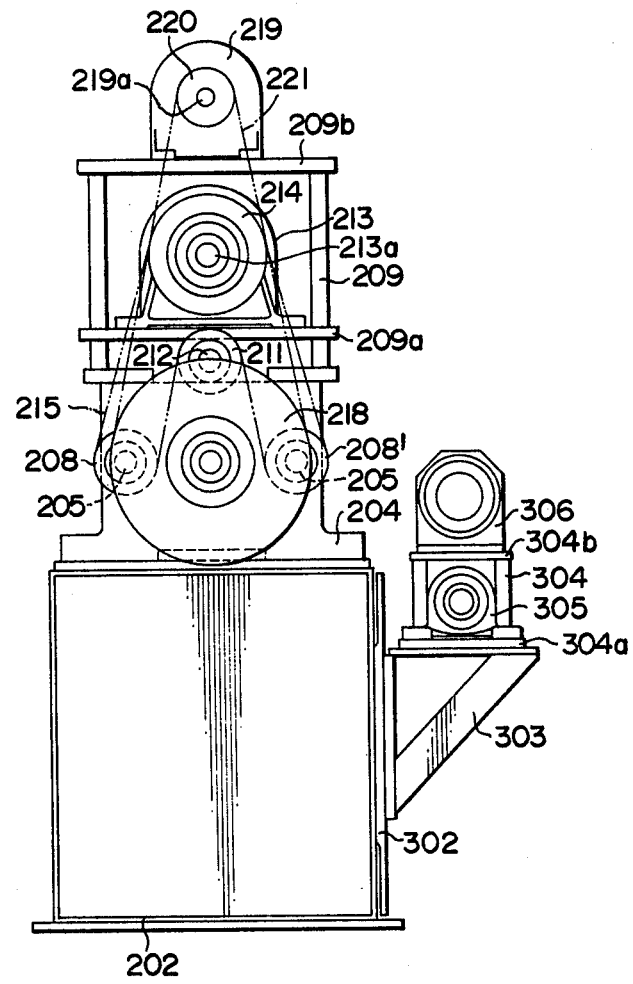
FIG. 7 is an enlarged view as seen from the lines 7—7 of FIG. 6.

As best shown in FIGS. 6 and 7, a tire producing frame 202 which is constructed of channel steels and flat steel plates is located in opposing and spaced relation with the tire band producing frame 102. A fore ball bearing 203 and a rear ball bearing 204 are securely mounted on the respective fore and rear end portions of the tire producing frame 202 in opposing relation with each other with their respective center lines substantially in axial alignment with the tire band building drum 101 or 101' positioned at the second station 100B of the initial state. A pair of screw shafts 205 each having oppositely threaded portions 205a and 205b formed from the longitudinally intermediate portion toward the opposite ends are rotatably supported at their axial ends on the fore and rear ball bearings 203 and 204 in substantially symmetrical and parallel relation with the axial line of the tire band building drum 101 or 101' disposed at the second station 100B of the initial state. A fore thrust bearing 206 is in threaded engagement with the threaded portions 205a of the screw shafts 205 while a rear thrust bearing 207 is in threaded engagement with the threaded portions 205b of the screw shafts 205 so that the fore and rear thrust bearings 206 and 207 are moved toward and away from each other by simultaneous rotations of the screw shafts 205. As particularly shown in FIG. 7, driven sprocket wheels 208 and 208' are respectively carried on the rear ends of the screw shafts 205 extending rearwardly from the rear ball bearing 204. On the rear ball bearing 204 is securely mounted a two-stage motor base 209 which has an intermediate stand 209a attached thereunder with an intermediate bearing 210 rotatably supporting a rotary shaft 212 carrying an idler sprocket wheel 211 at its rear end. On the intermediate stand 209a is securely mounted a reversely rotatably electric motor 213 which has an output shaft 213a carrying at its free end a driven sprocket wheel 214. An endless chain 215 is stretched over the driven sprocket wheel 214, the idler sprocket wheel 211 and the driven sprocket wheels 208 and 208' so that when the electric motor 213 is energized to be rotated the fore and rear thrust bearings 206 and 207 are caused to be moved toward and away from each other through the driven sprocket wheel 214, the endless chain 215, the idler sprocket wheel 211, the driven sprocket wheels 208, 208' and the screw shafts 205.

A hollow shaft 216 is disposed in axial alignment with the tire band building drum 101 or 101' positioned at the second station 100B of the initial operating state and interposed between and in parallel with the screw shafts 205 to extend throughout and rotatably received in the fore thrust ball bearing 206. The fore end portion of the hollow shaft 216 securely carries a collapsible fore bead ring 201a constituting an element of a tire building drum 201, while the rear end portion of the hollow shaft 216 is received in a drive sleeve 204a which is in turn rotatably engaged with the rear ball bearing 204. The rear end portion of the hollow shaft 216 is adapted to be in axially slidable engagement with but rotatably jointly with the drive sleeve 204a by means of a key and a key way formed in the hollow shaft 216 and the drive sleeve 204a but not shown in the drawings. The hollow shaft 216 is also designed to be rotatably engaged with the rear thrust bearing 207 and to be axially moved together with the rear thrust bearing 207. Therefore, rotation of the drive sleeve 204a causes the hollow shaft 216 to be rotated leaving the rear thrust bearing 207 stationary while the axial movement of the rear thrust bearing 207 causes the hollow shaft 216 to be axially moved together therewith leaving the drive sleeve 204a stationary in the rear ball bearing 204. An inner supporting sleeve 217 is slidably received on the hollow shaft 216 to extend throughout the fore ball bearing 203 while having a rear end rotatably engaged with the fore thrust bearing 206 and a fore end securely carrying a collapsible rear bead ring 201b in face-to-face and spaced relation with the previous collapsible fore bead ring 201a supported on the fore end of the hollow shaft 216. The tire building drum 201 is in general constituted by a shaping bag 201c having axially outer peripheries in hermetically sealed relation with the fore and rear collapsible bead rings 201a and 201b, and the fore and rear collapsible bead rings 201a and 201b which facilitate mounting of the green case and dismounting of a green tire built thereon in their collapsed states. The longitudinally intermediate portion forwardly of the fore thrust bearing 206 of the inner supporting sleeve 217 is rotatably supported on the fore ball bearing 203 and slidably connected with the hollow shaft 216 by means of a suitable key not shown. Therefore, the inner supporting sleeve 217 can be slided axially and rotated in unison with the hollow shaft 216 by the drive sleeve 204a through the hollow shaft 216 and the keys. The rear end of the drive sleeve 204a securely carries a driven sprocket wheel 218 which is in driving association with a sprocket wheel 220 securely carried on an output shaft 219a of an electric motor 219 mounted on an upper stand 209b of the motor base 209 by way of an endless chain 221 passed on the sprocket wheels 218 and 220. It is to be understood that when the electric motor 219 is energized to be rotated the fore and rear bead rings 201a and 201b of the tire building drum 201 are rotated through the sprocket wheel 220, the endless chain 221, the sprocket wheel 218, the drive sleeve 204a, the hollow shaft 216 and the inner supporting sleeve 217. On the other hand, when the electric motor 213 is energized to be rotated the rotational torque of the electric motor 213 is transmitted to the screw shafts 205 through the sprocket wheel 214, the endless chain 215, and the sprocket wheels 208, 208' so that the fore thrust bearing 206 rotatably engaged with the inner supporting sleeve 217 and held in threaded engagement with the threaded portions 205a of the screw shafts 205 and the rear thrust bearing 207 rotatably engaged with the hollow shaft 216 and held in threaded engagement with the threaded portions 205b of the screw shafts 205 are moved toward and away from each other by the rotations of the screw shafts 205 to assume initial operating positions 200A shown in solid lines of FIG. 1 and final operating positions 200B shown in phantom lines of the same Figure. Such movements of the fore and rear thrust bearings 206 and 207 cause the hollow shaft 216 and the inner supporting sleeve 217 to be moved forwardly and rearwardly so that the fore bead ring 201a and the rear bead ring 201b respectively supported on the fore ends of the hollow shaft 216 and the inner supporting sleeve 217 are moved from initial operating positions 200C shown in solid lines of FIG. 1 to final operating positions 200D shown in phantom lines of the same Figure and vice versa. While the movements of the fore and rear thrust bearings 206 and 207 cause the fore bead ring 201a and the rear bead ring 201b to be moved toward each other, compressed air is introduced into a cavity, defined by the fore bead ring 201a, the rear bead ring 201b and the shaping bag 201c, through the hollow shaft 216 and an opening opened at the cavity in communication with the hollow shaft 216 by a suitable compressed air source not shown so that the tire building drum 201 is deformed into a toroidal form shown in phantom lines of FIG. 6 from a cylindrical form shown in solid lines of the same Figure in cooperation with the approaching movements of the fore and rear bead rings 201a and 201b. On the other hand, the compressed air is discharged from the cavity through the opening and the hollow shaft 216 to the atmosphere to conversely deform the tire building drum 201 into the cylindrical form from the toroidal form in cooperation with the separating movements of the fore and rear bead rings 201a and 201b. The tire building drum 201 is not of any specific construction and thus may employ a conventionally well known tire building drum for production of radial tires. Therefore, there will not be described hereinafter about particular construction of the tire building drum 201 since it is not directly concerned with the features of the present invention. In short, the tire building drum 201 may be of any type of tire building drum which is designed to be drivingly rotatably about its own axis and deformable between the cylindrical and toroidal forms.

Belt Building Mechanism

Figure 8:
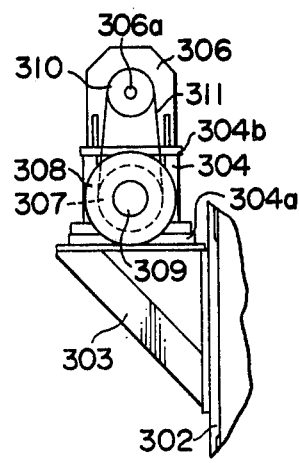
FIG. 8 is an enlarged view as seen from the lines 8—8 of FIG. 6.

As best shown in FIGS. 6 to 8, a side plate 302 is secured to the side of the tire producing frame 202 and has an outer side to which is attached a laterally extending supporting bracket 303. On the supporting bracket 303 is securely mounted a motor base 304 having a lower stand 304a on which a ball bearing 305 is securely mounted and having an upper stand 304b on which an electric motor 306 is securely mounted. As best illustrated in FIG. 8, the ball bearing 305 is adapted to rotatably support a rotary shaft 309 having a fore end securely carrying sprocket wheels 307 and 308 integrally coupled in side-by-side relation, and the electric motor 306 has an output shaft 306a the fore end of which securely carries a sprocket wheel 310 in driving association with the sprocket wheel 307 by an endless chain 311 passed thereon. An outer supporting sleeve 312 is adapted to embrace the inner supporting sleeve 217 between the tire building drum 201 and the fore ball bearing 203 and has a rear end attached to the fore end face of the fore ball bearing 203. A belt building drum 301 is rotatably supported on the outer supporting sleeve 312 and has a rear face fixedly carrying a sprocket wheel 313 which is in driving connection with the sprocket wheel 308 by an endless chain 314 stretched thereover. It is thus to be noted that when the electric motor 306 is energized to be rotated, the belt building drum 301 is rotated irrespective of the tire building drum 201 by way of the sprocket wheel 310, the endless chain 311, the sprocket wheel 307, the sprocket wheel 308, the endless chain 314 and the sprocket wheel 307, the sprocket wheel 308, the endless chain 314 and the sprocket wheel 313. The belt building drum 301 is not of any specific construction and thus many employ a conventionally well known belt building drum. Therefore, there will not be described hereinafter about particular construction of the belt building drum 301 since it is not directly concerned with the features of the present invention. In short, the belt building drum may be of any type of belt building drum which is designed to be radially collapsible and expansible while being drivingly rotatable about its own axis.

Transfer Ring Mechanism

As best shown in FIG. 6 and FIGS. 9 to 11, a fixed base structure, generally designated at 401, comprises a bottom channel member 401a disposed between the tire band producing frame 102 and the tire producing frame 202 is parallel relation with the rotational axis of the hollow shaft 216 and the tire band building drum 101 or 101' positioned at the second station 100B of the operating state, and a pair of side channel members 401b and 401b' secured to the both sides of the bottom channel member 401a in face-to-face and spaced relation with each other and in symmetrical relation with a vertical plane passing through the rotational axes of the hollow shaft 216 and the tire band building drum 101 or 101' positioned at the second station 100B of the operating state. On the side channel members 401b and 401b' are respectively securely mounted parallel guide rails 402 and 402' in the form of a generally inverse-trapezoidal shape. A movable base structure 405 has a pair of fore spaced legs 403 and 403' formed on the fore lower surface thereof and a pair of rear spaced legs 404 and 404' formed on the rear lower surface thereof, the fore and rear legs 403, 403', 404 and 404' being each formed with a groove in the form of a substantially semi-circular shape in cross-section. The movable base structure 405 is adapted to be slidably movable on and along the parallel guide rails 402 and 402' with the grooves of the fore and rear legs 403 and 404 in sliding engagement with the guide rail 402 and with the grooves of the fore and rear legs 403' and 404' also in sliding engagement with the guide rail 402'. On the fore and rear end portions of the movable base structure 405 are respectively securely mounted a green case transferring arrangement, generally indicated at 406, and a belt transferring arrangement, generally indicated at 407.

As will be seen particularly in FIGS. 6 and 10, fore and rear brackets 408 and 409 are located in spaced relation along and securely mounted on the bottom channel member 401a of the fixed base structure 401 and respectively rotatably carry sprocket wheels 412 and 413 through rotary shafts 410 and 411, respectively. Stretched over the sprocket wheels 412 and 413 is an endless chain 414 which has a longitudinal portion rigidly connected with a bracket 415 vertically depending from the lower surface of the movable base structure 405 and laterally extending between the rear legs 404 and 404'. The rotary shaft 411 of the sprocket wheel 413 is adapted to be drivingly connected with an electric motor not shown so that rotation of the electric motor causes the sprocket wheels 412 and 413 to be rotated, thereby permitting the movable base structure 405 to be moved along the bottom channel member 401a through the endless chain 414. It is thus to be understood that the movable base structure 405 is moved from a fore carrying position 400B shown in phantom lines of FIG. 6 to a rear carrying position 400C shown also in phantom lines of the same Figure through an initial operating position 400A shown in solid lines of the same Figure and vice versa.

The green case transferring arrangement 406 is illustrated particularly in FIGS. 11 and 12 as comprising a pair of vertical supporting plates 416 and 416' in the form of a generally inverse U-shape in parallel and spacedly opposing relation with each other on the fore end portion of the movable base structure 401 and a pair of reinforcing channel members 417 and 417' for rigidly securing the supporting plates 416 and 416' onto the movable base structure 405. Four horizontally extending brackets or base plates 418 are provided circumferentially equi-spacedly and radially relative to the rotational axis of the hollow shaft 216 to have both ends secured to the inner opposing surfaces of the supporting plates 416 and 416'. A fluid-operated cylinder 419 is securely mounted on the radially outer face of each of the base plates 418 to have a piston rod 419a radially inwardly extending throughout a bore formed in each of the base plates 418. The leading and of the piston rod 419a is designed to securely carry an arcuate plate 420 in the form of a general H-shape for holding and carrying a first green tire component, i.e., a green case GC from its outer periphery. As best shown in FIGS. 12 and 13, a pair of spaced parallel guide rods 421 and 421' are securely mounted on the outer face of each of the arcuate plates 420 substantially in symmetrical relation with the fluid-operated cylinder 419 and in perpendicular relation with the arcuate plate 420 to extend radially outwardly throughout corresponding bores formed in the arcuate plate 420. In order to ensure guidance of the guide rods 421 and 421', there are provided on each of the base plates 418 a pair of guide sleeves 422 and 422' to slidably embrace or receive the respective guide rods 421 and 421' with oilless bearings 423 interposed therebetween for provision of smooth slides to the guide rods 421 and 421'. It is thus to be appreciated that actuations of the fluid-operated cylinders 419 cause the arcuate plates 420 to be radially inwardly moved into final operating positions 400F shown in phantom lines of FIG. 11 while being guided by the guide rods 421, 421' and the guide sleeves 422, 422' from initial operating positions 400E shown in solid lines of the same Figure and vice versa. The green case GC is thus held and carried by the arcuate plates 420 at the final operating positions 400F and released from the arcuate plates 420 at the initial operating positions 400E.

The belt transferring arrangement 407 is shown particularly in FIGS. 14 to 16 as comprising a pair of vertical supporting plates 424 and 424' in parallel and spacedly opposing relation with each other on the rear end portion of the movable base structure 405, each of the vertical supporting plates 424 and 424' being formed at its central portion with a circular opening, and a pair of reinforcing channel members 425 and 425' for rigidly securing the supporting plates 424 and 424' onto the movable base structure 405. Four horizontally extending brackets or base members 426 are provided circumferentially equi-spacedly having both ends secured to the inner opposing surfaces of the supporting plates 424 and 424'. On the longitudinally intermediate portion of each base member 426 is fixedly supported a radially extending guide sleeve 427 which is adapted to securely embrace or receive an oilless bearing 429 for providing smooth slide to each of guide rods 428a integrally formed on the radially outer surface of each of arcuate plates 428c. As best shown in FIGS. 14 and 16, the guide rod 428a is partially formed in a substantially cylindrical form having an opening 428b extending along its axial direction to accommodate therein a fixed pin 430 attached at one end to the inner wall of the guide rod 428a in cantilever. Four horizontally extending pivotal rods 432a, 432b, 432c and 432d are arranged circumferentially equi-distantly each having both end portions rotatably supported on the supporting plates 424 and 424' through ball bearings 433 and 433' and pivotally supporting at its longitudinal portion one ends of each of rockable arms 431. The other end of the rockable arm 431 is bifurcated for engagement with the fixed pin 430 housed within the guide rod 428a. The pivotal rods 432a, 432b, 432c and 432d each has an axial portion extending outwardly of the supporting plate 424' to securely carry one end of each of links 434 which in turn have the other ends pivotally carrying pivotal pins 435a, 435b, 435c and 435d, respectively. A connecting member 436a in a substantially quarter-circular form is pivotally connected at both ends to the pivotal pins 435a and 435b, a connecting member 436b in a substantially quarter-circular form being pivotally connected at both ends to the pivotal pins 435b and 435c, a connecting member 436c in a substantially quarter-circular form being pivotally connected at both ends to the pivotal pins 435c and 435d, and a connecting member 435d in a substantially quarter-circular form being pivotally connected at both ends to the pivotal pins 435d and 435a in such a manner that the connecting member 436b is arranged outwardly of the connecting member 436a, the connecting member 436c being arranged inwardly of the connecting member 436a, and the connecting member 436d being arranged outwardly of the connecting member 436a. The four arcuate plates 428c collectively define a belt carrying means 428 to hold or carry a second green tire component in a substantially circular form which includes a tread T and inextensible endless belt BL attached to the underside thereof. The pivotal rod 432b has an axial portion extending outwardly of the supporting plate 424 and securely connected with one end of a link 437. The other end of the link 437 is pivotally connected by means of a pivotal pin 438 with a piston rod 439a of a fluid-operated cylinder 439 which has a bottom end pivotally connected to a bracket 440 secured to the outer side of the supporting plate 424. It is thus to be noted that when the fluid-operated cylinder 439 is actuated to cause the piston rod 439a to be projected or retracted, the pivotal rod 432b is pivotted through the link 437 to cause the other pivotal rods 432a, 432c and 432d to be simultaneously pivotted by way of the connecting members 436a, 436b, 436c, 436d, the pivotal pins 435a, 435b, 435c, 435d, and the links 434 so that the lockable arms 431 are swung around the pivotal rods 432a, 432b, 432c and 432d to cause the guide rods 428a to be moved radially inwardly or outwardly through the fixed pins 430 while being guided by the guide sleeves 427. The arcuate plates 428c are thus moved radially inwardly into final operating positions 400H shown in chain lines of FIG. 15 from initial operating positions 400G shown in dashed lines of the same Figure or vice versa. The second green tire component is hence held and carried by the contracted arcuate plates 428c in the final operating positions 400H while it it released from the expanded arcuate plates 428c in the initial operating positions 400G. According to one feature of the present apparatus, it is essential that the green case transferring arrangement 406 and the belt transferring arrangement 407 be mounted on the movable base structure 405 with such a specified distance relation that the distance between the vertical plane median or intermediate along the rotational axis of the hollow shaft 216 of the supporting plates 416 and 416' constituting the green case transferring arrangement 406 and the vertical plane median or intermediate along the rotational axis of the hollow shaft 216 of the supporting plates 424 and 424' constituting the belt transferring arrangement 407, the distance being indicated by the reference numeral 400I in FIG. 6, in substantially equal to the distance between the equatorial planes of the tire building drum 201 and the belt building drum 301 which is indicated in FIG. 6 by the reference numeral 400J. It is to be understood that the green tire and an endless belt may be concurrently released from tire building drum 201 and the belt building drum 301, respectively, when the movable base structure 405 is positioned at the rear carrying position 400C. The arcuate plates 420 of the green case transferring arrangement 406 are retained as a whole in axial alignment with the rotational axis of the hollow shaft 216 while the arcuate plates 428c of the belt transferring arrangement 407 are similarly retained as a whole in axial alignment with the rotational axis of the hollow shaft 216.

Bead Setter Mechanism

As best shown in FIGS. 17 to 20, a bead setter frame 501 constructed of channel steels is located immediately below and along the tire band building drum 101 or 101' occupying the first station 100A of the operating state and in parallel relation with the fixed base structure 401 and securely mounts thereon a pair of spaced parallel guide rails 502 and 502' extending along the rotational axis of the tire band building drum 101 or 101' positioned at the first station 100A in the operating state. The guide rails 502 and 502' are each of similar construction to each of the guide rails 402 and 402' mounted on the fixed base structure 401 but each has a suitable length different from the guide rails 402 and 402'. A movable base structure 505 has a pair of fore spaced legs 503 and 503', the latter being not shown in the drawings but oppositely located to the former, formed on the fore lower surface thereof and a pair of rear spaced legs 504 and 504' formed on the rear lower surface thereof, the fore and rear legs 503, 503', 504 and 504' being each formed with a groove in the form of a substantially semi-circular shape in cross-section. The movable base structure 505 are adapted to be slidably movable on and along the parallel guide rails 502 and 502' with the grooves of the fore and rear legs 503 and 504 in sliding engagement with the guide rail 502 and with the grooves of the fore and rear legs 503' and 504' also in sliding engagement with the guide rail 502'. On the fore and rear end portions of the movable base structure 505 are respectively securely mounted a fore bead setting arrangement, generally indicated at 506, and a rear bead setting arrangement, generally indicated at 507.

Figure 19:
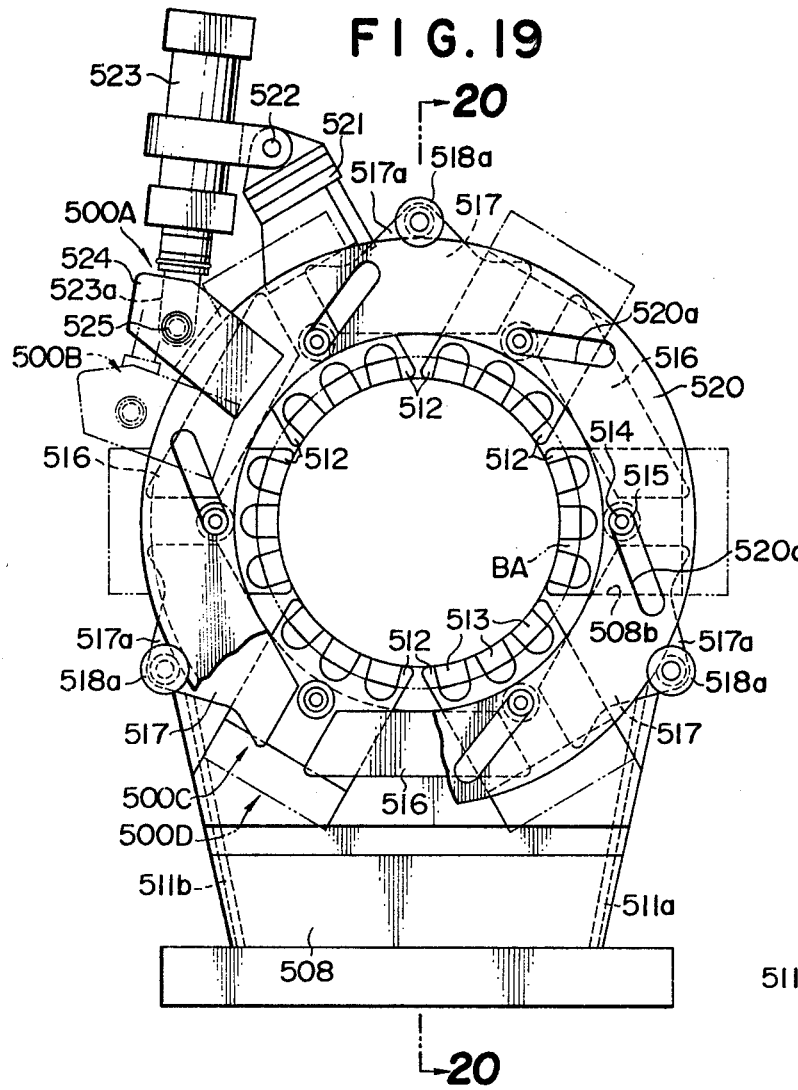
FIG. 19 is an enlarged view as seen from the lines 19—19 of FIG. 17.
Figure 20:
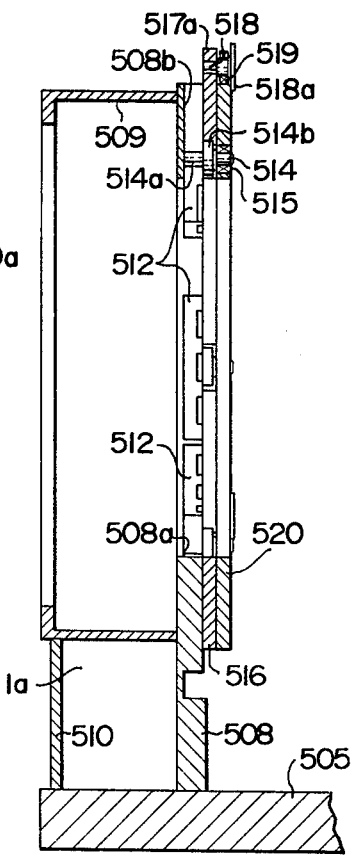
FIG. 20 is a view as seen from the lines 20—20 of FIG. 19.

The fore bead setting arrangement 506 is shown in FIGS. 19 and 20 as comprising a vertical supporting plate 508 securely mounted on the fore end portion of the movable base structure 505 and having a circular opening 508a in concentrical relation with the tire band building drum 101 or 101' disposed at the first station 100A in the operating state. On the fore face of the vertical supporting plate 508 in concentrical relation with the circular opening 508a is securely mounted a reinforcing cylindrical member 509 which is in turn rigidly supported on a vertical reinforcing plate 510 secured to the upper face of the movable base structure 510. A pair of vertical reinforcing side plates 511a and 511b are provided between the vertical supporting plate 508 and the vertical reinforcing plate 510 on the movable base structure 510 in symmetrical relation with a vertical plane passing through the center of the circular opening 508a and each has both axial ends securely connected to the inner faces of the vertical supporting plate 508 and the vertical reinforcing plate 510. On the rear face of the supporting plate 508 are formed equiangularly six radial slide grooves 508b in each of which a bead retaining segment 512 is slidably fitted. The radially inner faces of the bead retaining segments 512 are each contoured in the form of an arcuate shape and collectively define a circle. Attached to the radially inner and portion of each bead retaining segment 512 are three bead retaining magnets 513 so that an annular bead BA may be readily and reliably retained by the bead retaining segments 512 while being held attracted by eighteen bead retaining magnets 513 in all. A guide pin 514 has a force portion 514a fitted into a small bore formed in each of the bead retaining segments 512, and a flange portion 514b attached to the rear half of each of the bead retaining segments 512. On the axial portion of the guide pin 514 extending rearwardly of the flange portion 514b is carried a bearing 515. On the rear face of the vertical supporting plate 508 is provided three urging plates 516 which are circumferentially equi-distantly arranged so that each urging plate 516 may concurrently urge the adjacent two bead retaining segments 512, allowing radial movement of the guide pin 514. Other three urging plates 517 are each also provided on the rear face of the vertical supporting plate 508 and between the adjacent two urging plates 516 so that each urging plate 517 concurrently may urge the adjacent two bead retaining segments 512, allowing radial movement of the guide pin 514. On the radially outer face of each of the urging plates 517 is integrally formed a radially outwardly extending protrusion 517a to which the fore end portion of a guide member 518 is attached. The guide member 518 has a disc portion 518a at its rear end and carries a bearing 519 on an axially intermediate portion between the disc portion 518a and the protrusion 517a of the urging plate 517. An annular rotary plate 520 is provided rearwardly of the urging plates 516 and 517, having a radially outer face in rolling contact with the bearings 519 and a rear face urged by the disc portions 518a of the guide members 518 for supporting and holding the urging plates 516 and 517. Six guide slots 520a are formed circumferentially equidistantly extending at a properly inclined angle with respect to a radial direction of the annular rotary plate 520 to be engaged with the bearings 515 for guiding the guide pins 514. On the outer surface of the reinforcing cylindrical member 509 is securely mounted a bracket 521 which is pivotally connected by a pivotal pin 522 with a fluid-operated cylinder 523 for supporting the same. The fluid-operated cylinder 523 has a piston rod 523a the leading end of which is pivotally connected by a pivotal pin 525 with a bracket 524 integrally formed on the radially outer face of the annular rotary plate 520. It is thus to be understood that the actuation of the fluid-operated cylinder 523 causes the annular rotary plate 520 to be rotated in counterclockwise and clockwise directions so that the bracket 524 is rotated from an initial operating position 500A shown in solid lines of FIG. 19 to a final operating position 500B shown in phantom lines of the same Figure and vice versa. The rotation of the annular rotary plate 520 results in circumferential dislocation of the guide slots 520a so that the guide pins 514 are moved radially outwardly and inwardly while being restrained by the urging plates 516, 517 and the guide slots 520a. The bead retaining segments 512 are thus moved from initial operating positions 500C shown in solid lines of FIG. 19 to final operating positions 500D shown in phantom lines of the same Figure and vice versa. The rear bead setting arrangement 507 is provided substantially in symmetrical relation with respect to an intermediate or median vertical plane equally spaced from the fore and rear ends of the movable base structure 505, the vertical plane being perpendicular to the rotational axis of the tire band building drum 101 or 101' positioned at the first station 100A in the operating position. The constitutional elements of the rear bead setting arrangement 507 are likewise substantially in symmetrical relation with those of the fore bead setting arrangement 506 so that the reference numerals for indicating the constitutional elements of the rear bead setting arrangement 507 are primed bearing the reference numerals which indicate those of the fore bead setting arrangement 506, thereby omitting their detailed description thereon. On the underside of the movable base structure 505 is securely mounted a laterally extending bracket 526 which has both ends securely connected to the fore legs 503 and 503', the laterally intermediate fore face of the bracket 526 being securely connected with a piston rod 527a of a fluid-operated cylinder 527 which is attached onto the fore end portion of the bead setter frame 501 in parallel to the guide rails 502 and 502'. It is thus to be noted that when the fluid-operated cylinder 527 is actuated to cause the piston rod 527a to be projected and retracted the movable base structure 505, the rear and fore bead setting arrangements 506 and 507 are moved from a fore bead retaining position 500E shown in phantom lines to a final operating position 500H also shown in phantom lines through an initial operating position 500F shown in phantom lines and a rear bead retaining position 500G as seen in FIG. 17 and vice versa.

Bead Servicer Mechanism

Figure 21:
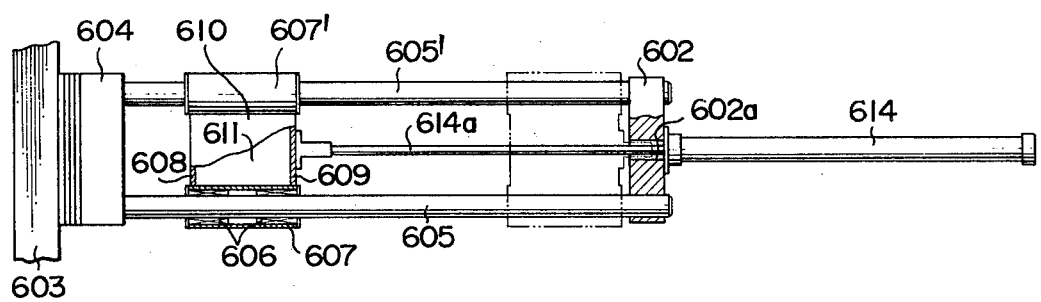
FIG. 21 is a view as seen from the lines 21—21 of FIG. 18.

As best shown in FIGS. 17, 18 and 21, an upstanding bead servicer supporting post 601 is reforcedly attached onto the lateral portion of the bead setter frame 501 remote from the fixed base structure 401 and adapted to securely mounted thereon a rear bracket 602. Spaced from and above the tire band building drums 101, 101', the tire building drum 201 and the belt building drum 301 is provided a horizontal ceiling bracket 603 having both longitudinal ends securely supported on the tire band producing frame 102 and the tire producing frame 202 by suitable upstanding posts not shown. A pair of spaced parallel guide rods 605 and 605' are secured at both ends to the rear bracket 602 and a fore bracket 604 attached to the horizontal ceiling bracket 603 in opposing relation with the rear bracket 602 in such a manner that the guide rods 605 and 605' are substantially in perpendicular relation with the tire band building drum 101 and 101' positioned at the first station 100A in the operating state and are slanted upwardly toward the fore bracket 604. A pair of slide cylinders 607 and 607' each accommodating therein ball bearings 606 are slidably received on the guide rods 605 and 605', respectively, and securely support both ends of spaced parallel fore and rear connecting plates 608 and 609 which have lower and upper faces securely connected with upper and lower connecting plates 610 and 611. On the lower face of the lower connecting plate 611 is securely mounted a vertically depending bracket 612 which is adapted to support a bead retaining drum 613 having an axis in parallel with the tire band building drums 101 and 101' of the operating state. The bead retaining drum 613 has at both axial end faces a pair of annular rings 613a and 613a' each of which has an outer diameter substantially equal to the inner diameter of an annular bead BA to be mounted thereon. A pair of annular beads BA can thus be fitted over and retained on the annular rings 613a and 613a', respectively, of the bead retaining drum 613. On the central rear face of the rear bracket 602 is securely mounted a fluid-operated cylinder, in parallel with the guide rods 605 and 605', which has a piston rod 614a extending throughout a bore 602a formed in the rear bracket 602 to be secured to the rear face of the rear connecting plate 609. It is thus to be understood that the bead retaining drum 613 is moved from an initial operating position 600A shown in solid lines of FIGS. 17 and 18 to a final operating position 600B shown in phantom lines of the same Figures and vice versa when the fluid-operated cylinder 614 is actuated to cause the piston rod 614a to be projected and retracted.

Green Case Building Servicer Mechanism

As best shown in FIGS. 22 to 25, a fixed frame generally designated at 701 and constructed of channel steels is located adjacent to and in perpendicular relation with the rotational axis of the tire band building drum 101 or 101' positioned at the first station 100A, and comprises a pair of spaced parallel rear columns 701a a pair of spaced parallel intermediate columns 701b spaced from the pair of rear columns 701a toward the tire band building drums 101 and 101' and adapted to be higher than those of the rear columns 701a a pair of spaced parallel fore columns 701c spaced from the pair of intermediate columns 701b and adapted to have substantially the same height to the intermediate columns 701b, a pair of rear side beams 701d each having a rear end securely connected to the upper portion of the rear column 701a and a fore end securely connected to the upper portion of the intermediate column 701b so as to be slanted upwardly toward the intermediate column 701b, a pair of horizontal fore side beams 701e each having a rear end securely connected to the upper portion of the intermediate column 701b and a fore end securely connected to the upper portion of the fore column 701c, a horizontal rear upper beam 701f securely connected at both longitudinal ends to the upper portions of the rear columns 701a, a horizontal intermediate upper beam 701g securely connected at both longitudinal ends to the upper portions of the intermediate columns 701b, and a horizontal fore upper beam 701h securely connected at both longitudinal ends to the upper portions of the fore columns 701c. A pair of spaced parallel inner liner frames 702 and 702' are securely mounted on the intermediate and fore upper beams 701g and 701h and extend toward the rear upper beam 701f but terminate before the rear upper beam 701f, while being slanted downwardly toward the rear upper beam 701f at an inclined angle substantially equal to that of the rear side beam 701d. A rotary shaft 703 is rotatably supported at both ends on the rear end portions of the inner liner frames 702 and 702' while another rotary shaft 704 is also rotatably supported at both ends on the fore end portions of the inner frames 702 and 702', the rotary shafts 703 and 704 being substantially in parallel with the rotational axes of the tire band building drums 101 and 101'. The rotary shafts 703 and 704 are designed to fixedly carry a plurality of spaced sprocket wheels 705 and 706 (see FIG. 26) around which are stretched a corresponding number of endless chains 707 having a number of pointed pins extending outwardly thereof but not shown. Disposed between and in parallel relation with the rotary shafts 703 and 704 are a predetermined number of intermediate rotary shafts 708 each having both ends securely connected to the inner liner frames 702 and 702' and each carrying thereon a plurality of spaced sprocket wheels 709 in meshing engagement with the endless chains 707 to impart an appropriate level of tension. In order to prevent an inner liner I from falling between the endless chains 707 a plurality of inner liner sustaining plates 710 are provided along and between the endless chains 707 to extend from the rotary shaft 703 to the rotary shaft 704. On the rear end of an inner liner supplying conveyor, generally designated at 711a as constructed above and disposed between the opposing rear and fore side beams 701d and 701e is provided an inner liner meander adjusting arrangement generally indicated at 711b which is not directly concerned with the features of the present invention, thereby omitting the detailed description on its construction hereinafter. The inner liner supplying conveyor 711a and the inner liner meander adjusting arrangement 711b constitute an inner liner supplying conveyor mechanism generally represented by the reference numeral 711 and drivingly operated by a driving mechanism generally designated at 712 which will become apparent as the description proceeds.

Figure 26:
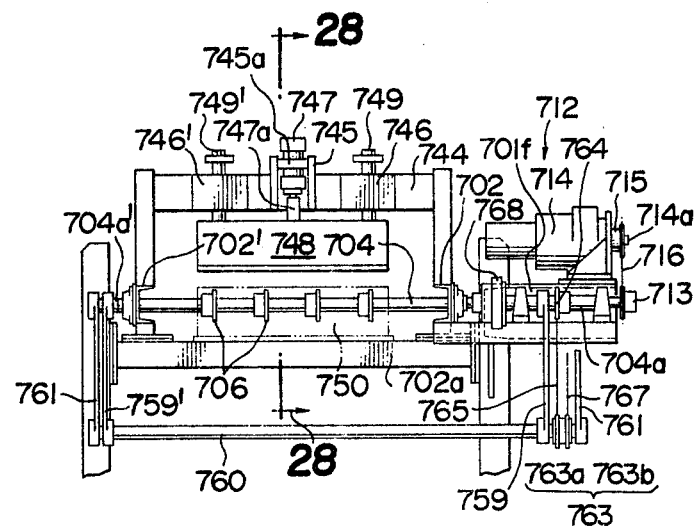
FIG. 26 is a view as seen from the lines 26—26 of FIG. 23.

The fore rotary shaft 704 is shown in FIG. 26 as having axial end portions 704a and 704a' extending outwardly of the inner liner frames 702 and 702', the axial end portion 704a securely carrying thereon a sprocket wheel 713. On the upper end of the fore column 701c is securely mounted a bracket 701i on which is in turn securely mounted an electric motor 714 having an output shaft 714a. A sprocket wheel 715 is securely carried on the output shaft 714a and has a driving connection with the sprocket wheel 713 by an endless chain 716 passed thereon. It is thus to be noted that when the electric motor 714 is energized to be rotated, the fore rotary shaft 704 is rotated by way of the sprocket wheel 715, the endless chain 716 and the sprocket wheel 713 to cause the endless chains 707 with a number of pointed pins to be driven through the rear and intermediate rotary shafts 703, 708 and the sprocket wheels 705, 706, 709 so that the inner liner I is successively conveyed on and by the inner liner supplying conveyor mechanism 711 after being meandered by the liner meander adjusting arrangement 711b. At this time, the inner liner I is reliably held by the endless chains 707 whose pointed pins pierce the inner liner I so that it is smoothly transferred on the conveyor mechanism 711 without slipping down by its gravity even if the conveyor mechanism 711 is slanted. Rearwardly of the rear columns 701a is provided an inner liner unwinding mechanism generally indicated at 717 which will be described in greater detailed hereinlater.

Figure 27:
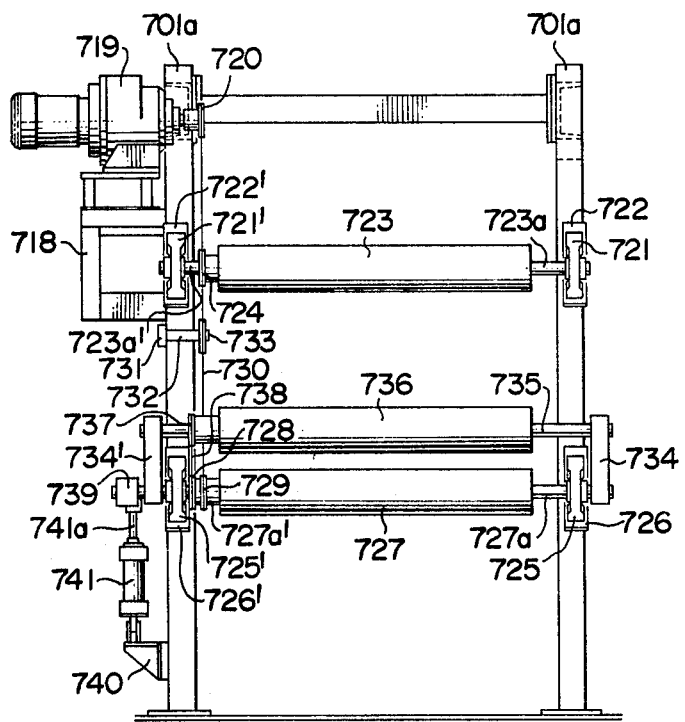
FIG. 27 is a view as seen from the lines 27—27 of FIG. 22.

On the upper portion of the rear column 701a is securely mounted a bracket 718 on which is mounted an electric motor 719 having an output shaft 719a securely carrying thereon a sprocket wheel 720. As will be seen in FIG. 27, a pair of bearing supporting brackets 722 and 722' are secured to the rear columns 710a in same height below the bracket 718 and respectively carry thereon ball bearings 721 and 721'. An inner liner unwinding roll 723 has both ends attached with rotary shafts 723a and 723' rotatably supported by the ball bearing 721 and 721', respectively, the rotary shaft 723a' securely carrying a sprocket wheel 724 inwardly of the ball bearing 721'. Further below the brackets 722 and 722' a pair of bearing supporting brackets 726 and 726' are also secured to the rear columns 710a in same height and respectively carry thereon ball bearings 725 and 725'. An winding roll 727 has at both ends a rotary shaft 727a' and a pivotal rod 727a extending throughout the roll 727 and the rotary shaft 727a' and rotatably supported by the ball bearings 725 and 725', respectively, the rotary shaft 727a' carrying a pair of sprocket wheels 728 and 729 juxtaposed inwardly of the ball bearing 726'. An endless chain 730 is stretched over the sprocket wheels 720, 724 and 729 and imparted an appropriate tension by an intermediate sprocket wheel 733 which is securely carried on a rotary shaft 732 rotatably supported on a bracket 731. The bracket 731 is secured to the rear column 701a between the sprocket wheels 724 and 729. On the axial end portions of the pivotal rod 727a outwardly of the ball bearings 725 and 725' are securely mounted on a pair of lockable arms 734 and 734' which have respective free ends rotatably supporting a rotary shaft 735 of a winding roll 736. On the axial position of the rotary shaft 735 in vertical alignment with the sprocket wheel 728 on the rotary shaft 727a' of the winding roller 727 is securely mounted a sprocket wheel 737 which is in driving association with the sprocket wheel 728 by an endless chain 738 assembled thereon. A link lever 739 is securely connected at one end to the axial portion of the pivotal rod 727a outwardly of the lockable arm 734' and pivotally connected at the other end to a piston rod 741a of a fluid-operated cylinder 741 which has a bottom end pivotally connected with a bracket 740 secured to the rear column 701a. The winding roll 736 is thus swung round the pivotal rod 727a to move the winding roll 736 downwardly and upwardly into contact with and into disengagement from a liner roll LR through the link lever 739, the pivotal rod 727a and the lockable arms 734, 734' when the fluid-operated cylinder 741 is actuated to cause the piston rod 741a to be projected and retracted. A guide rail 742 is laid on the ground rearwardly of the rear columns 701a in parallel with the rotational axes of the tire band building drums 101 and 101' to guide a guide wheel 743a rotatably retained under the lower central portion of an inner liner truck generally indicated at 743. The inner liner truck 743 is thus stationed at a desired position backwardly of rear columns 701a with the axis of a inner liner roll IR in parallel to the rotational axes of the tire band building drums 101 and 101'. Further, the inner liner truck 743 is constructed of channel steels and pipes, having four travelling wheels 743b under four corners thereof and rotatably supporting the liner roll LR and an inner liner roll IR in side-by-side relation. The inner liner roll IR is to jointly wind around itself an inner liner I and a liner L made of cotton, synthetic fibers and the like to be underlaid on the reverse side of the inner liner I for preventing the wound inner liner I from adhering to each other, while the liner roll LR is to wind only the liner L unwound from the inner liner roll IR around itself. When the electric motor 719 is thus energized to be rotated, the unwinding roll 723 is rotated through the sprocket wheel 720, the endless chain 730 and the sprocket wheel 724 so that the inner liner I is successively unwound from the inner liner roll IR and fed to the inner liner supplying conveyor mechanism 711 by the unwinding roll 723. The rotational torque of the unwinding roll 719 is transmitted to the winding roll 736 through the sprocket wheel 720, the endless chain 730, the sprocket wheels 729 and 728, the endless chain 738 and the sprocket wheel 737. At this time, the frictional contact of the winding roll 736 with the inner liner roll IR by the actuation of the fluid-operated cylinder 741 causes the inner liner roll IR to be rotated so that the liner L is wound around the liner roll LR while being unwound from the inner liner roll IR by the unwinding roll 736.

Referring again to FIG. 26, a cutter supporting bracket 744 is provided at the inner liner supplying conveyor mechanism 711 in parallel relation with the rotational axes of the tire band building drums 101 and 101' to have both ends securely connected to the inner liner frames 702 and 702' while having at its longitudinally intermediate fore face a cylinder bracket 745 rotatably supporting a fluid-operated cylinder 747 through a pivotal pin 745a. Fixed to the cutter supporting bracket 745 in symmetrical relation with respect to the fluid-operated cylinder 745 are a pair of guide brackets 746 and 746' each of which is adapted to receive therein a ball bearing not shown. The fluid-operated cylinder 747 has a piston rod 747a the leading end of which is pivotally connected to the upper central portion of an inner liner cutter 748 through a pivotal pin 748a. On the upper portions of the inner liner cutter 748 in symmetrical relation with respect to the piston rod 747a of the fluid-operated cylinder 747 are securely mounted a pair of vertical guide rods 749 and 749' which are adapted to slidably inserted into the ball bearings respectively received in the guide brackets 746 and 746' not only to hold the inner liner cutter 748 in parallel relation with the axes of the tire band building drums 101 and 101' but also to ensure the smooth vertical movement of the inner liner cutter 748 by preventing it from rotation around the piston rod 747a of the fluid-operated cylinder 747.

Figure 28:
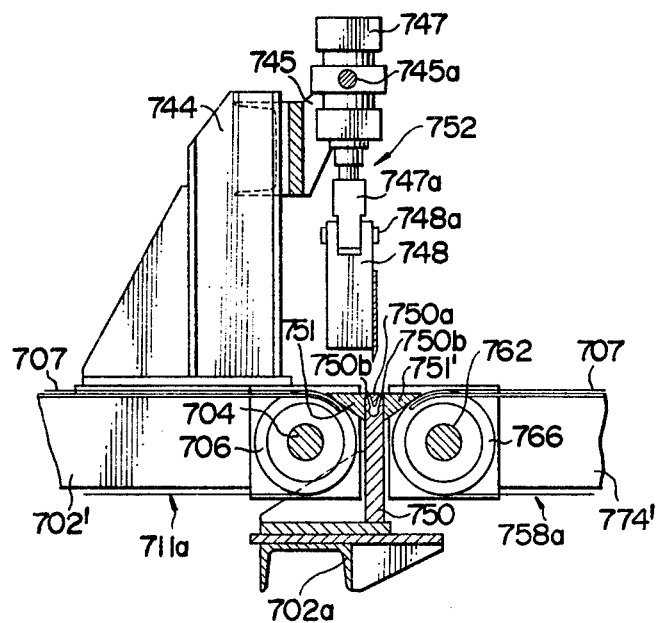
FIG. 28 is an enlarged view as seen from the lines 28—28 of FIG. 26.

A cutter abutting member 750 is shown in FIG. 28 as disposed immediately below the inner liner cutter 748 to cut the inner liner I in cooperation with the inner liner cutter 748 and having a lower half securely connected to a horizontal bracket 702a horizontally extending below the inner liner frames 702 and 702'. To the fore and rear upper faces of the cutter abutting member 750 is symmetrical relation therewith are secured inner liner supporting members 751 and 751' each having a triangular cross-section in a perpendicular direction to its longitudinal direction and having upper faces to be in substantially the same level with that of the cutter abutting member 750 and the upper travelling faces of the endless chains 707. A laterally extending bore 750a is formed in the upper portion of the cutter abutting member 750 in which two laterally extending air passages 750b are in turn formed in the form of a V-shape having lower ends connected to the laterally extending bore 740 and upper ends opened through a number of air nozzles longitudinally spacedly arranged at the upper face of the cutter abutting member 750. Compressed air fed into the bore 750a from a suitable compressed air source not shown is normally ejected through the air nozzles so that the inner liner just cut by the inner liner cutter 748 is prevented from adhering to any one of the cutter abutting member 750 and the inner liner supporting members 751 and 751'. An inner liner cutting mechanism generally designated at 752 which is thus constituted by the fluid-operated cylinder 747, the inner liner cutter 748, the cutter abutting member 750 and the inner liner supporting members 751, 751' and so on is positioned in close proximity of the fore end of the inner liner supplying conveyor mechanism 711 so that the actuation of the fluid-operated cylinder 747 to project the piston rod 747a causes the inner liner cutter 748 to vertically descend while the guide rods 749 and 749' being respectively guided by the guide brackets 746 and 746', thereby cutting instantly the inner liner I fed onto the inner liner supporting members 751, 751' and the cutter abutting member 750 from the inner liner supplying conveyor mechanism 711.

Figure 23:
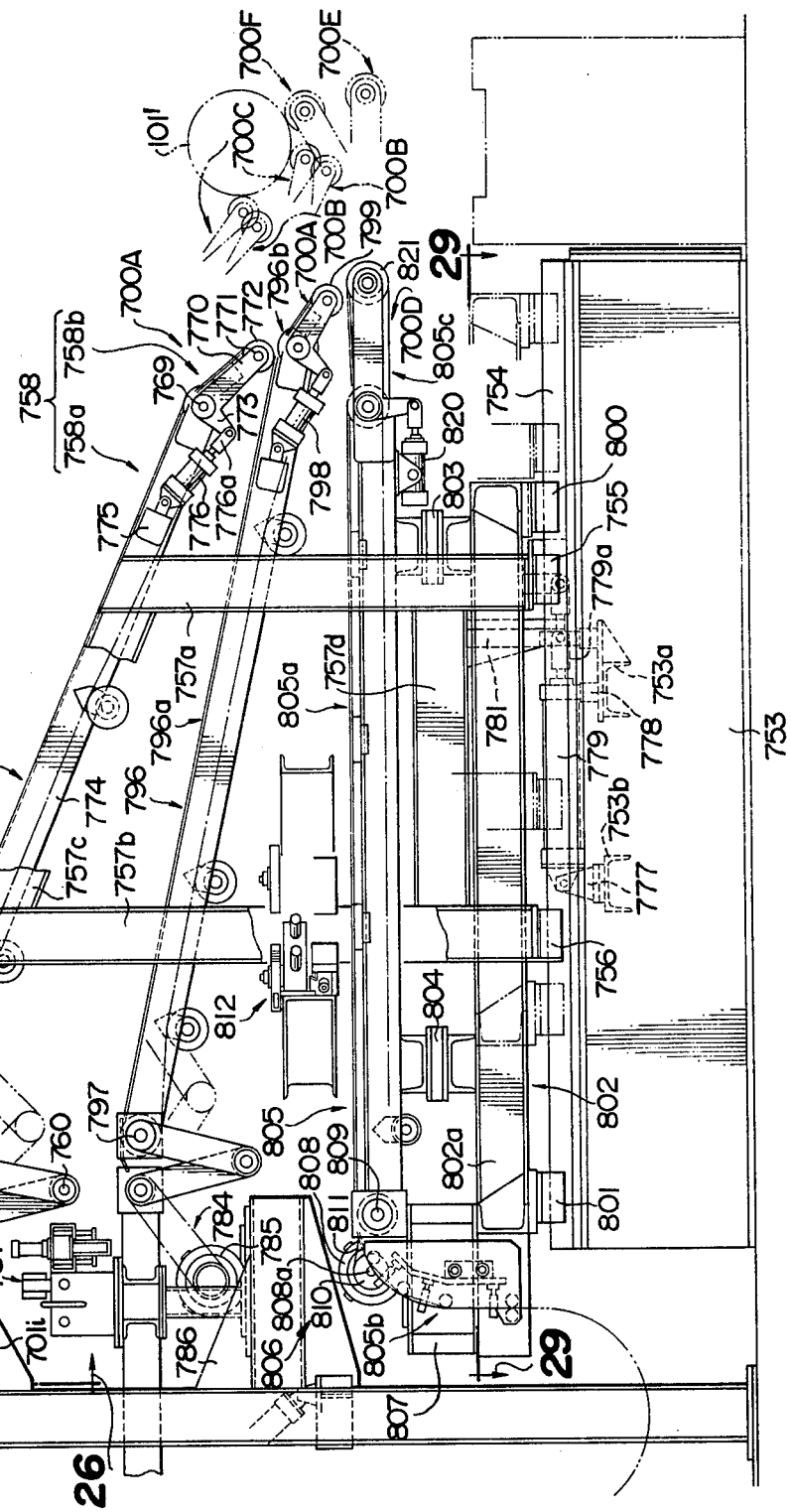
FIG. 23 is an enlarged view as seen from the lines 23—23 of FIG. 1.
Figure 24:
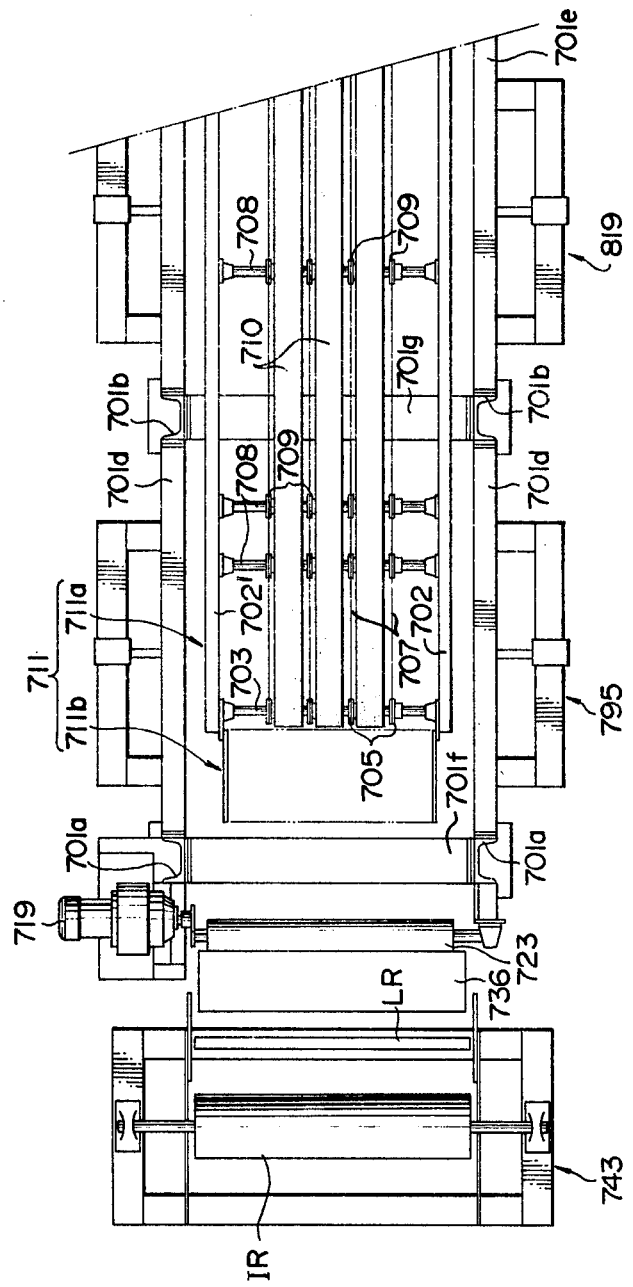
FIG. 24 is a view as seen from the lines 24—24 of FIG. 22.
Figure 25:
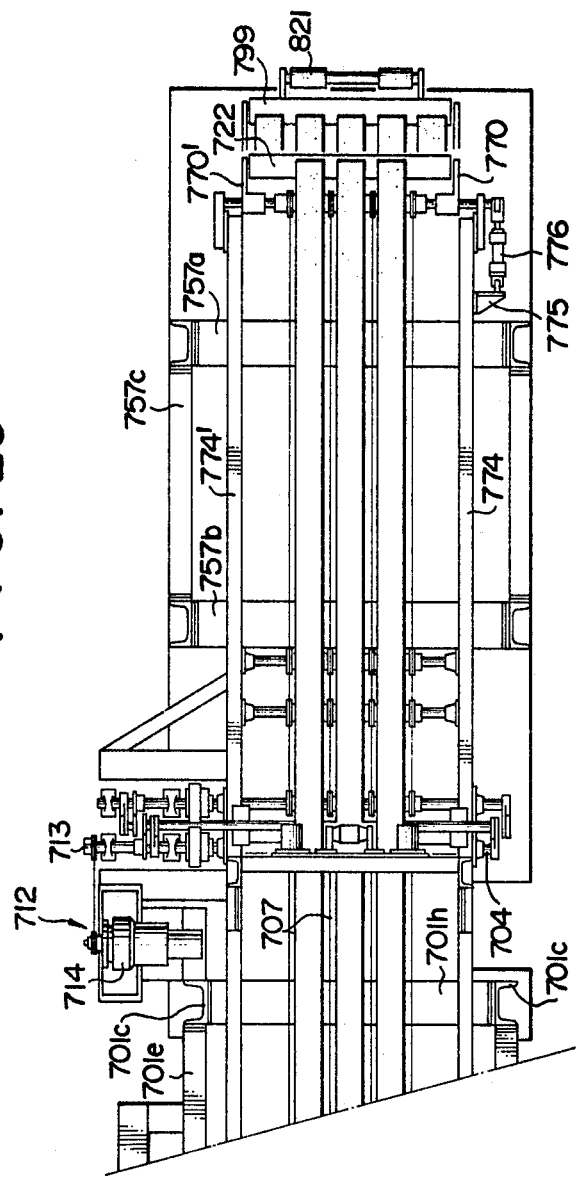
FIG. 25 is a view as seen from the lines 25—25 of FIGS. 22 and 23.

A base frame structure 753 is best shown in FIG. 23 as located forwardly of the fixed frame 701 and constructed of channel steels, having thereon a pair of spaced parallel guide rails 754 and 754' in perpendicular relation with the rotational axes of the tire band building drums 101 and 101'. The guide rails 754 and 754' are different in length from the guide rails 402 and 402' but constructed in entirely the same manner, each having a substantially inverse-triangular shape in cross-section. The guide rail 754' is not appeared in the drawings but located oppositely to and behind the guide rail 754. A movable frame generally denoted at 757 has a pair of force spaced legs 755 and 755' formed on the fore lower surface thereof and a pair of rear spaced legs 756 and 756' formed on the rear lower surface thereof, the fore and rear legs 755, 755', 756 and 756' being each formed with a groove in the form of a substantially semicircular shape in cross-section. The movable frame 757 is adapted to be slidably movable on and along the parallel guide rails 754 and 754' with the grooves of the fore and rear legs 755 and 756 in sliding engagement with the guide rail 754 and with the grooves of the fore and rear legs 755' and 756' also in sliding engagement with the guide rail 754'. The fore and rear legs 755' and 756' are not shown in the drawings but respectively located oppositely to and behind the fore and rear legs 755 and 756. The movable frame constructed of channel steels is disposed between the fixed frame 701 and the tire band building drum 101 or 101' positioned at the first station 100A in perpendicular relation with the rotational axis of the tire band building drums 101 and 101', and comprises a pair of spaced parallel fore columns 757a adjacent to the tire band building drums 101 and 101', a pair of spaced parallel rear columns 757b spaced away from the pair of the fore columns 757a toward the fixed frame 710 and adapted to be higher than the fore columns 757a, a pair of upper side beams 757c secured to the upper portions of the fore and rear columns 757a and 757b to be slanted downwardly toward the tire band building drums 101 and 101', and a pair of lower side beams 757d horizontally secured to the lower portions of the fore and rear columns 757a and 757b. On the upper portion of the movable frame 757 is mounted an inner liner applying mechanism generally indicated at 758 which is slanted downwardly toward the tire band building drums 101 and 101' and which comprises an inner liner supplying conveyor generally designated at 758a and an inner liner applying arrangement generally indicated at 758b. The inner liner supplying conveyor 758a is constructed in substantially the same fashion to the inner liner supplying conveyor 711a on the fixed frame 701 so that there will not be described about its detailed construction. Referring again to FIG. 26, a rear connecting arm 759 is rotatably connected at one end to the axial portion 704a of the rotary shaft 704 inwardly of the sprocket wheel 713 and another rear connecting arm 759' is rotatably connected at one end to the axial portion 704a' of the rotary shaft 704, the connecting arms 759 and 759' rotatably supporting both ends of the intermediate shaft 760 at the other ends thereof. A fore connecting arm 761 has one end rotatably connected with the intermediate shaft 760 outwardly of the rear connecting 759, and another fore connecting arm 761' has one end rotatably connected with the intermediate shaft 760 outwardly of the rear connecting arm 759', the other ends of the fore connecting arms 759 and 759' being rotatably connected with both end portions of the rotary shaft of a rear roller of the inner liner supplying conveyor 758a on the movable frame 757. On the intermediate shaft 760 between the rear connecting arm 759 and the fore connecting arm 761 is securely mounted an intermediate sprocket means 763 which has two juxtaposed sprocket wheels 763a and 763b. The sprocket wheel 763a is drivingly connected with the sprocket wheel 764 securely mounted on the axial portion 704a of the fore rotary shaft 704 through an endless chain 765 passed thereon, while the sprocket wheel 763b is likewise drivingly connected with a sprocket wheel 766 securely mounted on a rear rotary shaft 762 of the inner liner supplying conveyor 758a on the movable frame 757 by an endless chain 767 passed thereon. A power clutch 768 is provided on the axial portion 704a of the fore rotary shaft 704 between the inner liner frame 702 and the rear connecting arm 759 so that engagement of the power clutch 768 causes the rotational torque of the electric motor 715 to be transmitted to the fore rotary shaft 704 as well as to the sprocket wheel 766 through the sprocket wheel 764, the endless chain 765, the intermediate sprocket means 763 and the endless chain 767, thereby driving the inner liner supplying conveyor 758a on the movable frame 757, while disengagement of the power clutch 768 only causes the inner liner supplying conveyor 758a on the movable frame 757 to be driven and does not cause the fore rotary shaft 704 to be driven, thereby not operating the inner liner supplying conveyor mechanism 711. The inner liner supplying arrangement 758b is mounted on the fore end portion of the inner liner supplying conveyor 758a and is constructed as will be understood more clearly hereinafter. As will be seen in FIGS. 25 and 26, a pair of crank arms 770 and 770' are securely carried on the both end portions of the fore rotary shaft 769 of the inner liner supplying conveyor 758a and rotatably support at their fore ends an urging roll 772 through its rotary shaft 771 in parallel relation with the rotational axes of the tire band building drums 101 and 101'. The rear end 773 of the crank arms 770 is pivotally connected to a piston rod 776a of a fluid-operated cylinder 776 which has a bottom end pivotally connected to a bracket 775 secured to the inner liner frame 774. When the fluid-operated cylinder 776 is thus operated to cause the piston rod 776a to be projected and retracted, the urging roll 772 is swung upwardly and downwardly around the rotary shaft 769 from and to an initial operating position 700A in solid lines under the state that the movable frame 757 has been moved away from the tire band building drum 101 or 101' in the first station 100A, while being swung from a second operating position 700B shown in phantom lines to a third operating position 700C also shown in phantom lines and vice versa under the state that the movable frame 757 has been moved toward the tire band building drum 101 or 101' in the first station 100A as shown in FIG. 23.

Figure 22:
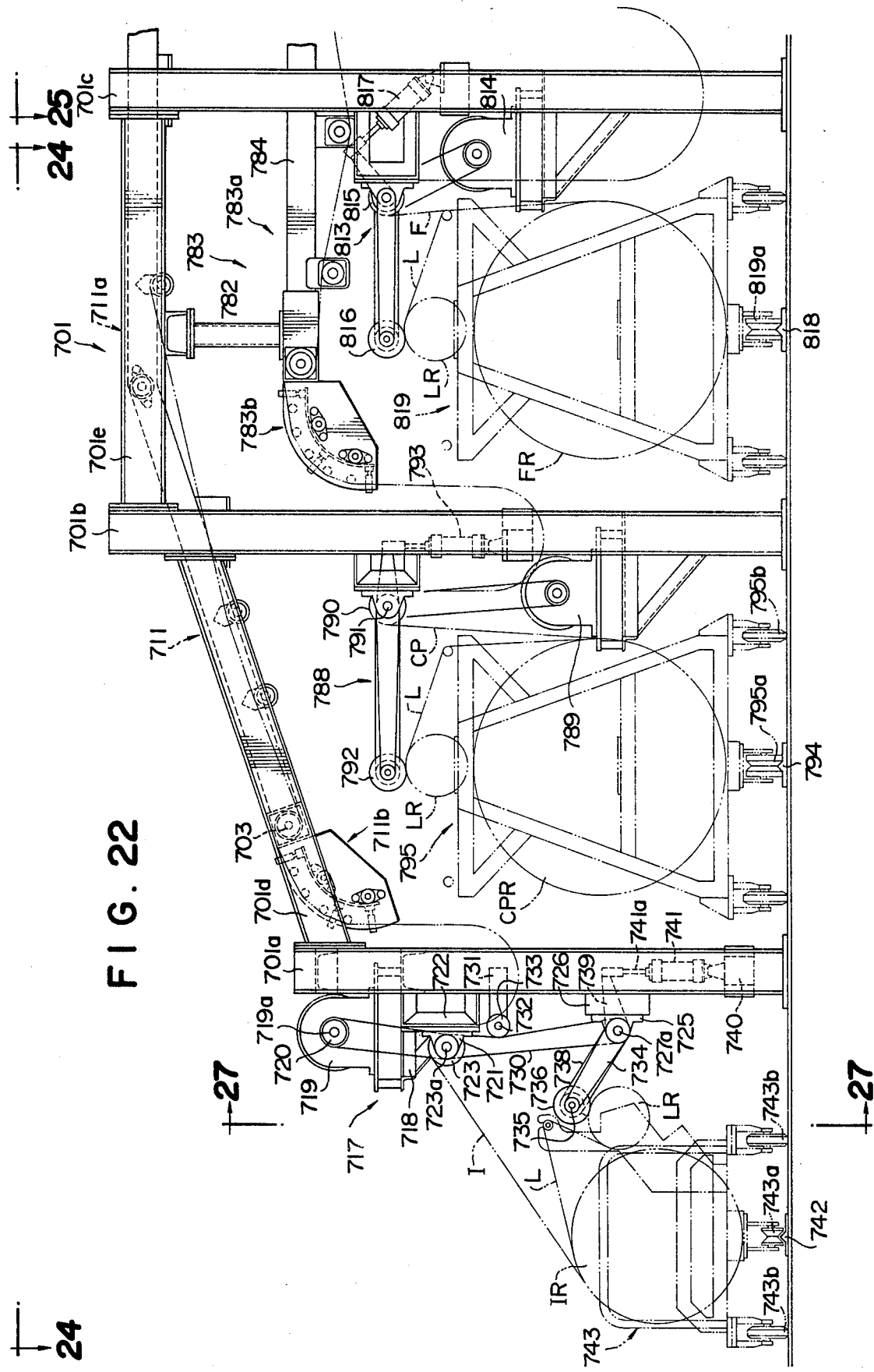
FIG. 22 is an enlarged view as seen from the lines 22—22 of FIG. 1.
Figure 29:
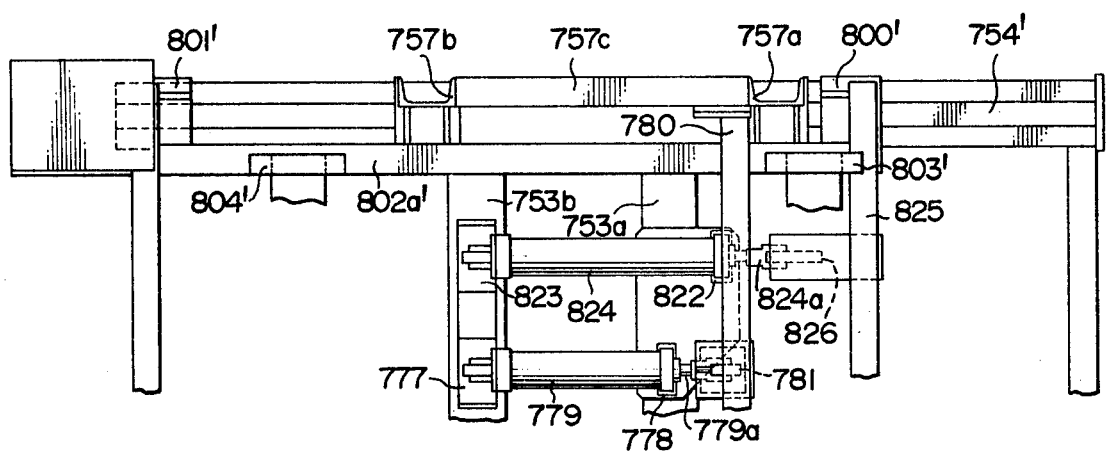
FIG. 29 is a view as seen from the lines 29—29 of FIG. 23.

There are best shown in FIG. 29 a fore horizontal beam 753a and a rear horizontal beam 753b respectively having thereon brackets 778 and 777 which are adapted to rigidly support a fluid-operated cylinder 779 for movement of the movable frame 757. The fluid-operated cylinder 779 has a piston rod 779a pivotally connected to a bracket 781 which is fixedly connected to the lower face of a fore reinforcing member 780 having both ends securely connected to the fore legs 755 and 755' dependent from the lower face of the movable frame 757. When the fluid-operated cylinder 779 is thus actuated to cause the piston rod 799a to be projected and retracted, the movable frame 757 is moved from an initial operating position 700A shown in solid lines of FIG. 23 to a second operating position 700B shown in phantom lines of the same Figure and vice versa. By the movement of the movable frame 757, the inner liner supplying conveyor 758 is moved toward and away from the opposing inner liner supplying conveyor 711 and the tire band building drum 101 or 101' in the first station 100A. At this time, the electric motor 714 concurrently imparts rotation to the inner liner supplying conveyors 711 and 758 the latter of which is driven through the sprocket wheel 764, the endless chain 765, the sprocket means 763 and the endless chain 767 since the inner liner supplying conveyors 711 and 758 are connected with each other by the fore and rear connecting arms 759, 759', 761, 761' and the intermediate shaft 760. As best shown in FIG. 22, a pair of dependent brackets 782 and 782' are secured to the longitudinally intermediate portions of the side beams 701e of the fixed frame 701 and have respective lower ends securely carrying a pair of spaced parallel carcass ply frames 784 and 784' of a carcass ply supplying conveyor generally indicated at 783a constituting a carcass ply supply conveyor mechanism generally indicated at 783. The dependent bracket 782' is not shown in FIG. 22 but located opposingly to and behind the dependent bracket 782, while the carcass ply frame 784' is not shown in FIG. 22 but disposed opposingly to and behind the carcass ply frame 784. A carcass ply meander adjusting mechanism generally designated at 783b which is provided at the rear end of the carcass ply supplying conveyor 783a is of substantially the same construction to the inner liner meander adjusting mechanism 711b provided at the rear end of the inner liner supplying conveyor 711a so that the carcass ply meander adjusting mechanism 783b will not be described particularly about its construction hereinafter. On the other hand, the carcass ply supplying conveyor 783a is also of substantially the same construction to the inner liner supplying conveyor 711a so that the carcass ply supplying conveyor 783a will likewise not be described particularly about its construction hereinafter. A driving mechanism generally designated at 784 for driving the carcass ply supplying conveyor mechanism 783 is also of substantially the same construction to the previously mentioned driving mechanism 712 except for location of an electric motor 785 slightly different from that of the electric motor 714 so that the driving mechanism 784 will similarly not be described particularly about its construction. On the fore intermediate portions of the fore columns 701c of the fixed frame 701 is securely mounted a supporting bracket 786 on which is securely mounted a carcass ply cutting mechanism generally designated at 787. The particular construction of the carcass ply cutting mechanism 787 is not directly concerned with the features of the present invention and thus will not be disclosed hereinlater. A carcass ply unwinding mechanism generally denoted at 788 which is disposed rearwardly of the intermediate columns 701b of the fixed frame 701 is of substantially the same construction to the inner liner unwinding mechanism 717 with exception that location of the electric motor 789 is different from that of the electric motor 719 and that a carcass ply unwinding roll 790 of the carcass ply unwinding mechanism 788 corresponding to the previously mentioned inner liner unwinding roll 723 of the inner liner unwinding mechanism 717 is rotatably supported on a pivotal rod 791 corresponding to the pivotal rod 727a, commonly employing the upper and lower ball bearings 721, 721', 725 and 725' of the inner liner unwinding mechanism 717. The particular construction of the carcass ply unwinding mechanism 788 will therefore not be described hereinafter. Since the carcass ply unwinding mechanism 788 is substantially identical in construction with the inner liner unwinding mechanism 717, it will thus be noted that the carcass ply unwinding roll 790 and the winding roll 792 are simultaneously rotated by the electric motor 789 while the winding roll 792 is brought into engagement with and into disengagement from a liner roll LR to be described hereinlater by the action of a fluid-operated cylinder 793.

A guide rail 794 is laid on the ground between the intermediate columns 701b and the rear columns 701a in parallel with the rotational axes of the tire band building drums 101 and 101' to guide a guide wheel 795a retained under the lower central portion of a carcass ply truck generally indicated at 795. The carcass ply truck 795 is thus stationed at a desired position between the intermediate columns 701b and the rear columns 701a with the axis of a carcass ply roll CPR in parallel with the rotational axes of the tire band building drums 101 and 101'. Further, the carcass ply truck 795 is constructed of channel steels having four travelling wheels 795b under four corners thereof and rotatably supporting the carcass ply roll CPR and the liner roll LR located thereover. The carcass ply roll CPR is to jointly wind around itself a carcass CP and a liner L to be underlaid on the reverse side of the carcass ply CP for preventing the wound carcass ply CP from adhering to each other, while the liner roll LR is to wind only the liner L unwound from the carcass ply roll CPR. When the electric motor 789 is thus energized to be rotated, the carcass ply CP is successively unwound from the carcass ply roll CPR and fed to the carcass ply supplying conveyor mechanism 783 by the carcass ply unwinding roll 790, while the liner L is wound around the liner roll LR which is being under frictional contact with and driven by the carcass ply roll CPR.

A carcass ply applying conveyor mechanism generally designated at 796 is mounted on the movable frame 757 below the inner liner applying conveyor mechanism 758 to be slanted downwardly toward the tire band building drums 101 and 101' and comprises a carcass ply supplying conveyor generally indicated at 796a and a carcass ply applying arrangement generally indicated at 796b in a similar fashion to the inner liner applying conveyor mechanism 758. The carcass ply supplying conveyor 796a is substantially the same in construction to the previously described inner liner supplying conveyor 758a or 711a while the carcass ply applying arrangement 796b is also substantially the same in construction to the previously described inner liner applying arrangement 758b so that they will not be described particularly on their constructions hereinlater. The means connecting between the carcass ply supplying conveyor mechanism 783 and the carcass ply applying conveyor mechanism 796, and the rotation transmitting means from the electric motor 785 to the rear rotary shaft 797 of the carcass ply supplying conveyor mechanism 796 are of substantially the same construction to those of the inner liner supplying conveyor mechanism 711 and the inner liner applying conveyor mechanism 758 which have been previously described so that they will not be described hereinlater about their constructions. Upon actuation of the fluid-operated cylinder 779, the carcass ply applying conveyor mechanism 796 is moved jointly with the inner liner applying conveyor mechanism 758 from an initial operating position 700A shown in solid lines of FIG. 23 to a final operating position 700B shown in phantom lines of the same Figure and vice versa since the carcass ply applying conveyor mechanism 796 is attached to the movable frame 757. Additionally, a fluid-operated cylinder 798 of a carcass ply applying arrangement 796b corresponding to the fluid-operated cylinder 776 of the inner liner applying arrangement 758b causes an urging roller 799 corresponding to the urging roller 772 to be moved upwardly and downwardly from and to an initial operating position 700A shown in solid lines of FIG. 23 under the state that the movable frame 757 is retracted away from the tire band building drums 101 and 101' or to be moved from a second operating position 700B shown in phantom lines to a third operating position 700C also shown in phantom lines and vice versa in FIG. 23 under the state that the movable frame 757 is projected toward the tire band building drums 101 and 101' since the carcass ply applying arrangement 796b is substantially the same in construction to the inner liner applying arrangement 758b. The urging roller 799 is thus engageable with and disengageable from the outer peripheral surface of the tire band building drums 101 or 101' in the first station 100A.

An additional movable frame 802 constructed of channel steels in shown in FIGS. 23 and 29 as comprising a pair of fore legs 800 and 800' forwardly of the fore legs 755 and 755' of the movable frame 757 and a pair of rear legs 801 and 801' rearwardly of the rear legs 756 and 756' of the movable frame 757. Each of the fore and rear legs 800, 800', 801 and 801' of the additional movable frame 802 is substantially the same configuration to each of the fore and rear legs 755, 755', 756 and 756' of the movable frame 757 with the fore and rear legs 800 and 801 in engagement with the guide rail 754 and with the fore and rear legs 800' and 801' in engagement with the guide rail 754'. The additional movable frame 802 has thereon a pair of facing fore supporting brackets 803, 803' and a pair of facing rear supporting brackets 804, 804' spaced rearwardly from the pair of the brackets 803, 803', these brackets supporting thereon a horizontal flipper applying conveyor mechanism generally designated at 805 which comprises a flipper supplying conveyor generally indicated at 805a, a flipper meander adjusting arrangement generally indicated at 805b positioned at the rear end of the flipper supplying conveyor 805a and a flipper applying arrangement generally indicated at 805c positioned at the fore end of the flipper supplying conveyor 805a. The construction of the flipper supplying conveyor 805a is substantially identical to those of the inner liner supplying conveyor 758a and the carcass ply supplying conveyor 796a, thereby omitting its particular description hereinlater.

A driving mechanism 806 for driving the flipper applying conveyor mechanism 805 will be more clarified hereinafter. Extending rearwardly from the rear end of the additional movable frame 802 is securely mounted a supporting bracket 807 on which an electric motor 808 is fixedly mounted having an output shaft 808a securely carrying thereon a sprocket wheel 810. A rear rotary shaft 809 of the flipper applying conveyor 805 also securely carries thereon a sprocket wheel, not shown, which is in driving connection with the sprocket wheel 810 by an endless chain 811 so that the flipper supplying conveyor 805a is driven by the electric motor 808 through the sprocket wheel 810, the endless chain 811, the not shown sprocket wheel and the rear rotary shaft 809. The flipper meander adjusting arrangement 805b is of substantially the same construction to the previously mentioned inner liner meander adjusting arrangement 783b, thereby omitting a particular description about its construction hereinafter. Provided above the central portion of the flipper supplying conveyor 805a at a suitable angle to the axes of the tire band building drums 101 and 101' is a flipper cutting mechanism generally designated at 812 which is of substantially the same construction to the carcass ply cutting mechanism 787 thereby avoiding a particular description about its construction hereinafter. Between the fore and intermediate columns 701c and 701b is provided a flipper unwinding mechanism 813 which is also of substantially the same construction to the carcass ply unwinding mechanism 788 except for location of an electric motor 814 for driving the flipper unwinding mechanism 813 slightly different from that of the electric motor 789 for driving the carcass ply unwinding mechanism 788 thereby also avoiding a particular description for its construction. Since the flipper unwinding mechanism 813 is substantially identical to the carcass ply unwinding mechanism 788, the electric motor 814 causes a flipper unwinding roll 815 and a winding roll 816 to be rotated while a fluid-operated cylinder 817 causes the winding roll 816 to be moved into contact with a liner roll LR which will be described in detail hereinlater.

A guide rail 818 is laid on the ground between the fore and intermediate columns 701c and 701b in parallel relation with the axes of the tire band building drums 101 and 101' to guide a guide wheel 819a retained under the lower central position of a flipper truck generally indicated at 819. The flipper truck 819 is thus stationed at a desired position between the intermediate columns 701b and the fore columns 701c with the axis of a flipper roll FR in parallel to the rotational axes of the tire band building drums 101 and 101'. The flipper truck 819 is substantially identical in construction to the carcass ply truck 795 and rotatably supports the flipper roll FR and a liner roll LR positioned thereover. The flipper roll FR is to jointly wind around itself a flipper F and a liner L to be underlaid on the reverse side of the flipper F for preventing the wound flipper from adhering to each other, while the liner roll LR is to wind only the liner L unwound from the flipper roll FR. When the electric motor 814 is thus energized to be rotated, the flipper F is successively unwound from the flipper roll FR and fed to the flipper applying conveyor mechanism 805 by the flipper unwinding roll 815, while the liner L is wound around the liner roll LR which is being under frictional contact with the flipper roll FR. The flipper applying arrangement 805c is of substantially the same construction to the inner liner applying arrangement 758b and the carcass ply applying arrangement 796b except for its configuration different therefrom so that the flipper applying arrangement 805c will not be described about its construction in detail hereinafter. The urging roller 821 corresponding to the urging rollers 772 and 799 is thus moved towardly and backwardly from and to from an initial operating position 700D shown in solid lines by the action of the fluid-operated cylinder 824, while being moved from a second operating position 700E shown in phantom lines to a third operating position 700F also shown in phantom lines and vice versa be the action of the fluid-operated cylinder 820 under the state that the additional movable frame 802 is projected to the tire building drums 101 and 101' in FIG. 23. The urging roller 821 is thus brought into engagement with the outer peripheral surface of the tire band building drum 101 or 101' positioned in the first station 100A at the third operating position 700F, while being disengaged from the outer peripheral surface of the tire band building drum 101 and 101' of the first station 100A at the second operating position 700E.

As will seen in FIG. 29, a pair of brackets 822 and 823 are securely mounted on the respective fore and rear beams 753a are 753b in juxtaposed relation with the brackets 788 and 777, respectively, and adapted to securely support a fluid-operated cylinder 824 in parallel relation with the fluid-operated cylinder 779. A fore reinforcing beam 825 is provided to have both ends securely connected to opposing parallel horizontal side beams 802a and 802a' of the additional movable frame 802 and to have a lower face onto which is securely mounted a bracket 826 pivotally connected to a piston rod 824a of the fluid-operated cylinder 824. When the fluid-operated cylinder 824 is thus actuated to cause the piston rod 824a to be projected and retracted, the additional movable frame 802 is moved from the initial operating position 700A shown in solid lines of FIG. 23 to the second operating position 700B shown in phantom lines of the same Figure and vice versa, i.e., moved toward and away from the tire band building drum 101 and 101' in the first station 100A.

Belt Building Servicer Mechanism

Figure 30:
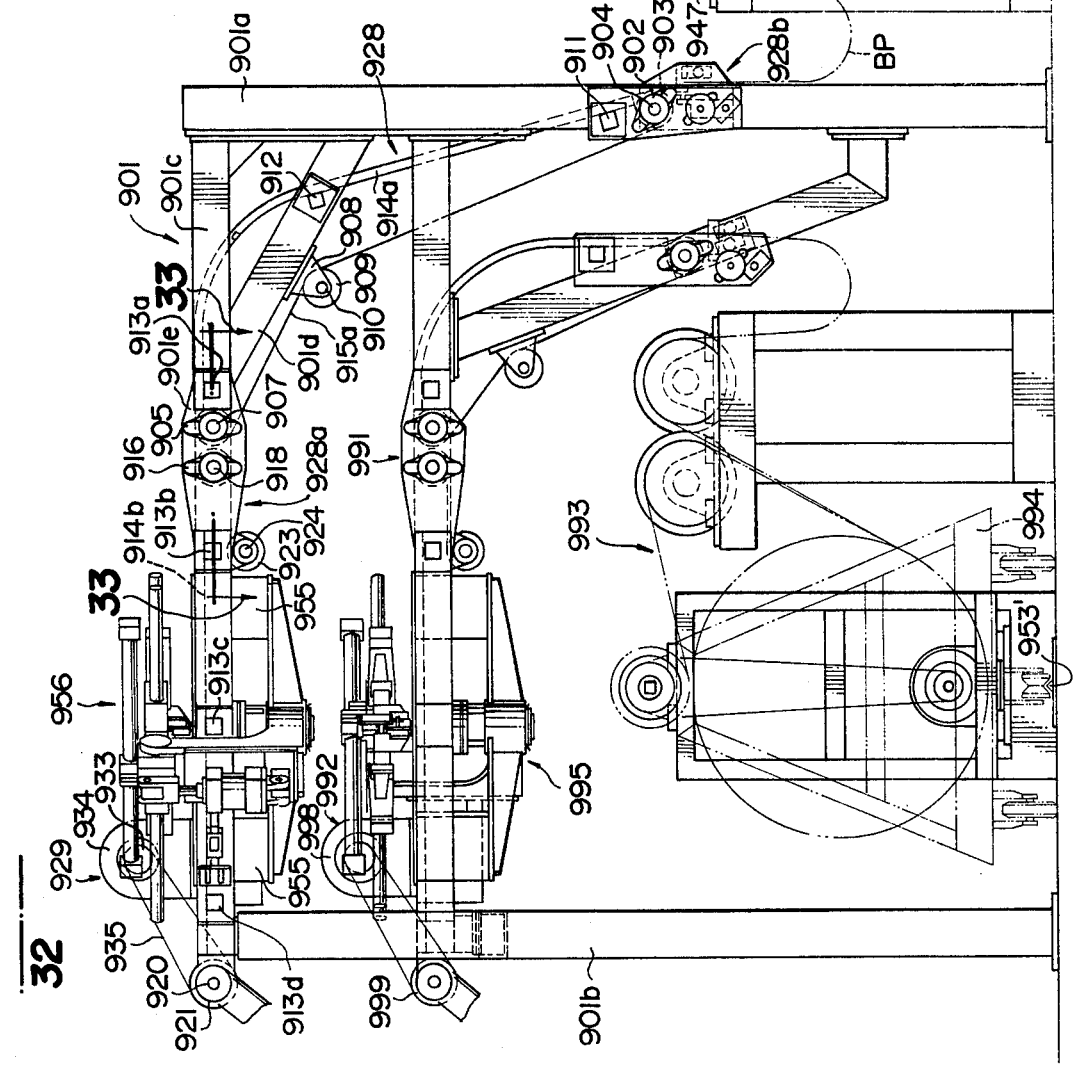
FIG. 30 is an enlarged view as seen from the lines 30—30 of FIG. 1.
Figure 31:
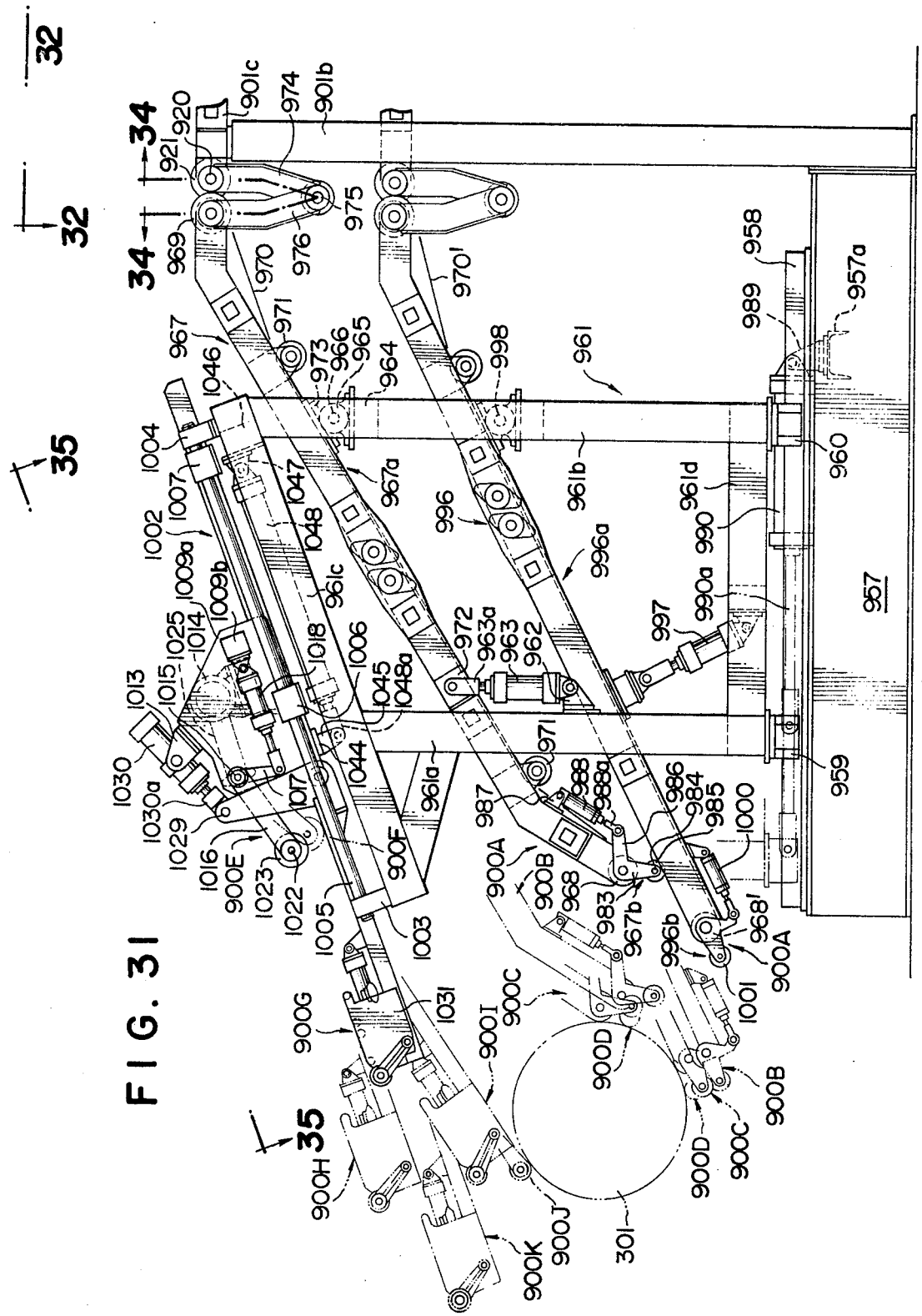
FIG. 31 is an enlarged view as seen from the lines 31—31 of FIG. 1.
Figure 33:
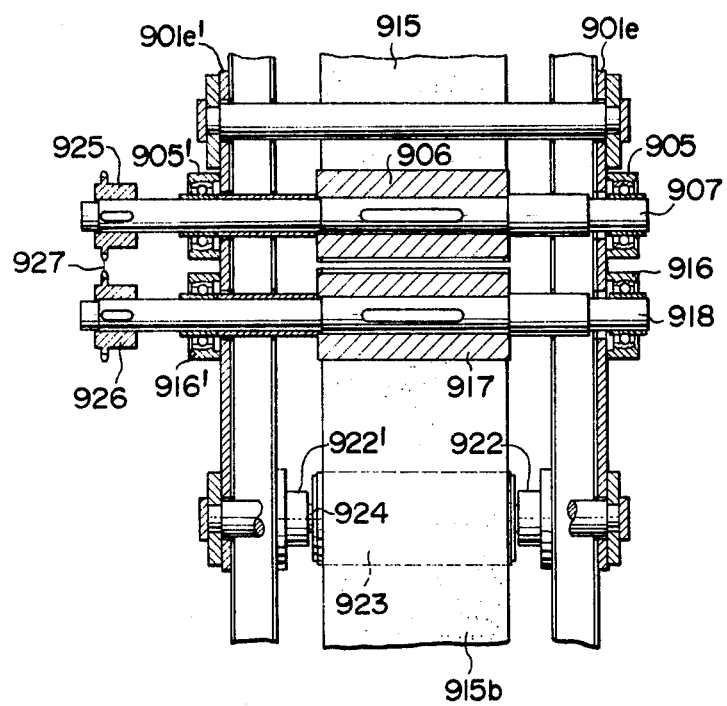
FIG. 33 is an enlarged view as seen from the lines 33—33 of FIG. 30.

As best shown in FIGS. 30 to 31, a fixed frame generally designated at 901 and constructed of channel steels is located, adjacent to and in perpendicular relation with the rotational axis of the belt building drum 301 and comprises a pair of spaced parallel rear columns 901a, a pair of fore columns 901b spaced from the pair of rear columns 901a toward the belt building drum 301 and adapted to be in substantially the same level to those of the rear columns 901a, and a pair of horizontal side beams 901c each having a rear end securely connected to the upper portion of the rear column 901a and a fore end securely connected to the upper portion of the fore column 901b. In order to maintain the side beams 901c horizontal, a pair of reinforcing oblique side beams 901d are provided each having an upper end securely connected to the longitudinally intermediate portion of the side beam 901c and a lower end securely connected to the longitudinally intermediate portion of the rear column 901a. On the outer faces of the rear columns 901a are respectively attached lower ball bearings 902 and 902' which are adapted to rotatably support both ends of a lower rotary shaft 904 of a horizontal lower roller 903. The ball bearings 902' is not shown in the drawings but located opposingly to and behind the ball bearing 902. A pair of rear upper ball bearings 905 and 905' (see FIG. 33) are securely mounted on upper side plates 901e and 901e', respectively, which are attached to the outer faces of the upper side beams 901c, respectively, the ball bearings 905 and 905' rotatably supporting both ends of a rotary shaft 907 of a horizontal rear upper roller 906. The lower faces of the reinforcing oblique side beams 901d securely support brackets 908 and 908' which rotatably support both ends of a rotary shaft 910 of a horizontal intermediate roller 909, the bracket 908' being not shown in the drawings but located opposingly to and behind the bracket 908. On the longitudinally intermediate portions of the rear columns 901a, the reinforcing oblique side beams 901d and the upper side beams 901c are respectively securely mounted lower horizontal brackets 911, intermediate horizontal brackets 912, and upper horizontal brackets 913a, 913b, 913c, 913d; the lower horizontal brackets 911, the intermediate horizontal brackets 912 and the upper horizontal brackets 913a supporting a curved rear belt supporting plate 914a, and the upper horizontal brackets 913b, 913c and 913d also supporting a fore horizontal belt supporting plate 914b. The both longitudinal ends of the curved rear belt supporting plate 914a terminate at positions adjacent to the rear upper roller 906 and the lower roller 903 over which is stretched a rear endless belt 915a having thereon a number of pointed pins and properly tensioned by the horizontal intermediate roller 909 so that the endless belt 915a is slidably rested and travelled on the rear belt supporting plate 914a. A number of permanent magnets (not shown) is the form of a rod are embedded in the rear belt supporting plate 914a, laterally extending and arranged in spaced relation with each other along its longitudinal direction so that a steel cord reinforced breaker ply BP travelled on the rear belt supporting plate 914a is attracted to the rear endless belt 915a by the rear belt supporting plate 914a and preferably conveyed on the rear endless belt 914a while being neither meandered nor elongated. On the outer faces of the upper side plates 901e in side-by-side relation with the rear upper ball bearings 905 and 905' are respectively securely mounted fore upper ball bearings 916 and 916' (see FIG. 33) which rotatably support both ends of a rotary shaft 918 of a horizontal roller 917. Similarly, fore upper ball bearings 919 and 919' (see FIG. 34) are respectively securely mounted on the upper side beams 901c to rotatably support both ends of a rotary shaft 920 of a horizontal roller 921. The lower faces of the upper side beams 901c securely support brackets 922 and 922' which rotatably support both ends of a rotary shaft 924 of a horizontal intermediate roller 923 so as to impart a proper tension to a fore endless belt 915b stretched over the rollers 917 and 921. A fore horizontal belt supporting plate 914b is provided having both longitudinal ends terminating at position adjacent to the rollers 917 and 921 and permits the fore endless belt 915b to travel thereon. In the fore belt supporting plate 914b, a number of permanent magnets (not shown) in the form of a rod are also embedded laterally extending and arranged in spaced relation with each other along its longitudinal direction so that a steel cord reinforcing breaker ply BP travelled on the fore belt supporting plate 914b is attracted to the fore endless belt 915b by the fore belt supporting plate 914b and preferably conveyed on the fore endless belt 914b while being neither meandered nor elongated. As best shown in FIG. 33, the rotary shaft 907 has an axial portion, extending outwardly of the ball bearing 905', on which is securely carried a sprocket wheel 925 having a driving connection with a sprocket wheel 926 by an endless chain 927 passed thereon. The sprocket wheel 926 is in turn securely carried on an axial portion of the rotary shaft 918 extending outwardly of the ball bearing 916'.

Figure 34:
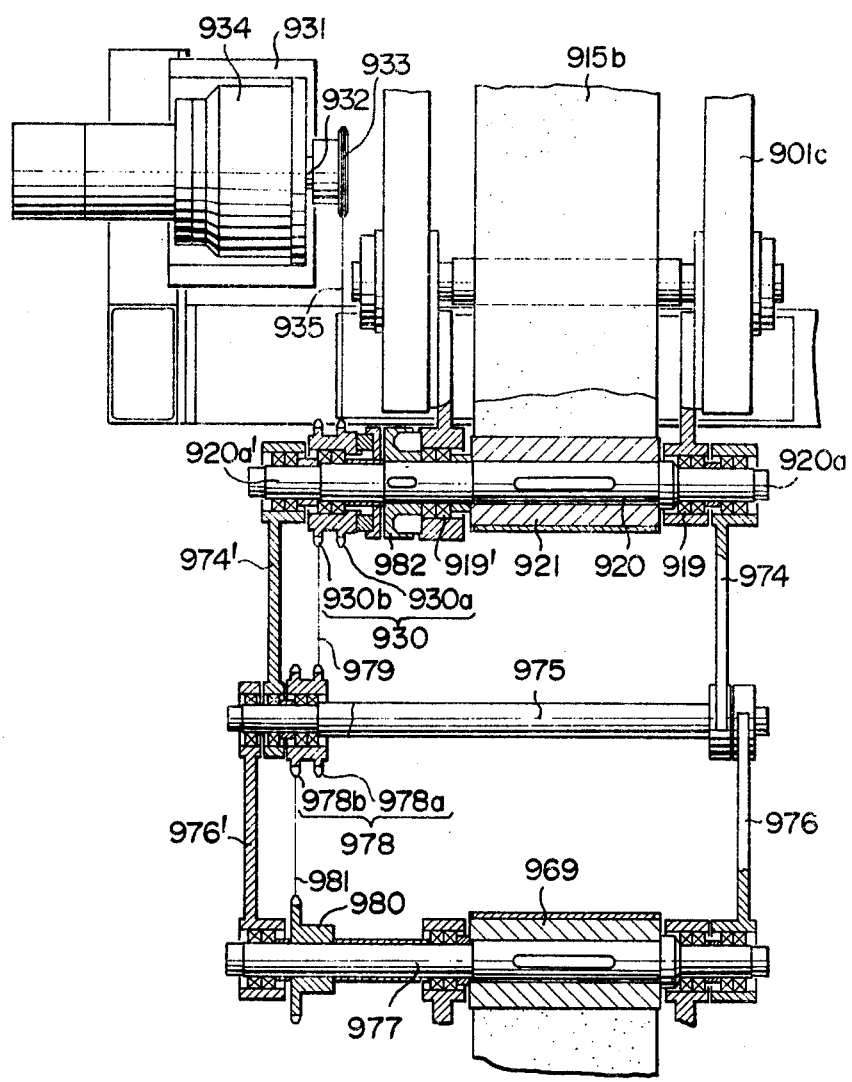
FIG. 34 is an enlarged view as seen from the lines 34—34 of FIG. 31.

A breaker ply supplying conveyor generally designated at 928a is thus constructed as above and a breaker ply meander adjusting arrangement generally indicated at 928b is provided at the rear end of the breaker ply supplying conveyor 928a. The breaker ply meander adjusting arrangement 928b is of substantially the same construction to the inner liner meander adjusting arrangement 711b, the carcass ply meander adjusting arrangement 783b and the flipper meander adjusting arrangement 805b all of which have been previously described so that there will be no particular description about its construction. The combination of the breaker ply meander adjusting arrangement 928b and the breaker ply supplying conveyor 928a constitute a breaker ply supplying conveyor mechanism generally designated at 928 which is driven a driving mechanism generally indicated at 929 as follows. With reference particularly to FIG. 34, the rotary shaft 920 has both axial end portions 920a and 920a', extending outwardly of the ball bearings 919 and 919', the latter of which rotatably supports a sprocket means 930 consisting of two juxtaposed sprocket wheels 930a and 930b. On the upper side beam 901c is securely mounted a horizontal bracket 931 on which an electric motor 934 is mounted having an output shaft 932 securely carrying thereon a sprocket wheel 933. An endless chain 935 is passed on the sprocket wheels 933 and 930a. When the electric motor 934 is energized to be rotated, its rotational torque is transmitted to the fore roller 921 through the sprocket wheel 933, the endless chain 935 and the sprocket wheel 930a so that the fore endless belt 915b is rotatingly travelled around the fore and rear rollers 921 and 917 while being tensioned by the intermediate roller 923. Further, the rotational torque of the rear roller 917 is simultaneously transmitted to the fore roller 906 through the sprocket wheel 926, the endless chain 927 and the sprocket wheel 925 so that the rear endless belt 915a is rotatingly travelled around the fore and rear rollers 906 and 903 while being tensioned by the intermediate roller 909. The breaker ply BP is successively supplied to the breaker ply supplying conveyor 928a after being prevented from its meander by the breaker ply meander arrangement 928b. At this time, the steel cord reinforced breaker ply BP is always being attracted to the fore and rear endless belts 915b and 915a by the permanent magnets embedded in the fore and rear belt supporting plates 914b and 914a so that the breaker ply BP is smoothly conveyed on the breaker ply supplying conveyor mechanism 928 while being held in contact with the fore and rear endless belt 915b and 915a without slipping down by gravity.

Figure 32:
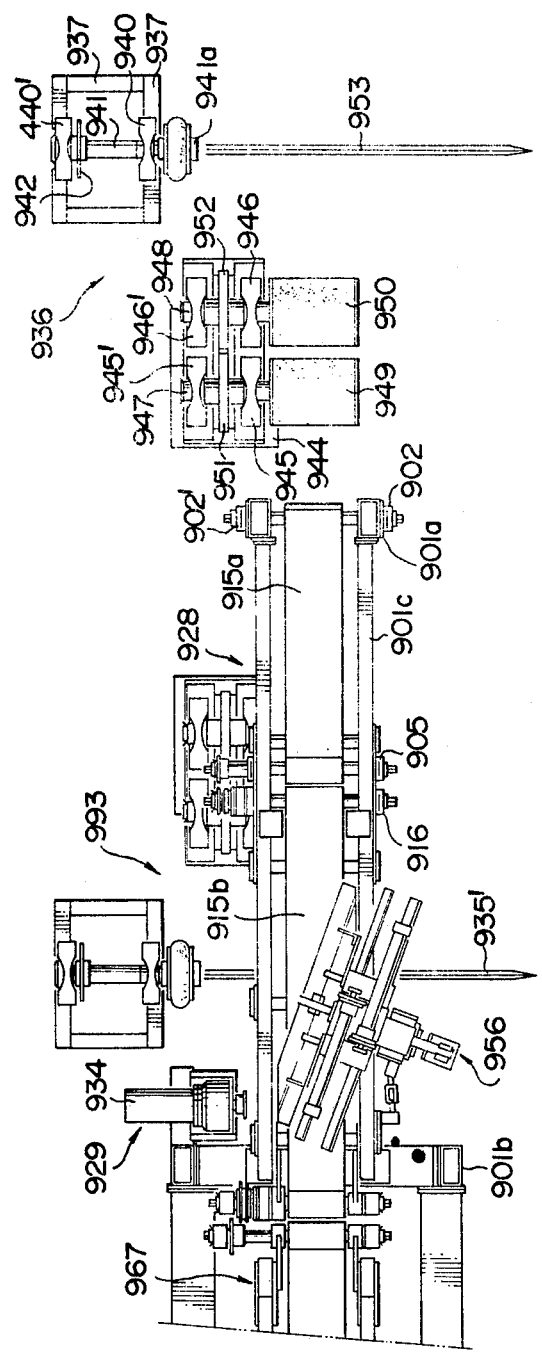
FIG. 32 is a view as seen from the lines 32—32 of FIGS. 31 and 32.

There is provided rearwardly of the rear columns 901a a breaker ply unwinding arrangement generally designated at 936 which will be described in detail hereinafter. A breaker ply unwinding rear frame 937 constructed of channel steels is provided rearwardly of the rear columns 901a of the fixed frame 901 and has a lower portion on which an electric motor 938 is securely mounted having an output shaft 938a securely carrying thereon a sprocket wheel 939. On the upper surface of the rear frame 937 are securely mounted a pair of spaced and opposing ball bearings 940 and 940' which rotatably support both ends of a rotary shaft 941 in parallel with the axis of the belt building drum 301 as particularly shown in FIG. 32. On the rotary shaft 941 between the ball bearings 940 and 940' are securely carried a sprocket wheel 942 which is in driving connection with the sprocket wheel 939 by an endless chain 943 passed thereon. In the end face 941a of the rotary shaft 941 extending outwardly from the ball bearing 940 is formed a bore 941b in a square form in cross-section. A breaker ply unwinding fore frame 944 constructed of channel steels is provided between the rear columns 901a and the rear frame 937 and has a pair of spaced and opposing fore ball bearings 945, 945' and a pair of spaced and opposing rear ball bearings 946, 946' spaced rearwardly from the pair of fore ball bearings 945, 945', the fore ball bearings 945 and 945' rotatably supporting both ends of a horizontal fore rotary shaft 947 in parallel with the axis of the belt building drum 301 while the rear ball bearing 946 and 946' also supporting both ends of a horizontal rear rotary shaft 948 in parallel with the axis of the belt building drum 301. The fore rotary shaft 947 has an axial portion, extending outwardly of the fore ball bearing 945, which securely supports thereon a liner unwinding roller 949, while the rear rotary shaft 948 has similarly an axial portion, extending outwardly of the rear ball bearing 946, which securely supports thereon another liner unwinding roll 950. On the fore rotary shaft 947 between the fore ball bearings 945 and 945' is securely carried a fore gear 951 which is in meshing engagement with a rear gear 952, having substantially the same gear ration to the fore gear 951, which is securely carried on the rear rotary shaft 948 between the rear ball bearings 946 and 946'. A guide rail 953 is laid on the ground toward the breaker ply unwinding rear frame 937 in parallel relation with the rotational axis of the belt building drum 301 to guide a guide wheel 954a rotatably retained under the lower central portion of a breaker ply truck 954. The breaker ply truck 954 is thus stationed at a desired position backwardly of the rear columns 901a and in parallel to the rotational axis of the belt building drum 301. Further, the breaker ply truck 954 is constructed of channel steels, having four travelling wheels 954b under four corners thereof and rotatably supporting a breaker ply roll BPR and a liner roll LR positioned thereover. The breaker ply roll BPR is to jointly wind around itself a breaker ply BP and a liner L made of cotton, synthetic fibers and the like to be underlaid on the reverse side of the breaker ply BP for preventing the wound breaker ply BP from adhering to each other, while the liner roll LR is to wind only the liner L unwound from the breaker ply roll BPR around itself. On the upper portion of the breaker ply truck 954 is rotatably carried a rotary shaft, not shown, which supports the liner roll LR and has both ends each formed with a projection, not shown, in a square form to be fitted in the square bore 941b formed in the rear face 941a of the axial portion of the rotary shaft 941. When the breaker ply truck 954 is thus moved under guidance of the guide rail 953 toward the breaker ply unwinding rear frame 937, the square projection of the rotary shaft supporting the liner roll LR is automatically brought into engagement with the square bore 941b of the rotary shaft 941. It is thus to be noted that the rotation of the electric motor 938 causes the liner roll LR to be rotated through the sprocket wheel 939, the endless chain 943, the sprocket wheel 942, the rotary shaft 941 and the rotary shaft supporting the liner roll LR so that the liner roll LR can wind around itself the liner L unwound from the breaker ply roll BPR through around the liner unwinding roll 950. The rotational torque of the liner roll LR is simultaneously transmitted to the breaker ply unwinding roll 949 by means of the liner L through the liner unwinding roll 950, the rear gear 952 and the fore gear 951 so that the breaker ply BP is successively unwound from the breaker ply roll BPR by the breaker ply unwinding roll 949 and then fed to the breaker ply supplying conveyor mechanism 928. On the upper side beams 901c are attached a pair of brackets 955, spaced and opposing along the upper side beams 901c, on which is securely mounted a breaker ply cutting mechanism generally designated at 956 at a certain angle to the rotational axis of the belt building drum 301. The breaker ply cutting mechanism 956 is of substantially the same construction to the carcass ply cutting mechanism 787 and the flipper cutting mechanism 812 and is not concerned with the features of the present invention, thereby omitting a particular description about its construction.

Fourwardly of the fixed frame 901 is located a base structure 957, constructed of channel steels, on which is securely mounted a pair of spaced parallel guide rail 958 and 958' in perpendicular relation with the axis of the belt building drum 301. The guide rail 958' is not shown in the drawings but disposed opposingly to and behind the guide rail 958. The guide rails 958 and 958' are of substantially the same construction to the guide rails 402 and 402' except for their length different therefrom, each having a generally inverse-trapezoidally shaped cross-section in a similar fashion. A movable frame generally represented at 961 has a pair of fore legs 959 and 959', the latter being not shown in the drawings but opposingly located to the former, formed on the fore lower surface thereof, and a pair of rear legs 960 and 960', the latter also being not shown in the drawings but opposingly located to the former, formed on the rear surface thereof. Each of the legs 959, 959', 960 and 960' is formed with a groove in the form of a substantially semicircular shape in cross-section. The movable frame 961 is thus adapted to be slidably movable on and along the parallel guide rails 958 and 958' with the grooves of the fore and rear legs 959 and 960 in sliding engagement with the guide rail 958 and with the grooves of the fore and rear legs 959' and 960' in sliding engagement with the guide rail 958. The movable frame 961 constructed of channel steels further comprises a pair of spaced parallel fore columns 961a, a pair of spaced parallel rear columns 961b spaced rearwardly of the pair of fore columns 961a and having a height higher than the fore columns 961a, a pair of upper side beams 961c each having a fore end portion securely connected to the upper end of the fore column 961a and a rear end securely connected to the upper end of the rear column 961b so as to be slanted downwardly toward the fore column 961a, and a pair of horizontal lower side beams 961d each having a fore end securely connected to the lower end of the fore column 961a and a rear end securely connected to the lower end of the rear column 961b. On the longitudinally intermediate portion of the fore column 961a is securely mounted a supporting bracket 962 to which a fluid-operated cylinder 963 is pivotally supported. On the inner opposing faces of the rear columns 961b are respectively attached a pair of supporting brackets 964 and 964' which securely mount ball bearings 965 and 965', respectively, rotatably supporting a rotary shaft 966 at its both ends. The supporting bracket 964' and the ball bearing 965' are not shown in the drawings but disposed opposingly to and behind the supporting bracket 964 and the ball bearing 965, respectively. A breaker ply applying conveyor mechanism generally indicated at 967 is arranged on the movable frame 961 to be slanted downwardly toward the belt building drum 301 and comprises a breaker ply supplying conveyor generally designated at 967a and a breaker ply applying arrangement generally designated at 967b. The breaker ply supplying conveyor 967a includes a pair of spaced parallel frames, a fore roller 968 having a rotary shaft rotatably supported at both ends on the fore end portions of the frames, a rear roller 969 having a rotary shaft rotatably supported at both ends on the rear end portions of the frames, a plurality of intermediate rollers 971 each having a rotary shaft rotatably supported at both ends on the intermediate portions of the frames, an endless belt 970 passed on the fore roller 968, the rear roller 969 and the intermediate rollers 971 and having a number of pointed pins thereon to pierce the breaker ply BP during its travelling. The intermediate rollers 971 serve to impart a proper tension to the breaker ply BP conveyed on the endless belt 970 and the breaker ply supplying conveyor 967a on the movable frame 961 is of substantially the same construction to the breaker ply supplying conveyor 928a on the fixed frame 901 so that the breaker ply supplying conveyor 967a will not be further described hereinafter. On the outer face of the frame of the breaker ply supplying conveyor 967a is securely mounted a bracket 972 which is pivotally connected to a piston rod 963a of the fluid-operated cylinder 963. On the lower faces of the frames of the breaker ply supplying conveyor 967a are respectively securely mounted ball bearings 973 and 973' which are adapted to rotatably receive the rotary shaft 966. It is thus to be understood that the breaker ply supplying conveyor 967a is swung around the rotary shaft 966 by the action of the fluid-operated cylinder 963 to be moved from a second operating position 900B shown in phantom lines of FIG. 31 to a third operating position 900C also shown in phantom lines of the same Figure and vice versa under the state that the movable frame 961 is moved to a position nearest to the belt building drum 301.

As best shown in FIG. 34, the rear rotary shaft 920 rotatably carries at its axial portions extending outwardly of the ball bearings 919 and the sprocket means 930 one ends of rear connecting arms 974 and 974', respectively, which have the other ends rotatably carry an intermediate shaft 975. On the intermediate shaft 975 outwardly of the rear connecting arms 974 and 974' are rotatable carried one ends of fore connecting shafts 976 and 976', respectively, which have the other ends rotatably carried on a rotary shaft 977 of the rear roller 969 of the breaker ply supplying conveyor 967a. On the intermediate shaft 975 inwardly of the rear connecting arm 974' is rotatably carried a sprocket means 978 having a pair of juxtaposed sprocket wheels 978a and 978b integrally formed with each other. The sprocket wheel 978a is drivingly associated with the sprocket wheel 930b by an endless chain 979, and the sprocket wheel 978b is drivingly associated by an endless chain 981 with a sprocket wheel 980 securely carried on the rotary shaft 977 of the rear roller 969.

A power clutch 982 is provided on the rotary shaft 920 of the fore roller 921 between the fore ball bearing 919' and the sprocket means 930 so that engagement of the power clutch 982 causes the rotational torque of the electric motor 934 to be transmitted to the rotary shaft 920 through the sprocket wheel 933, the endless chain 935 and the sprocket wheel 930a, thereby rotating the fore roller 921 and operating the breaker ply supply conveyor mechanism 928 while the rotational torque of the electric motor 934 being simultaneously transmitted to the rotary shaft 977 through the sprocket wheel 930b, the endless chain 979, the sprocket means 978, the endless chain 981 and the sprocket wheel 980, thereby rotating the rear roller 969 and operating the breaker ply supplying conveyor 967a. On the other hand, disengagement of the power clutch causes the rotational torque of the electric motor 934 only to operate the breaker ply supplying conveyor 967a but not to operate the breaker ply supplying conveyor mechanism 928.

At the fore end of the breaker ply supplying conveyor 967a is provided a breaker ply applying arrangement generally indicated at 967b which will be described in detail hereinlater. As will be seen FIG. 31, a pair of crank arms 983 and 983' are securely carried on the both end portions of the fore shaft of the breaker ply supplying conveyor 967a and rotatably support at their fore ends an urging roll 985 through a rotary shaft 984 in parallel relation with the rotational axis of the belt building drum 301. The crank arm 983' is not illustrated in the drawings but located opposingly to and behind the crank arm 983. The rear end 986 of the crank arm 983 is pivotally connected to a piston rod 988a of a fluid-operated cylinder 988 which has a bottom end pivotally connected to a bracket 987 secured to the frame of the breaker ply supplying conveyor 967a. When the fluid-operated cylinder 988 is thus operated to cause the piston rod 998a to be projected and retracted, the urging roll 985 is swung upwardly and downwardly under the state that the movable frame 961 has been moved away from the belt building drum 301, while being swung from a third operating position 900C shown in phantom lines of FIG. 31 to a fourth operating position 900D also shown in phantom lines of the same Figure and vice versa under the state that the movable frame 961 has been moved toward the belt building drum 301. To the rear portion of the base structure 957 is secured a beam member 957a on which a bracket 989 is securely mounted and pivotally connected to the bottom end of a fluid-operated cylinder 990. The fluid-operated cylinder 990 has a piston rod 990a pivotally connected to a horizontally extending beam member securely connected at both ends to the fore legs 959 and 959' of the movable frame 961. The actuation of the fluid-operated cylinder 990 causes the movable frame 961 to be moved from an initial operating position 900A shown in phantom lines of FIG. 31 to a second operating position 900B shown in phantom lines of the same Figure and vice versa. The breaker ply supplying conveyor mechanism 967 is thus moved toward and away from the breaker ply supplying conveyor mechanism 928 on the fixed frame 901 and the belt building drum 301. At this time, the power transmission from the electric motor 934 to the breaker ply supplying conveyor mechanism 967 through the sprocket means 930, the endless chain 979, the sprocket means 978 and the endless chain 981 is not affected by such movement of the breaker ply supplying conveyor mechanism 967 since the conveyor mechanism 967 is connected with the breaker ply supplying conveyor mechanism 928 through the rear connecting arms 974, 974', the intermediate shaft 975 and the fore connecting arms 976, 976'. Below the breaker ply supplying conveyor mechanism 928 is arranged an additional breaker ply supplying conveyor mechanism 991 which is of substantially the same construction except for its length different therefrom so that its detailed construction will not be described hereinafter. The breaker ply supplying conveyor mechanism 928 serves to convey a first breaker ply to provide a innermost layer in a belt BL on the belt building drum 301, and the breaker ply supplying conveyor mechanism 991 serves to convey a second breaker ply to be overlaid on the first breaker ply on the belt building drum 301. The driving mechanism generally indicated at 992 for driving the breaker ply supplying conveyor mechanism 991 is also of substantially the same construction to the previously described driving mechanism 929, and a breaker ply unwinding mechanism generally indicated at 993 and located between the rear and fore columns 901a and 901b is identically constructed to the breaker ply unwinding mechanism 936, so that the particular constructions of the driving mechanism 992 and the breaker ply unwinding mechanism 993 will not be described hereinafter. In the breaker ply unwinding mechanism 993, a guide rail 953' is laid on the ground in a similar manner to guide and station a breaker ply truck 994, similarly constructed to the breaker ply truck 954, at a position rearwardly of the fore columns 901b in a similar fashion. While the breaker ply unwinding mechanism 936 serves to unwind the first breaker ply from the breaker ply truck 954 and the breaker ply unwinding mechanism 993 serves to unwind the second breaker ply from the breaker ply truck 994, the first and second breaker plies are merely denominations for identifying an order of their application on the belt building drum 301 and an entirely identical material but not different in quality therebetween. The construction of a breaker ply cutting mechanism 995 and the attaching way thereof to the breaker ply supplying conveyor mechanism 928 are entirely the same to the construction of the breaker ply supplying conveyor mechanism 928, and thus will not be described hereinlater. However, the breaker ply cutting mechanism 995 which is disposed at a certain angle with respect to the rotational axis of the belt building drum 301 has an entirely opposite direction but substantially the same oblique angle to that of the breaker ply cutting mechanism 956. Forwardly of the breaker ply supplying conveyor mechanism 991 is located a breaker ply supplying conveyor mechanism generally designated at 996 which is attached to the movable frame 961 in a similar manner to the breaker ply supplying conveyor mechanism 967, thereby omitting its attachment in detail hereinafter. A fluid-operated cylinder 997 corresponding to the fluid-operated cylinder 963 for up and down motion of the breaker ply supplying conveyor mechanism 967 causes the breaker ply supplying conveyor mechanism 996 to be swung around the rotary shaft 998 to be moved from a second operating position 900B shown in phantom lines of FIG. 31 to a third operating position 900C also shown in phantom lines of the same Figure and vice versa under the state that the movable frame 961 is moved to a position nearest to the belt building drum 301. The breaker ply supplying conveyor mechanism 996 is of substantially the same to the breaker ply supplying conveyor mechanism 967 with the exception that the former has a forward portion formed straightly but the latter has a forward portion bent downwardly. The particular construction of the breaker ply supplying conveyor mechanism 996 will thus not be described hereinlater. The connecting means for connecting the breaker ply supplying conveyor mechanism 996 and 991 and the rotation transmitting means from an electric motor 998 to a fore roller 999 of the breaker ply supplying conveyor mechanism 996 are substantially identical in construction to those of the breaker ply supplying conveyor mechanism 967 and 928 previously described so that they will not be described in detail hereinlater. At the fore end of the breaker ply supplying conveyor mechanism 996 is similarly provided a breaker ply applying arrangement generally indicated at 996b which will not be described hereinlater since it is of substantially the same construction to the previously described breaker ply applying arrangement 967b. It is thus to be understood that a fluid-operated cylinder 1000 corresponding to the fluid-operated cylinder 988 of the breaker ply applying arrangement 967b causes an urging roll 1001 corresponding to the urging roll 985 to be swung from a third operating position 900C shown in phantom lines of FIG. 31 to a fourth operating position 900D also shown in phantom lines of the same Figure and vice versa under the state that the movable frame 961 is moved to a position nearest to the belt building drum 301. It will also be understood that the fluid-operated cylinder 990 causes the movable frame 961 to be moved toward and away from the belt building drum 301 so that the breaker ply applying arrangements 967b and 996b are moved from initial operating position 900A shown in solid lines of FIG. 31 to second operating positions 900B and vice versa.

Figure 35:
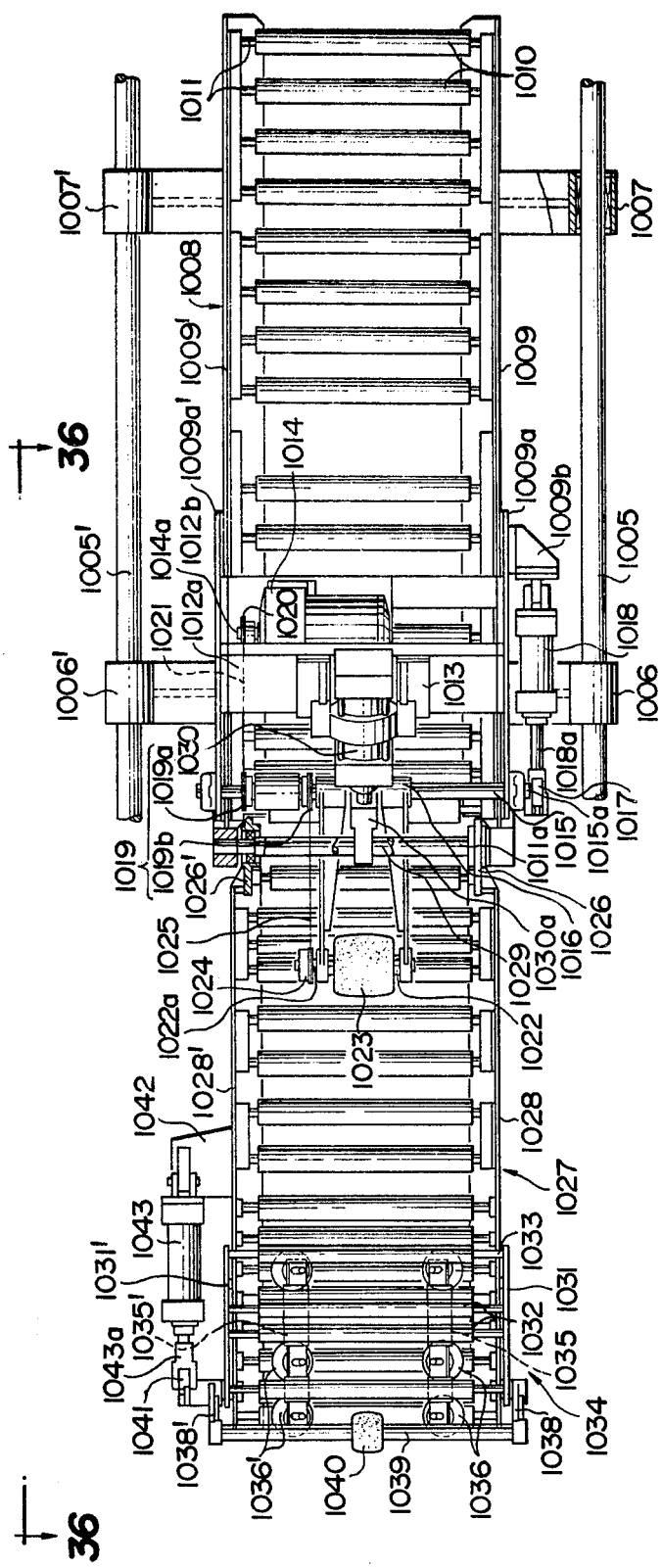
FIG. 35 is an enlarged view as seen from the lines 35—35 of FIG. 31.

Provided on the movable frame 961 to be slanted downwardly toward the belt building drum 301 is a tread supplying conveyor mechanism generally designated at 1002 which is constructed as follows. As shown in FIGS. 31, 35 and 36, the tread supplying conveyor mechanism 1002 comprises a pair of fore supporting brackets 1003 and 1003' respectively securely mounted on the fore upper portions of the upper side beams 961c of the movable frame 961 and a pair of rear supporting brackets 1004 and 1004' respectively securely mounted on the rear upper portions of the upper side beams 961c of the movable frame 961. The brackets 1003' and 1004' are not shown in the drawings but located opposingly to and behind the brackets 1003 and 1004. A guide rod 1005 is secured at both ends to the brackets 1003 and 1004 and another guide rod 1005' is secured at both ends to the brackets 1003' and 1004' in parallel relation with the fore guide rod 1005. A slidable roller conveyor mechanism generally indicated at 1008 has at its fore side faces fore supporting brackets 1006 and 1006' slidably embracing the guide rods 105 and 105' and at its rear side faces rear supporting brackets 1007 and 1007' also slidably embracing the guide rods 105 and 105' so that the slidable roller conveyor mechanism 1008 is arranged perpendicularly to the rotational axis of the belt building drum 301 and is movable toward and away from the belt building drum 301. The slidable roller conveyor mechanism 1008 is constructed in a well known manner, comprising a pair of spaced parallel frames 1009 and 1009' and a multiplicity of spaced parallel rollers 1010 each rotatably mounted on a shaft 1011 both ends of which are secured to the inner faces of the frames 1009 and 1009'. To the outer side faces of the frames 1009 and 1009' are securely connected upwardly extending side plates 1009a and 1009a' which have upper inner faces securely supporting both ends of an upper beam member 1012a and which have vertically intermediate inner faces securely supporting both ends of a center beam member 1012b. The upper beam member 1012a securely mounts thereon a bracket 1013 which is adapted to pivotally support a fluid-operated cylinder 1030, while the central beam member 1012b mounts thereon an electric motor 1014. The fore portion of the side plates 1009a and 1009a' support rotatably both ends of a horizontal supporting shaft 1015 which has a central portion securely connected to rear ends of spaced parallel rockable arms 1016 and which has an axial portion 1015a extending outwardly of the side plate 1009a and securely connected to one end of a connecting arm 1017. The other end of the connecting arm 1017 is pivotally connected to a piston rod 1018a of a fluid-operated cylinder 1018 which has a bottom end pivotally connected to a bracket 1009a secured to the outer side of the side plate 1009a. On the supporting shaft 1015 between the rockable arm 1016 and the side plate 1009a' is rotatably carried a sprocket means 1019 having a pair of juxtaposed sprocket wheels 1019a and 1019b, the former being in driving connection by an endless chain 1021 with a sprocket wheel 1020 securely carried on an output shaft 1014a of the electric motor 1014 while the latter being in driving connection by an endless chain 1025 with a sprocket wheel 1024. The rockable arms 1016 have the other ends rotatably support a rotary shaft 1022 on which a rockable roll 1023 is securely mounted between the rockable arms 1016 and which has an axial portion 1022a extending outwardly of the rockable arm 1016 and securely carrying thereon the sprocket wheel 1024. It will thus be noted that the rockable roll 1023 is swung around the supporting shaft 1015 from an initial operating position 900E shown in solid lines of FIG. 31 to a second operating position 900F shown in phantom lines of the same Figure and vice versa by the action of the fluid-operated cylinder 1018, while the rockable roll 1023 is rotated by the electric motor 1014 through the sprocket wheel 1020, the endless chain 1021, the sprocket means 1019, the endless chain 1025, the sprocket wheel 1024 and the rotary shaft 1022. On the fore ends of the frames 1009 and 1009' of the slidable roller conveyor mechanism 1008 is pivotally supported both ends of a connecting rod 1011a in parallel to the shafts 1011 of the rollers 1010. A pair of bell cranks 1026 and 1026' are pivotally carried on the connecting rod 1011a inwardly of the frames 1009 and 1009' and have one ends securely connected to lower faces of spaced parallel frames 1028 and 1028' of a rockable roller conveyor mechanism generally indicated at 1027 while having the other ends supporting a horizontal connecting rod 1029 pivotally connected to a piston rod 1030a of the fluid-operated cylinder 1030. When the fluid-operated cylinder 1030 is thus actuated to cause the piston rod 1030a to be projected and retracted, the rockable conveyor mechanism 1027 is swung around the connecting rod 1011a from a second operating position 900H shown in phantom lines of FIG. 31 to a third operating position 900I also shown in phantom lines of the same Figure and vice versa under the state that the movable frame 961 is moved nearest to the belt building drum 301. The rockable roller conveyor mechanism 1027 is substantially identical in construction to the slidable roller conveyor mechanism 1008 so that it will not be described hereinlater.

On the outer faces of the frames 1028 and 1028' are attached vertically extending side plates 1031 and 1031' which have upper portions connected by a plurality of spaced parallel rotary shafts 1033 each rotatably supporting an upper roller 1032, which constitutes as a whole an upper roller conveyor generally indicated at 1034. Below the upper roller conveyor 1034 are a plurality of rods, not shown, each having both ends connected to the side plates 1031 and 1031' and collectively carrying a pair of brackets 1035 and 1035' in symmetrical and opposing relation with the center line of the rockable roller conveyor 1027 and equally spaced from the frames 1028 and 1028'. The bracket 1035 is adapted to rotatably carry therebelow three guide rolls 1036 along its length while the bracket 1035' also rotatably carrying therebelow three guide rolls 1036' along its length with their rotational axis of the rolls 1036 and 1036' flared downwardly outwardly so that a tread T is conveyed on the rockable conveyor mechanism 1027 while being forced to move toward the center line of the mechanism 1027 by the guide rolls 1036 and 1036'. On the forward ends of the frames 1028 and 1028' is pivotally carried both ends of a pivotal shaft 1037 which has axial end portions extending outwardly of the frames 1028 and 1028' and securely carrying rockable arms 1038 and 1038'. An urging roll 1040 is rotatably carried on the longitudinally intermediate portion of a supporting rod 1039 in parallel relation with the rotational axis of the belt building drum 301 and the supporting rod 1039 has both ends connected to the free ends of the rockable arms 1038 and 1038'. Only the rockable arm 1038' is connected at its other end to one end of a connecting rod 1041 which has the other end pivotally connected to a piston rod 1043a of a fluid-operated cylinder 1043 having a bottom end pivotally connected to a bracket 1042 secured to the longitudinally intermediate portion of the frame 1028'. It is thus to be appreciated that the fluid-operated cylinder 1043 causes an urging roll 1040 to be swung around the pivotal shaft 1037 from a third operating position 900I shown in phantom lines of FIG. 31 to a fourth operating position 900J shown in phantom lines of the same Figure. The frames 1009 and 1009' connect both ends of a fore connecting member 1044 having a longitudinally intermediate lower face securely carrying a dependenting bracket 1045 which is pivotally connected to a piston rod 1048a of a fluid-operated cylinder 1048. The fluid-operated cylinder 1048 has a bottom end pivotally connected to a bracket 1047 which is secured to the longitudinally intermediate portion of a connecting member 1046 having both ends securely mounted on the side beams 961c of the movable frame 961. It will be thus understood that the fluid-operated cylinder 1048 causes the tread supplying conveyor mechanism 1002 to be moved from an initial operating position 900G shown in solid lines of FIG. 31 to a fifth operating position 900K shown in phantom lines of the same Figure and vice versa. The tread supplying conveyor mechanism 1002 is also moved by the action of the fluid-operated cylinder 990 jointly with the breaker ply supplying conveyor mechanisms 967 and 996 from the initial operating position 900G to a second operating position 900H shown in phantom lines of Fgi. 31 and vice versa.

The operation of the green tire building apparatus of the present invention thus constructed and arranged will be described hereinafter.

As shown in FIGS. 22 to 29, when the inner liner truck 743 which rotatably supports the inner liner roll IR and the liner roll L is guided by the guide rail 742 unti it is stationed at its predetermined position rearwardly of the rear columns 701a, the inner liner I is unwound from the inner liner unwinding roll 723 rotated by the electric motor 719 to be continuously fed to the inner liner supplying conveyor mechanism 711, while the liner L is wound around the liner roll LR rotated under the action of the fluid-operated cylinder 741 by the electric motor 719 through the winding roll 736. Similarly, when the carcass ply truck 795 which rotatably supports the carcass ply roll CPR and the liner roll LR is guided by the guide rail 794 until it is stationed at its predetermined position rearwardly of the intermediate columns 701b, the carcass ply CP is unwound from the carcass ply unwinding roll 790 rotated by the electric motor 789 to be continuously fed to the carcass ply supplying conveyor mechanism 783, while the liner L is wound around the liner roll LR rotated under the action of the fluid-operated cylinder 793 by the electric motor 789 through the winding roll 792. Similarly, when the flipper truck 819 which rotatably supports the flipper roll FR and the liner roll LR is guided by the guide rail 818 until it is stationed at its predetermined position rearwardly of the fore columns 701c, the flipper F is unwound from the flipper unwinding roll 815 rotated by the electric motor 814 to be continuously fed to the flipper applying conveyor mechanism 805, while the liner L is wound around the liner roll LR rotated under the action of the fluid-operated cylinder 817 by the electric motor 814 through the winding roll 816. The inner liner I, the carcass ply CP and the flipper F fed respectively to the inner liner supplying conveyor mechanism 711, the carcass ply applying conveyor mechanism 783 and the flipper supplying conveyor mechanism 805 are firstly delivered respectively to the inner liner meander adjusting arrangement 711b, the carcass ply meander adjusting arrangement 783b and the flipper meander adjusting arrangement 805b where their meander are adjusted, and thereafter conveyed respectively to the inner liner supplying conveyor 711a, the carcass ply supply conveyor 783a and the flipper applying conveyor 805a. The engagement of the clutch 768 causes the rotational torque of the electric motor 714 to be transmitted to the sprocket wheel 766 by way of the sprocket wheel 766 by way of the sprocket wheel 715, the endless chain 716, the sprocket wheel 713, the sprocket wheel 764, the endless chain 765, the sprocket meand 763 and the endless chain 767 so that the inner liner supplying conveyors 711a and 758a are concurrently operated to convey the inner liner I from the inner liner supplying conveyor mechanism 711 toward the inner liner supplying mechanism 758 during which the inner liner I pass through a position immediately below the inner liner cutting mechanism 752. During the time period, the inner liner I is reliably pierced into and dragged by the pointed pins formed on the endless chains 707 after being adjusted in its meander so that the inner liner I is conveyed on the inner liner supplying conveyor mechanisms 711 and 758 without any meander. When the inner liner I is conveyed forwardly through the inner liner cutter 748 of the inner liner cutting mechanism 752 by a predetermined length substantially equal to the circumferential length of the tire band building drums 101 and 101', the electric motor 714 is stopped and the fluid-operated cylinder 747 is simultaneously actuated to vertically lower the inner liner cutter 748 so that the inner liner I is cut to the predetermined length while being retained horizontally on the inner liner supporting members 751 and 751'. The clutch 768 is then disengaged and the electric motor 714 is again energized for rotation, transmitting the rotational torque of the electric motor 714 only to the inner liner supplying conveyor mechanism 758 so that the inner liner I cut to the predetermined length is conveyed to a predetermined position on the inner liner supplying conveyor mechanism 758, whereupon the rotation of the electric motor 714 is stopped. In an entirely similar manner to the case of the inner liner I, the carcass ply CP is conveyed on the carcass ply supplying conveyor mechanism 783 and the carcass ply applying conveyor mechanism 796 without any meander. When the carcass ply CP is likewise conveyed forwardly through a position immediately below the carcass ply cutter (not shown) of the carcass ply cutting mechanism 787 by a predetermined length substantially equal to the circumferential length of the tire band building drums 101 and 101', the electric motor 785 is stopped and the carcass ply cutting mechanism 787 is simultaneously operated for cutting the carcass ply CP to a predetermined length. Following the cutting operation of the carcass ply CP, the carcass ply applying conveyor mechanism 796 is similarly operated to convey the carcass ply CP cut into the predetermined length to a predetermined position on the carcass ply applying conveyor mechanism 796. The electric motor 808 is then energized for rotation to cause its rotational torque to be transmitted to the flipper applying conveyor mechanism 805 by way of the sprocket wheel 810, the endless chain 811, and the sprocket wheel carried on the rear rotary shaft 809 so that the flipper F is also conveyed on the flipper applying conveyor mechanism 805 while being adjusted in its meander by the flipper meander adjusting arrangement 805b. When the flipper F is likewise conveyed forwardly through a position immediately below the flipper cutter (not shown) of the flipper cutting mechanism 812 by a predetermined length substantially equal to the circumferential length of the tire band building drums 101 and 101', the electric motor 808 is stopped and the flipper cutting mechanism 812 is simultaneously operated for cutting the flipper F to a predetermined length. Following the cutting operation of the flipper F, the flipper applying conveyor mechanism 805 is similarly operated to convey the flipper F cut into the predetermined length to a predetermined position on the flipper applying conveyor mechanism 805 by the electric motor 808 which is again energized. When the flipper F is advanced to the predetermined position on the flipper applying conveyor mechanism 805, the electric motor 808 is stopped. The fluid-operated cylinders 779 and 824 are then simultaneously actuated to move the movable frames 757 and 802 toward the tire band building drum 101' on and along the guide rails 754 and 754'. By the movements of the movable frames 757 and 802, the inner liner applying conveyor mechanism 758 and the carcass ply applying conveyor mechanism 796 mounted on the movable frame 757 are moved from the initial operating positions 700A shown in solid lines of FIG. 23 to the second operating positions 700B shown in phantom lines of the same Figure while mounting thereon the predetermined length cut inner liner I and carcass ply CP, respectively. On the other hand, the flipper applying conveyor mechanism 805 mounted on the additional movable frame 802 is also moved from the initial operating position 700D shown in solid lines of FIG. 23 to the second operating position 700E shown in phantom lines of the same Figure while mounting thereon the predetermined length cut flipper F.

Figure 2:
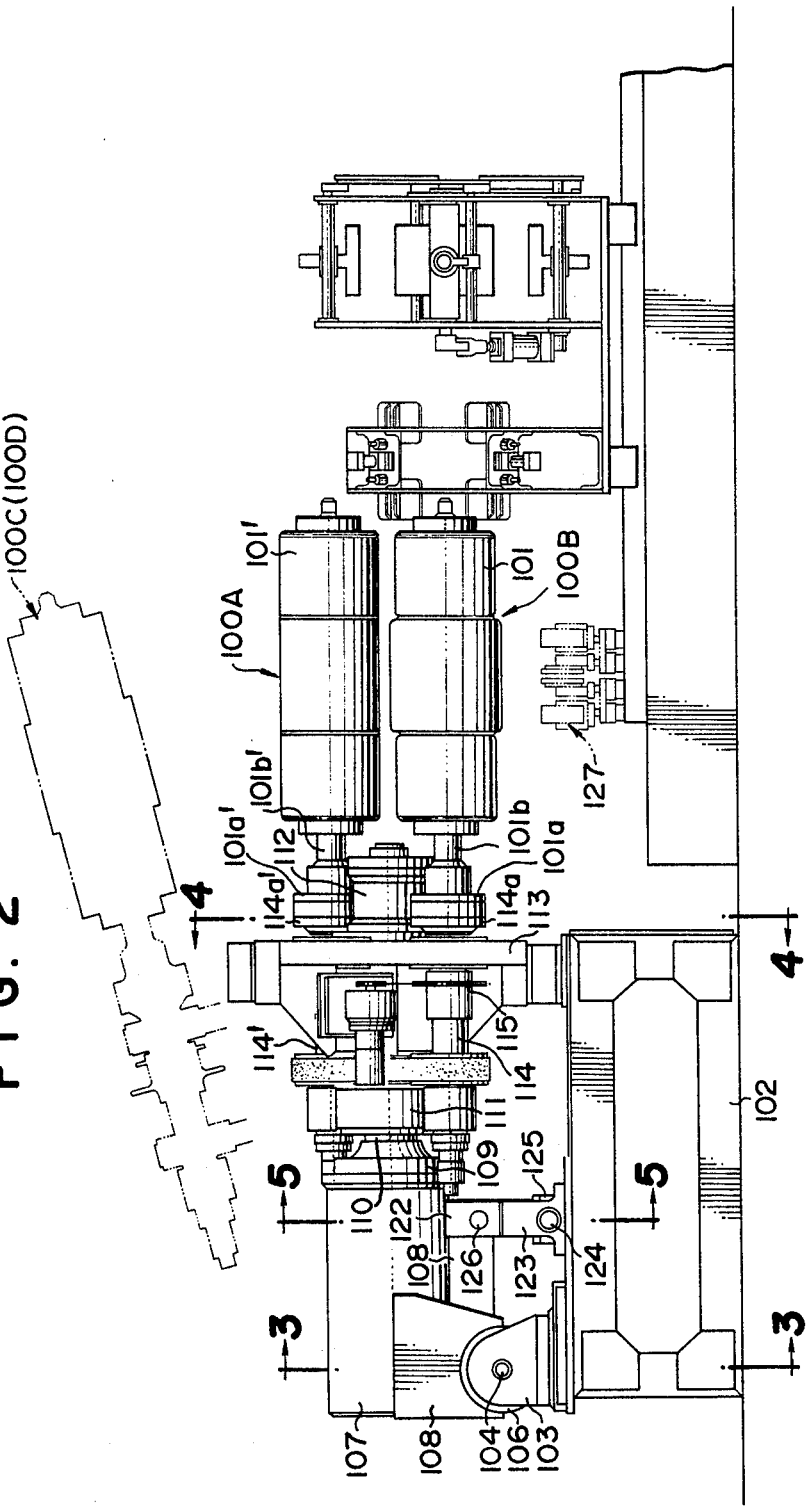
FIG. 2 is an enlarged view as seen from the lines 2—2 of FIG. 1.
Figure 3:
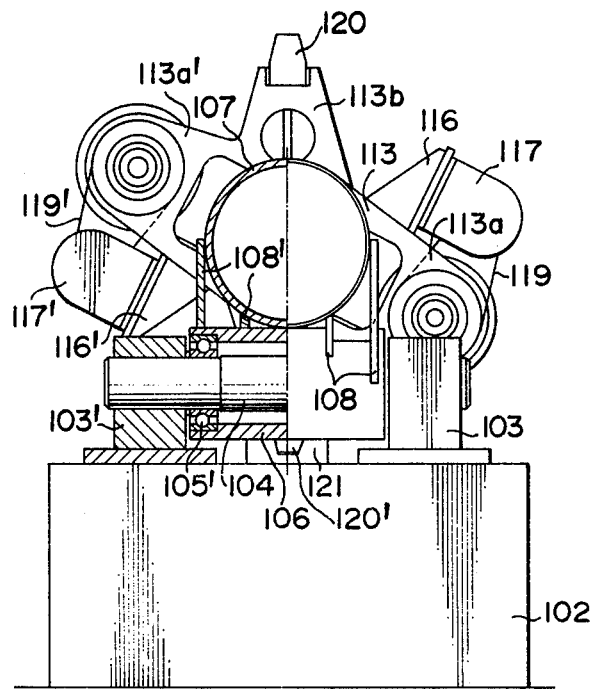
FIG. 3 is an enlarged view as seen from the lines 3—3 of FIG. 2.
Figure 5:
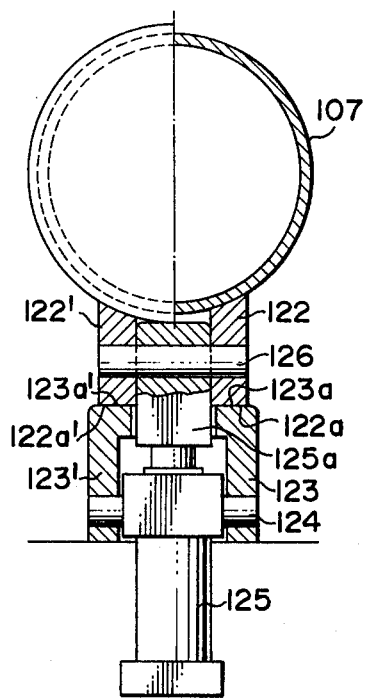
FIG. 5 is an enlarged view as seen from the lines 5—5 of FIG. 2.
Figure 4:
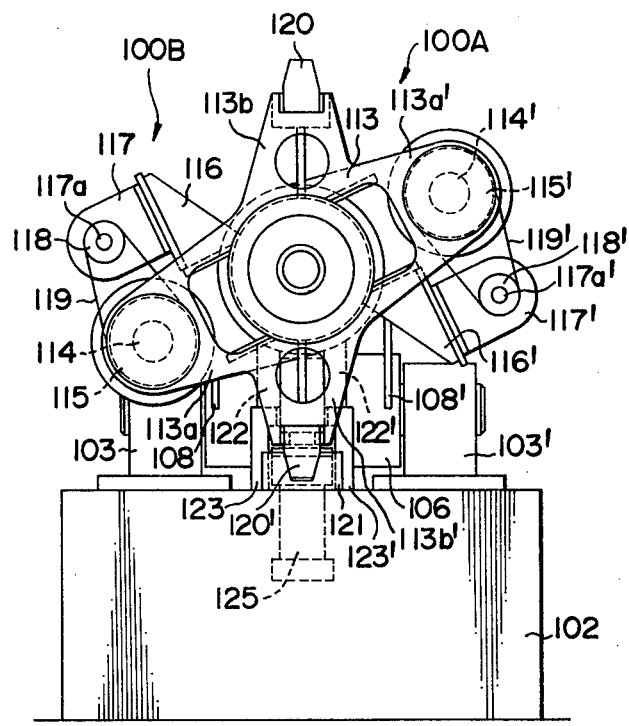
FIG. 4 is an enlarged view as seen from the lines 4—4 of FIG. 2.

The electric motor 117' shown in FIGS. 2 to 4 is then energized to rotate the tire band building drum 101' through the sprocket wheel 118', the endless chain 119', the sprocket wheel 115' and the rotary shaft 114'. Simultaneously with the rotation of the electric motor 117' the fluid-operated cylinders 776 and 798 are actuated to swing the urging rolls 772 and 799 from the second operating positions 700B shown in phantom lines of FIG. 23 to the third operating positions 700C shown in phantom lines of the same Figure so that the urging rolls 772 and 799 are brought into contact with the outer peripheral surface of the tire band building drum 101' and rotated thereby. While the urging rolls 772 and 799 are held in contact with the tire band building drum 101', the electric motors 714 and 785 are energized for rotation to operate the inner liner applying conveyor mechanism 758 and the carcass ply applying conveyor mechanism 796 so that the predetermined length cut inner liner I is applied on and around the tire band building drum 101' while being urged against the tire band building drum 101' by the urging roll 772 after passing through the inner liner supplying conveyor 758a and the inner liner applying arrangement 758b, while the predetermined length cut carcass ply CP is also overlappedly applied on and around the inner liner I just applied on the tire band building drum 101' while being urged against the applied inner liner I by the urging roll 799 after passing through the carcass ply supplying conveyor 796a and the carcass ply applying arrangement 796b. At this time, the jointing ends of the inner liner I and the carcass ply CP are circumferentially spacedly applied on the tire band building drum 101' by the reason that the contacting positions of the urging rolls 772 and 799 on the tire band building drum 101' are circumferentially displaced and that the electric motor 785 is energized with a predetermined time lag behind energization of the electric motor 714. After completion of applying the inner liner I and the carcass ply CP on the tire band building drum 101', the rotations of the electric motors 714 and 785 are stopped and the fluid-operated cylinders 776 and 798 are again actuated to cause the urging rolls 772 and 799 to be swung back to the second operating positions 700B shown in phantom lines of FIG. 23 from the third operating positions 700C shown in phantom lines of FIG. 23. After the actuation of the fluid-operated cylinders 776 and 798, the fluid-operated cylinder 779 is again actuated to move the inner liner applying conveyor mechanism 758 and the carcass ply applying conveyor mechanism 796 from the second operating positions 700B shown in phantom lines of FIG. 23 to the initial operating position 700A of the same Figure. Upon resumptions of the inner liner applying conveyor mechanism 758 and the carcass ply applying conveyor mechanism 796, the fluid-operated cylinder 820 is actuated to cause the urging roll 821 to be swung from the second operating position 700E shown in phantom lines of FIG. 23 to the third operating position 700F of the same Figure so that the urging roll 821 is brought into contact with the outer surface of the carcass ply CP applied on the tire band building drum 101' and rotated thereby. When the urging roll 821 is brought into contact with the outer surface of the carcass ply CP applied on the tire band building drum 101', the electric motor 808 is again energized to operate the flipper applying conveyor mechanism 805 until the predetermined length cut flipper F is overlappedly applied on the carcass ply CP while being urged against the carcass ply CP by the urging roll 821 after passing through the flipper supplying conveyor 805a and the flipper applying arrangement 805c. In the similar manner to the cases of the inner liner I and the carcass ply CP, the jointing ends of the flipper F is circumferentially equally spaced from the jointing ends of the inner liner I and the carcass ply CP on the tire band building drum 101' by the reason that the contacting position of the urging roll 821 is circumferentially displaced from those of the urging rolls 772 and 799 on the tire band building drum 101' and that the electric motor 808 is energized with a predetermined time lag behind energization of the electric motor 785 for operating the carcass ply applying conveyor mechanism 796. After completion of applying the flipper F on the tire band building drum 101', the rotation of the electric motor 808 is stopped and the fluid-operated cylinder 820 is again actuated to cause the urging roll 821 to be swung back to the second operating position 700E shown in phantom lines of FIG. 23 from the third operating position 700F shown in phantom lines of the same Figure. Upon the actuation of the fluid-operated cylinder 820, the fluid-operated cylinder 824 is again actuated to move the flipper applying conveyor mechanism 805 from the second operating position 700E shown in phantom lines of FIG. 23 to the initial operating position 700D shown in solid lines of the same Figure.

If there is provided such a junction eliminating mechanism as disclosed in U.S. Pat. No. 3,898,116 in the carcass ply supplying conveyor mechanism 783 so as to cut off junctions or joining ends of bias-cut carcass ply cords prior to application to the tire band building drum 101', the joining ends of the inner liner I, the flipper F and the carcass ply CP can be more evenly distributed around the tire band building drum 101'. Upon the application of the predetermined length cut inner liner I on the tire band building drum 101', the circumferential speed at the outer peripheral surface of the tire band building drum 101' is adjusted in synchronism with the travelling speed of the endless chains with the pointed pins of the inner liner applying conveyor mechanism 758 so that the predetermined length cut inner liner I is automatically applied on the tire band building drum 101' without undergoing any meander, elongation and shrinkage. In a similar manner to the case of the inner liner I, the travelling speed of the endless chain with the pointed pins of the carcass ply applying conveyor mechanism 796 or the flipper applying conveyor mechanism 805 is adjusted in synchronism with the circumferential speed at the outer peripheral surface of the tire band building drum 101' so that the predetermined length cut carcass ply CP or flipper F is also automatically applied on the tire band building drum 101' without undergoing any meander, elongation and shrinkage. When the inner liner I has been unwound from the inner liner roll IR rotatably supported on the inner liner truck 743, all the constituent parts of the apparatus including the green case building servicer mechanism 700 are simultaneously stopped. When the carcass ply CP and the flipper F have been unwound from the carcass ply roll CPR and the flipper roll FR, all the constituent parts of the apparatus are also simultaneously stopped. As previously mentioned, the inner liner I, the carcass ply CP, and the flipper F are overlappedly applied on the tire band building drum 101' to form a tire band TB.

As shown in FIGS. 17 to 21, when a pair of annular beads BA are fitted over and retained on the annular rings 613a and 613a', respectively, of the bead retaining drum 613 by an attendant operator, the fluid-operated cylinder 614 is actuated to cause the bead retaining drum 613 retaining the pair of beads BA to be moved from the initial operating position 600A shown in solid lines of FIG. 17 to the final operating position 600B of the same Figure. When the bead retaining drum 613 is moved to the final operating position 600B, the bead retaining drum 613 and the beads BA are brought into axial alignment with the bead setter mechanism 500, following which the fluid-operated cylinder 527 is actuated to cause the movable base structure 505 to be slidably moved on and along the parallel guide rails 502 and 502' from the initial operating position 500F shown in solid lines of FIG. 17 to the fore bead retaining position 500E shown in phantom lines of the same Figure. When the movable base structure 505, i.e., the fore bead setting arrangement 506 is moved to the fore bead retaining position 500E, the bead BA fitted on the annular ring 613a' of the bead retaining drum 613 is attracted to the bead retaining magnets 513 attached to the radially inner end portions of the bead retaining segments 512 of the fore bead setting arrangement 506 so that the bead BA is transferred from the bead retaining drum 613 to the fore bead setting arrangement 506 and reliably retained by the bead retaining segments 512. After the bead BA is retained on the fore bead setting arrangement 506, the fluid-operated cylinder 527 is again actuated to move the movable base structure 505 from the fore bead retaining position 500E shown in phantom lines of FIG. 17 to the rear bead retaining position 500G also shown in phantom lines of the same Figure. When the movable base structure 505, i.e., the rear bead setting arrangement 507 is moved to the rear bead retaining position 500G, the bead BA fitted on and retained by the annular ring 613a of the bead retaining drums 613 is attracted to the bead retaining magnets 513 attached to the radially inner end portions of the bead retaining members 512' of the rear bead setting arrangement 507 so that the bead BA is transferred from the bead retaining drum 613 to the rear bead setting arrangement 507 and reliably retained by the bead retaining segments 512'. After the bead BA is retained on the rear bead setting arrangement 507, the fluid-operated cylinder 614 is again actuated to move the vacant bead retaining drum 613, of which beads BA has been transferred to the fore bead setting arrangement 506 and the rear bead setting arrangement 507, back to the initial operating position 600A shown in solid lines of FIG. 17 from the final operating position 600B shown in phantom lines of the same Figure. When the bead retaining drum 613 is moved back to the initial operating position 600A, the fluid-operated cylinder 527 is again actuated to cause the fore bead setting arrangement 506 and the rear bead setting arrangement 507 on the movable base structure 505 to be moved from the rear bead retaining positions 500G shown in phantom lines of FIG. 17 to the final operating positions 500H shown in phantom lines of the same Figure so that the beads BA are placed on and around their respective predetermined positions of the tire band TB on the tire band building drum 101'. Only the portions of the tire band building drums 101 engaging with the beads BA are then expanded radially outwardly to permit the beads BA to be adhered onto their respective predetermined positions. After completion of such adhesions of the beads BA, the tire band building drum 101 is wholly expanded radially outwardly, and the fluid-operated cylinder 523 of the fore bead setting arrangement 506 and the fluid-operated cylinder 523' of the rear bead setting arrangement 507 are simultaneously actuated to cause the rotary plates 520 and 520' to be rotated, thereby moving radially outwardly the guide pins 514 and 514' jointly with the bearings 515 and 515' along the guide slots 520a and 520a' so that the bead retaining semgnets 512 and 512' are moved from the initial operating positions 500C shown in solid lines of FIG. 19 to the final operating positions 500D shown in phantom lines of the same Figure. Upon movement of the bead retaining segments 512 and 512' to their respective final operating positions 500D, the fluid-operated cylinder 527 is again actuated to cause the fore bead setting arrangement 506 and the rear bead setting arrangement 507, which are vacant since the beads BA thereon have been adhered onto and around the tire band TB on the tire band building drum 101', to be moved back to the initial operating positions 500F shown in solid lines of FIG. 17 from the final operating positions 500H shown in phantom lines of the same Figure. At this time, the fore bead setting arrangement 506 and the rear bead setting arrangement 507 are passed over outer peripheral wall of the expanded tire band building drum 101' free from any contact therewith to the initial operating positions 500F since the bead retaining segments 512 and 512' remain at the final operating positions 500D. In simultaneous timing with the movement of the fore bead setting arrangement 506, the rear bead setting arrangement 507 and the movable base structure 505 to the initial operating positions 500F, the fluid-operated cylinders 523 and 523' are again actuated to cause the bead retaining segments 512 and 512' to be moved back to the initial operating positions 500C shown in solid lines of FIG. 19 from the final operating positions 500D shown in phantom lines of the same Figure. As described above, a pair of beads BA are adhered onto and around the tire band TB on the tire band building drum 101'.

As shown in FIGS. 2 to 5, the fluid-operated cylinders 125 is actuated, after resumption of the movable base structure 505 to the initial operating position 500F, to cause the tire band building drum 101' mounting thereon the tire band TB with the beads BA to be swung jointly with the fixed cylindrical member 107, the rotary cylindrical member 111 and the tire band building drum supporting member 113 into the first station 100C of the non-operating state shown in phantom lines of FIG. 2 from the first station 100A of the operating state shown in solid lines of the same Figure. At this time, the tire band building drum 101 supported on the supporting member 113 together with the tire band building drum 101' is also swung from the second station 100B of the operating state shown in solid lines of FIG. 2 to the second station 100D of the non-operating state of the tire band building drum 101'. When the tire band building drums 101' and 101 are respectively swung to the first and second stations 100C and 100D of the non-operating state, the rotary actuator 112 is actuated to cause the rotary cylindrical member 111 to be rotated through an angle of 180° so that the tire band building drum 101' is revolved from the first station 100C of the non-operating state to the second station 100D of the non-operating state while the tire band building drum 101 is also revolved from the second station 100D of the non-operating position to the first station 100C of the non-operating state. After changing such the stations of the tire band building drums 101 and 101', the fluid-operated cylinder 125 is again actuated to cause the tire band building drum 101' occupying the second station 100D of the non-operating station to be swung to the second station 100B of the operating state jointly with the tire band building drum 101 occupying the first station 100C of the non-operating station so that the indexing block 120 is brought into engagement with the grooved block 121 of the tire band producing frame 121 to ensure the tire band building drum 101' to be retained at the second station 100B of the operating state. At this time, the tire band building drum 101 is also maintained at the first station 100A of the operating state. A pair of bead fillers FB are then applied onto the axially inner faces of the respective beads BA, which have been adhered to the tire band TB on the tire band building drum 101', and then stitched to the tire band TB by means of the stitching mechanism 127 (see FIGS. 2 and 6) positioned in the vicinity of the tire band building drum 101' positioned at the second station 100B of the operating state. The both end portions of the tire band TB are then turned over around the beads BA to wrap the beads BA and the bead fillers FB, following which the attendant operator superimposes a pair of side treads ST and further a pair of chafers CH on the desired positions of the turned tire band TB. A green case GC is then completed by stitching on the above superimposed tire components by the stitching mechanism 127. While the green case GC is under production from the tire band TB with the above superimposed tire components on the tire band building drum 101', another pair of beads BA are similarly adhered onto the predetermined positions of the tire band TB which are built on another tire band building drum 101 changed into the first station 100A from the inner liner I, the carcass ply CP and the flipper F applied thereon in this order toward the outside thereof in a similar fashion. In this way, the green case GC and another tire band TB are simultaneously produced on the tire band building drums 101' and 101, respectively, after which the electric motors 117 and 117' are stopped.

While the green GC and another tire band TB are simultaneously produced on the tire band building drums 101' and 101, respectively, an endless belt BL on which a tread T is applied is built on the belt building drum 301 as shown in FIGS. 30 to 36 and in a following manner. The breaker ply truck 954 supporting the breaker ply BPR and the liner roll LR is guided by the guide rail 953 until the square projection of the rotary shaft supporting the liner roll LR is automatically brought into engagement with the square bore 941b of the rotary shaft 941 so that the former rotary shaft is completely coupled with the latter rotary shaft 941 to station the breaker ply truck 954 at the desired position backwardly of the rear columns 901a in parallel relation with the rotational axis of the belt building drum 301. When the breaker ply truck 954 is stationed at the desired position backwardly of the rear columns 901a, the electric motor 938 is rotated to transmit its rotational torque to the liner roll LR through the sprocket wheel 938, the endless chain 943, the sprocket wheel 942 and the rotary shaft 941 while transmitting its rotational torque to the breaker ply unwinding roll 949 through the rear gear 952 and the fore gear 951, thereby causing the breaker ply BP to be fed to the beaker ply supplying conveyor mechanism 928. At this time, the liner L is unwound from the breaker ply roll BPR by the liner unwinding roll 950 to be successively wound on the liner roll LR. The breaker ply BP fed to the breaker ply supplying conveyor mechanism 928 is adjusted in its meander by the breaker ply meander adjusting arrangement 928b and then conveyed to the breaker ply supplying conveyor 928a. When the electric motor 934 is rotated and the clutch 982 is engaged, the rotational torque of the electric motor 934 is transmitted to the rear roller 969 through the sprocket wheel 933, the endless chain 935, the sprocket wheel 930a, the sprocket wheel 930b, the endless chain 979, the sprocket wheel 978a, the sprocket wheel 978b, the endless chain 981 and the sprocket wheel 980 so that the breaker ply supplying conveyor 928a and the breaker ply supplying conveyor 967a are concurrently operated to convey the breaker ply BP from the breaker ply supplying conveyor mechanism 928 to the breaker ply applying conveyor mechanism 956, passing through the position immediately below the breaker ply cutting mechanism 956. The breaker ply BP reinforced with steel cord is, at this time, being attracted to the rear endless belt 915a and the fore endless belt 915b by the attracting forces of the permanent magnets embedded in the rear belt supporting plate 914a and the fore belt supporting plate 914b and thus is conveyed on the breaker ply supplying conveyor mechanism 928 without being meanderd after passing the breaker ply meander adjusting mechanism 928b. Since the breaker ply applying conveyor mechanism 967 has a construction entirely identical to the breaker ply supplying conveyor mechanism 928, the breaker ply BP is also conveyed on the breaker ply applying conveyor mechanism 967 in a similar manner. When the breaker ply BP is conveyed forwardly of the breaker ply cutter of the breaker ply cutting mechanism 956 by a length substantially identical to the circumferential length of the belt building drum 301, the electric motor 934 for driving the breaker ply supplying conveyor mechanism 928 is stopped and the breaker ply cutting mechanism 956 is simultaneously operated to cut the breaker ply BP to a predetermined length. After the cutting operation of the breaker ply BP, the clutch 982 is disengaged and the electric motor 934 is energized so that only the breaker ply applying conveyor mechanism 967 is operated to convey the cut breaker ply BP to the predetermined position on the breaker ply applying conveyor mechanism 967 and thereafter the electric motor 934 is stopped. In the similar way to the case of the breaker ply BP, the breaker ply BP unwound by the breaker ply unwinding mechanism 993 from the breaker ply truck 994 stationed at the position backwardly of the fore columns 901b is fed to the breaker ply supplying conveyor mechanism 991 and then cut to a predetermined length by the breaker ply cutting mechanism 995, after which the breaker ply BP is conveyed to the predetermined position on the breaker ply applying conveyor mechanism 996.

While the breaker plies BP are respectively unwound by the breaker ply unwinding mechanisms 936 and 993, cut to the predetermined lengths by the breaker ply cutting mechanisms 956 and 995, and then conveyed to the predetermined positions on the breaker ply applying conveyor mechanisms 967 and 996, a tread T is supplied onto the tread supplying conveyor mechanism 1002 as will be described hereinlater. When the predetermined length cut breaker plies BP are provided on the predetermined positions of the breaker ply conveyor mechanisms 967 and 996 and the tread T is mounted on the tread supplying conveyor mechanism 1002, the fluid-operated cylinder 990 is actuated to cause the movable frame 961 to be moved along the guide rails 958 and 958' toward the belt bulding drum 301. By the movement of the movable frame 961, the breaker ply applying conveyor mechanisms 967 and 996 supported on the movable frame 961 are moved from the initial operating positions 900A shown in solid lines of FIG. 31 to the second operating positions 900B shown in phantom lines of the same Figure under the state that the predetermined length cut breaker plies BP are mounted on the breaker ply applying conveyor mechanisms 967 and 996, while the tread supplying conveyor mechanism 1002 mounted on the movable frame 961 is moved from the initial operating position 900G shown in solid lines of FIG. 31 to the second operating position 900H shown in phantom lines of the same Figure under the state that the tread T is mounted on the tread supplying conveyor mechanism 1002. When the breaker ply applying conveyor mechanisms 967, 996 and the tread supplying conveyor mechanisms 1002 are moved to the second operating positions 900B and 900H, the electric motor 306 is energized for rotation to transmit its rotational torque to the sprocket wheel 313 through the sprocket wheel 310, the endless chain 311, the sprocket wheel 308 and the endless chain 314 so that the belt building drum 301 is rotated. Simultaneously with the rotation of the electric motor 306, the fluid-operated cylinders 963 and 997 are actuated to cause the breaker ply applying conveyor mechanisms 967 and 996 to be swung from the second operating positions 900B shown in phantom lines of FIG. 31 to the third operating positions 900C also shown in phantom lines of the same Figure so that the fore rollers 968 and 968' of the breaker ply applying conveyor mechanisms 967 and 996 are positioned with spaces between the fore rollers 968, 968' and the belt building drum 301 substantially equal to the thickness of each of the breaker plies BP. The fluid-operated cylinders 988 and 1000 are then actuated to cause the urging rolls 985 and 1001 to be swung from the third operating positions 900C shown in phantom lines of FIG. 31 to the fourth operating positions 900D also shown in phantom lines of the same Figure so that the urging rolls 985 and 1001 are brought into contact with the outer peripheral surface of the belt building drum 301. After the urging rolls 985 and 1001 are brought into contact with the other peripheral surface of the belt building drum 301, the electric motors 934 and 998 are again energized for rotation to operate only the breaker ply applying conveyor mechanisms 967 and 996 so that the predetermined length cut breaker ply BP on the breaker ply applying conveyor mechanism 967 is applied onto the belt building drum 301, which is driven by the urging roll 985, after passing through the breaker ply applying arrangement 967b from the breaker ply supplying conveyor 967a, while the predetermined length cut breaker ply BP on the breaker ply applying conveyor mechanism 996 is superimposedly applied on the breaker ply BP, which has been applied onto the belt building drum 301 driven by urging roll 1001, after passing through the breaker ply applying arrangement 996b from the breaker ply supplying conveyor 996a. In this way, the first and second breaker plies BP are superimposedly applied on the belt building drum 301 to be produced into an endless belt BL. Since the contacting positions of the urging rolls 985 and 1001 on the belt building drum 301 are circumferentially dislocated with each other and the electric motor 998 is energized for rotation with a predetermined time lag behind the energization of the electric motor 934, the connecting portions of the two breaker plies BP are circumferentially equi-distantly distributed around the belt building drum 301. After completion of the endless belt BL on the belt building drum 301, the electric motors 934 and 998 are stopped and the fluid-operated cylinders 988 and 1000 are simultaneously actuated to cause the urging rolls 985 and 1001 to be moved back to the third operating positions 900C shown in phantom lines of FIG. 31 from the fourth operating positions 900D also shown in phantom lines in the same Figure. The fluid-operated cylinders 963 and 997 are again actuated to cause the breaker ply applying conveyor mechanisms 967 and 996 to be moved back to the second operating positions 900B shown in phantom lines of FIG. 31 from the third operating positions 900C also shown in phantom lines of the same Figure. After the breaker ply conveyor mechanisms 967 and 996 are moved back to the second operating positions 900B, the fluid-operated cylinder 1030 is actuated to cause the rockable roller conveyor 1027 to be swung from the second operating position 900H shown in phantom lines of FIG. 31 to the third operating positions 900I also shown in phantom lines of the same Figure. The fluid-operated cylinder 1043 is then actuated to cause the urging roll 1040 to be swung from the third operating position 900I shown in phantom lines of FIG. 31 to the fourth operating position 900J also shown in phantom lines of the same Figure so that the urging roll 1040 is brought into contact with the outer peripheral surface of the belt building drum 301. With a time lag behind the energization of the electric motor 998 after the urging roll 1040 is brought into engagement with the outer peripheral surface of the belt building drum 301, the electric motor 1014 is driven for positive rotation to transmit its rotational torque to the sprocket wheel 1024 through the sprocket wheel 1020, the endless chain 1021, the sprocket wheel 1019 and the endless chain 1025, and the fluid-operated cylinder 1018 is actuated to cause the piston rod 1018a to be retracted so that the rockable roll 1023 is moved to the second operating position 900F shown in Phantom lines of FIG. 31 from the initial operating position 900E shown in solid lines of the same Figure and is driven for positive rotation. The rockable roll 1023 is thus brought into contact with the upper surface of the tread T on the rockable conveyor mechanism 1027 to convey the tread T from the slidable roller conveyor mechanism 1008 and the rockable roller conveyor mechanism 1027 toward the urging roll 1040, during which the three pair of guide rolls 1036 and 1036' guide the tread T to be centered. The tread T is then pushed out of the forward end of the rockable conveyor mechanism 1027 to be superimposedly applied on the endless belt BL which is being rotated in contact with the urging roll 1040. In a similar manner to the case of the previous endless belt BL, the contacting positions of the latter urging rolls 1040 and former urging rolls 985 and 1001 are circumferentially dislocated with each other and the electric motor 1014 is energized for rotation with a predetermined time lag behind the energization of the electric motor 998 so that the connecting portions of the first and second breaker plies BP and the tread T are circumferentially equi-distantly distributed around the belt building drum 301. After application of the endless belt BL and the tread T around the belt building drum 301, the stitching mechanism 315 (see FIG. 1) provided in the vicinity of the belt building drum 301 is operated to stitch the sames for firm adhesion, and the electric motor 306 is thereafter stopped. Thereafter, the electric motor 1014 is stopped and the fluid-operated cylinder 1043 is again actuated to cause the urging roll 1040 to be moved back to the third operating position 900I shown in phantom lines of FIG. 31 from the fourth operating position 900J also shown in phantom lines of the same Figure. The fluid-operated cylinder 1030 is subsequently again actuated to cause the rockable conveyor mechanism 1027 to be moved back to the second operating position 900H shown in phantom lines of FIG. 31 from the third operating position 900I also shown in phantom lines of the same Figure. When the breaker ply applying conveyor mechanisms 967, 996 and the rockable conveyor mechanism 1027 are respectively moved back to the second operating positions 900B and 900H, the fluid-operated cylinder 990 is again actuated to cause the piston rod 990a to be retracted so that the breaker ply applying conveyor mechanisms 967 and 996 are moved back to the initial operating positions 900A shown in solid lines of FIG. 31 from the second operating positions 900B shown in phantom lines of the same Figure and that the rockable conveyor mechanism 1027, i.e., the tread supplying conveyor mechanism 1002 is moved back to the initial operating position 900G shown in solid lines of FIG. 31 from the second operating position 900H shown in phantom lines of the same Figure. Simultaneously with the stopping of the electric motor 1014, the fluid-operated cylinder 1030 is actuated to cause the rockable roll 1023 to be moved back to the initial operating position 900E shown in solid lines of FIG. 31 from the second operating position 900F shown in phantom lines of the same Figure. Upon resumption of the tread supplying conveyor mechanism 1002 to the initial operating position 900G, the fluid-operated cylinder 1048 is actuated to cause the tread supplying conveyor mechanism 1002 to slide from the initial operating position 900G, the fluid-operated cylinder 1048 is actuated to cause the tread supplying conveyor mechanism 1002 to slide from the initial operating position 900G shown in solid lines of FIG. 31 to the fifth operating position 900K shown in phantom lines while the fore supporting brackets 1006, 1006' and the rear supporting brackets 1007, 1007' is being guided by the opposing guide rods 1005 and 1005'. Simultaneously with the actuation of the fluid-operated cylinder 1048, the fluid-operated cylinder 1018 is actuated to cause the rockable roll 1023 to be swung from the initial operating position 900E shown in solid lines of FIG. 31 to the second operating position 900F shown in phantom lines of the same Figure, while the electric motor 1014 is energized for reverse rotation so that the rockable roll 1023 is driven for rotation oppositely to the direction upon pushing out the tread T. When the tread supplying conveyor mechanism 1002 with the reversely rotating rockable roll 1023 positioned at the second operating position 900F is moved to the fifth operating position 900K, the attendant operator transfers another predetermined length cut tread T from the upper roller conveyor 1034 onto the rockable conveyor mechanism 1027. The tread T just transferred comes to be contact with the rockable roll 1023, whereupon it is forced to be conveyed from the rockable conveyor mechanism 1027 to the slidable conveyor mechanism 1008. After conveyance of the tread T onto the slidable conveyor mechanism 1008, the electric motor 1014 is temporally stopped and then again positively rotated to impart a positive rotation to the rockable roll 1023. By the action of the rockable roll 1023, the tread T on the tread supplying conveyor mechanism 1002 is partially pushed out of the forward end of the rockable conveyor mechanism 1027 while being centered by the three pairs of guide rolls 1036 and 1036'. When the forward end portion of the tread T is pushed out of the forward end of the rockable conveyor mechanism 1027 to have an adhering portion long enough to be initially adhered to the endless belt BL, the electric motor 1014 is stopped. Simultaneously with the stopping of the electric motor 1014 the fluid-operated cylinder 1048 is again actuated to cause the tread supplying conveyor 1002 to be moved back to the initial operating position 900G shown in solid lines of FIG. 31 from the fifth operating position 900K shown in phantom lines of the same Figure during a time period that the tread T is transferred onto the tread conveyor mechanism 1002 and is pushed out of the rockable conveyor mechanism 1027 by the predetermined length just mentioned. During the above process, the subsequent predetermined length cut breaker plies BP are automatically applied on and around the belt building drum 301 without meander and elongation since the circumferential speed of the belt building drum 301 is synchronized to the travelling speed of the endless belts 970 and 970' of the breaker ply applying conveyor mechanisms 967 and 996. When the breaker plies BP of the breaker ply rolls BPR on the breaker ply trucks 954 and 994 have been entirely unwound, all the moving parts of the apparatus including the belt building servicer mechanism 900 are stopped. It is thus to be understood from the foregoing description that an endless belt BL is produced with the tread T applied thereon by the previously mentioned way.

When the green case GC has been built on the tire building drum 101' as shown and described with reference to FIGS. 6 to 16, the rotary shaft 411 is driven for rotation by an electric motor (not shown) so that the movable base structure 405 is moved from the initial operating position 400A shown in solid lines of FIG. 6 to the fore carrying position 400B shown in phantom lines of the same Figure by way of the sprocket wheels 412, 413 and the endless chain 414. At this time, the green case transferring arrangement 406 comes to surround the tire band building drum under such a condition that the vertical plane median or intermediate along the rotational axis of the hollow shaft 216 of the supporting plates 416 and 416' is in registry with the midcircumferential plane of the tire band building drum 101' at the second station 100B of the operating state. Upon movement of the movable base structure 405 to the fore carrying position 400B the electric motor for driving the rotary shaft 410 is stopped and the fluid-operated cylinders 419 are simultaneously actuated to cause the piston rods 419a to be radially inwardly projected. The arcuate plates 420 are thus concurrently moved from the initial operating positions 400E shown in solid lines of FIG. 11 to the final operating positions shown in phantom lines of the same Figure with the guide rods 421 and 421' guided by the sleeves 422 and 422', respectively so that the green case GC on the tire band building drum 101' is held at its four circumferentially spaced positions by the arcuate plates 420. Simultaneously with the holding of the green case GC by the arcuate plates 420, the tire band building drum 101' is collapsed to release therefrom the green case GC, thereby transferring the same to the green case transferring arrangement 406. After completion of transferring the green case GC to the green case transferring arrangement 406, the rotary shaft 410 is reversely rotated to move the movable base structure 405 from the fore carrying position 400B shown in phantom lines of FIG. 6 to the rear carrying position 400C also shown in phantom lines of the same Figure. When the movable base structure 405 has been moved to the rear carrying position 400C, the green case transferring arrangement 406 and the belt transferring arrangement 407 come to surround the tire building drum 201 and the belt building drum 301, respectively, under the state that the mid-circumferential planes of the green case transferring arrangement 407 are respectively in registry with the mid-circumferential planes of the tire building drum 201 and the belt building drum 301. Immediately upon the movement of the movable base structure 405 to the rear carrying position 400C, the rotary shaft 410 is stopped, and the fluid-operated cylinders 419 of the green case transferring arrangement 406 and the ffluid-operated cylinders 439 of the belt transferring arrangement 407 are concurrently actuated. By the actuation of the fluid-operated cylinders 419, the arcuate plates 420 are moved back to the initial operating positions 400E shown in solid lines of FIG. 11 from the final operating position 400F shown in phantom lines of the same Figure so that the green case GC carried on the arcuate plates 420 is released from the green case transferring arrangement 406 and transferred to the tire building drum 201 with its bead portions held on the expanded fore and rear bead rings 201a and 201b of the tire building drum 201. On the other hand, the actuation of the fluid-operated cylinder 439 causes the belt carrying means 428 to be moved from the initial operating position 400G shown in dotted lines of FIG. 15 to the final operating position 400H shown in chain lines of the same Figure with the guide rods 428a guided by the guide sleeves 427 so that the endless belt BL with the tread T applied thereon on the belt building drum 301 is held at its four circumferentially spaced positions by the belt carrying means 428. Simultaneously with the holding of the endless belt BL by the belt carrying means 428, the belt building drum 301 is collapsed releasing the endless belt BL to be transferred to the belt transferring arrangement 407. The movable base structure 405 is then moved from the rear carrying position 400C shown in phantom lines of FIG. 6 to the final operating position 400D also shown in phantom lines of the same Figure while the belt transferring arrangement 407 is being carrying the endless belt BL with the green case transferring arrangement 406 vacant. At this time, the belt transferring arrangement 407 comes to surround the tire building drum 201 mounting thereon the green case GC under the state that the mid-circumferential plane of the belt transferring arrangement 407 is in registry with that of the tire bulding drum 201. When the movable base structure 405 has been moved to the final operating position 400D, compressed air is introduced into the tire building drum 201 through the hollow shaft 216 by the compressed air source, whereupon the electric motor 213 is energized to rotate transmitting its rotational torque to the screw shafts 205 through the sprocket wheel 214, the endless chain 215 and the sprocket wheels 208, 208'. As a result, the fore thrust bearing 206 and the rear thrust bearing 207 are moved from the initial operating positions 200A shown in solid lines of FIG. 6 to the final operating positions 200B shown in phantom lines of the same Figure so that the fore bead ring 201a and the rear bead ring 201b are moved from the initial operating positions 200C to the final operating positions 200D, whereupon the electric motor 213 is stopped. The movements of the fore bead rings 201a and the rear bead ring 201b and the supply of the compressed air permit the tire building drum 201 to be deformed from cylindrical to toroidal shapes so that the outer peripheral surface of the deformed green case GC is brought into contact with the inner peripheral surface of the endless belt BL to be assembled therewith. After assembling the green case GC and the endless belt BL, the electric motor 219 is energized for rotation transmitting its rotational torque to the sleeve 217 through the hollow shaft 216 for rotation of the tire building drum 201. The green case GC and the endless belt BL are then stitched together by the stitching mechanism 222 (see FIG. 1) provided in the neighbourhood of the tire building drum 201 for production of the green tire GT. The fluid-operated cylinder 439 is thereafter again actuated to cause the belt carrying means 428 to be moved from the initial operating position 400G shown in dotted lines of FIG. 15 to the final operating position 400H shown in chain lines of the same Figure so that the green tire GT on the tire building drum 201 is held at the four circumferentially spaced positions by the belt carrying means 428. Simultaneously with the holding of the green tire GT by the belt carrying means 428, the fore bead ring 201a and the rear bead ring 201b are concurrently collapsed and the electric motor 213 is reversely rotated, thereby moving the fore bead ring 201a and the rear bead ring 201b from the final operating position 200D shown in phantom lines of FIG. 6 to the initial operating positions 200C. The compressed air is discharged from the tire building drum 201 through the hollow shaft 216 simultaneously with the rotation of the electric motor 213 so that the tire building drum 201 is restored into the cylindrical form from the toroidal form. The green tire GT is thus released from the tire building drum 201 to be transferred to the belt transferring arrangement 407. Upon resumption of the tire building drum 201 into the cylindrical form, the electric motor 213 is stopped and the movable base structure 405 is moved from the final operating position 400D shown in phantom lines of FIG. 6 to the initial operating position 400A shown in solid lines of the same Figure. When the movable base structure 405 is moved to the initial operating position 400A, the rotary shaft 410 is stopped and the fluid-operated cylinder 439 is actuated to cause the belt carrying means 428 to be moved back to the initial operating position 400G shown in dotted lines of FIG. 15 from the final operating position 400H shown in chain lines of the same Figure. The green tire GT is thus released from the belt carrying means 428 and removed from the belt transferring arrangement 407 at the initial operation position 400A to the movable base structure 405.

According to the above mentioned operation, a tire band TB and a green case GC with a pair of beads BA are simultaneously produced on a pair of tire band building drums 101 and 101' by means of a tire band building mechansim 100 and a green case building servicer mechanism 700, during which an endless belt BL with a tread T is produced on a belt building drum 301 by means of a belt building mechanism 300 and a belt building servicer mechanism 900. The green case GC on the tire band building drum 101 or 101' is subsequently transferred onto a tire building drum 301 by a transfer ring mechanism 400 which simultaneously receives and holds an endless belt BL with a tread T applied thereon. The endless belt BL with the tread T is transferred onto the green case GC applied onto the tire band building drum 301 to produce a green tire GT with the tire building mechanism 200. The apparatus of the present invention will be operated in a completely automated fashion if the electric motor for rotation of the shaft 410, the compressed air source for supplying compressed air into the shaping bag 201c of the tire building drum 201, the rotary actuator 112, the electric motor 117, 117', the fluid-operated cylinder 125, the stitching mechanism 127, the electric motor 213b, the electric motor 219, the stitching mechanism 222, the electric motor 306, the stitching mechanism 315, the fluid-operated cylinder 419, the fluid-operated cylinder 439, the fluid-operated cylinders 523, 523', the fluid-operated cylinder 527, the fluid-operated cylinder 614, the electric motor 714, the electric motor 719, the fluid-operated cylinders 741, 793, 817, the fluid-operated cylinder 747, the clutch 768, the fluid-operated cylinders 776, 798, 820, the fluid-operated cylinder 779, the electric motor 785, the carcass ply cutting mechanism 787, the electric motor 789, the electric motor 808, the flipper cutting mechanism 812, the electric motor 814, the fluid-operated cylinder 824, the electric motors 934, 998, the electric motor 938, the breaker ply cutting mechanism 956, 995, the fluid-operated cylinder, 963, 997, the clutch 982, the fluid-operated cylinders 988, 1000, 1043, the fluid-operated cylinder 990, the electric motor 1014, the fluid-operated cylinder 1018, the fluid-operated cylinder 1030 and the fluid-operated cylinder 1048 are controlled for their starts and stops in accordance with a predetermined program.

While it has been described in the above embodiment that the endless belts each having thereon a number of pointed pins are travelled on the belt supporting plates with a number of rod-like permanent magnets in the breaker ply supplying conveyor mechanisms 928, 991 and the breaker ply applying conveyor mechanisms 967, 996 so as to prevent the meander and elongation of the breaker ply BP on the endless belt by the action of the permanent magnets since the breaker ply BP is reinforced with steel cords, the breaker ply supplying conveyor mechanisms 928, 991 and the breaker ply applying conveyor mechanisms 967, 996 may be constructed substantially identical to the inner liner supplying conveyor mechanism 711 and the inner liner applying conveyor mechanism 757 to have the endless chains provided with a number of pins for prevention of the meander and elongation of the breaker ply BP is the breaker ply BP is reinforced by fabric cords.

It is thus to be noted from the apparatus embodying the present invention that finished tires can be remarkably enhanced in quality entirely eliminating deformation ever developed during the storage of the green cases. Further, all the equipments for production of the tires can be enhanced in operational efficiency to markedly shorten a time period for building per unit tire without the operator's skillfulness.

Although particular embodiments of the present invention have been shown and described, it will be obvious to those skilled in the art that various changes and modifications may be made without departing from the spirit and scope of the present invention.

What is claimed is:

1. An apparatus for producing green tires, comprising in combination:

a tire band building mechanism including a revolvable member revolvable around it own axis to be indexed at first and second rotation positions, a pair of collapsible tire band building drums mounted on said revolvable member in spaced apart and parallel relation with each other to assume first and second station when said revolvable member is revolved and indexed at the respective first and second rotation positions, each of said tire band building drums being rotatable around its own axis, a revolving means for intermittently revolving and indexing said revolvable member into the first and second stations, and a pair of tire band building drum rotating means for rotating said tire band building drums;

a belt building mechanism including a collapsible belt building drum disposed in coaxial and spaced apart relation with said tire band building drum occupying said second station and rotatable around its own axis, and a belt building drum rotating means for rotating said belt building drum;

a tire building drum mechanism including a tire building drum disposed between and in coaxial relation with said tire band building drum occupying said second station and said belt building drum to be deformable between a cylindrical form and a toroidal form, and a tire building drum rotating means for rotating said tire building drum; and a transfer ring mechanism including a movable base structure movable to assume first, second and third positions, first and second transferring arrangements mounted on said movable base structure in spaced relation with each other along the axes of said tire band building drum, said belt building drum and said tire building drum with a distance between the mid-circumferential planes of said transferring arrangements substantially equal to a distance between the mid-circumferential planes of said tire building drum and said belt building drum, said first transferring arrangement surrounding said tire band building drum when said movable base structure is moved to the first position, said first transferring arrangement surrounding said tire building drum to transfer a green case thereon to said tire building drum and said second transferring arrangement surrounding said belt building drum to receive and endless belt from said belt building drum when said movable base structure is moved to said second position, said second transferring arrangement surrounding said tire building drum to transfer the endless belt, received on said second transferring arrangement, onto the green case on said tire building drum when said movable base structure is moved to the third position.

2. The apparatus as set forth in claim 1, in which each of said first and second transferring arrangements includes a plurality of arcuate plates radially movable to hold and release tire components, and an actuating means for radially moving said arcuate plates.

3. The apparatus as set forth in claim 1, which further comprises a bead setter mechanism including a base structure movable in parallel with the axis of said tire band building drum occupying the first rotation position, first and second bead setting arrangements securely mounted on said base structure in spaced relation with each other along the axis of said tire band building drum occupying the first rotation position for supplying a pair of beads on a tire band applied onto said tire band building drum, and an actuator for moving said base structure.

4. The apparatus as set forth in claim 3, in which each of said first and second bead setting arrangements includes an annular member, a plurality of segments radially movably mounted on said annular member and each having at its radially inner end a permanent magnet to attract said bead, and a segment moving means mounted on said annular member for radially inwardly and outwardly moving said segments.

5. The apparatus as set forth in claim 3, which further comprises a bead servicer mechanism including a bead retaining drum movable toward and away from a position between said first and second bead setting arrangements moved away from said tire band building drum occupying the first rotation position and having at its both axial end faces a pair of annular rings each of which has an outer diameter substantially equal to the inner diameter of said bead, and an actuating means for moving said bead retaining drum toward and away from the position between said first and second bead setting arrangements.

6. The apparatus as set forth in claim 1, which further comprises first and second bearings spacedly mounted on a frame in coaxial relation with the axis of said tire band building drum occupying the second rotation position, a first sleeve having one end rotatably mounted on said first bearing and mounting thereon said belt building drum, a second sleeve slidably received in said first sleeve and having one end extending outwardly of the other end of said first sleeve to mount thereon a first collapsible ring and the other end extending outwardly of said first bearing to mount thereon a first thrust bearing, a hollow shaft slidably received in said second sleeve and having one end extending outwardly of said first collapsible ring to mount thereon a second collapsible ring and the other end extending outwardly of said first thrust bearing to mount thereon a second thrust bearing, said first and second collapsible rings retaining both ends of a shaping bag to form said tire band building drum, and a thrust bearing moving means for moving said first and second thrust bearings toward and away from each other to deform said shaping bag between the cylindrical form and the toroidal form.

7. The apparatus as set forth in claim 6, in which said thrust bearing moving means includes a pair of spaced screw shafts extending in parallel relation with said hollow shaft and rotatably supported at their both ends on said first and second bearings, each of said screw shafts having first and second thread portions oppositely threaded toward said first and second bearings from its central portion, said first threaded portion in threaded engagement with said first thrust bearing and said second threaded portion in threaded engagement with said second thrust bearing, and a screw shaft rotating means for rotating said screw shafts in one and other rotation directions.

8. The apparatus as set forth in claim 1, which further comprises a green case building servicer mechanism positioned in the vicinity of and in perpendicular relation with said tire band building drum occupying the first station for supplying an inner liner, a carcass ply and a flipper thereto.

9. The apparatus as set forth in claim 1, which further comprises a belt building servicer mechanism positioned in the vicinity of and in perpendicular relation with said belt building drum for supplying a breaker ply and a thread thereto.

* * * * *